United States Patent
Sen et al.

(10) Patent No.: US 9,679,555 B2
(45) Date of Patent: Jun. 13, 2017

(54) SYSTEMS AND METHODS FOR MEASURING SPEECH SIGNAL QUALITY

(71) Applicant: QUALCOMM Incorporated, San Diego, CA (US)

(72) Inventors: Dipanjan Sen, San Diego, CA (US); Wenliang Lu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 14/314,019

(22) Filed: Jun. 24, 2014

(65) Prior Publication Data

US 2015/0006162 A1    Jan. 1, 2015

Related U.S. Application Data

(60) Provisional application No. 61/839,807, filed on Jun. 26, 2013, provisional application No. 61/888,945, filed on Oct. 9, 2013, provisional application No. 61/839,796, filed on Jun. 26, 2013, provisional application No. 61/839,800, filed on Jun. 26, 2013, provisional application No. 61/876,177, filed on Sep. 10, 2013.

(51) Int. Cl.
| | | |
|---|---|---|
| *G10L 15/02* | (2006.01) | |
| *G10L 25/00* | (2013.01) | |
| *G10L 25/69* | (2013.01) | |

(52) U.S. Cl.
CPC ............. *G10L 15/02* (2013.01); *G10L 25/00* (2013.01); *G10L 25/69* (2013.01)

(58) Field of Classification Search
CPC .................................................. G10L 15/02
See application file for complete search history.

(56) References Cited

U.S. PATENT DOCUMENTS

| | | |
|---|---|---|
| 7,164,771 B1 | 1/2007 | Treurniet et al. |
| 8,238,563 B2 | 8/2012 | Rumsey et al. |

(Continued)

FOREIGN PATENT DOCUMENTS

| | | |
|---|---|---|
| WO | WO-2009028937 A1 | 3/2009 |
| WO | 2010031109 A1 | 3/2010 |

OTHER PUBLICATIONS

Sen, D. (May 2004). Predicting foreground SH, SL and BNH DAM scores for multidimensional objective measure of speech quality. In Acoustics, Speech, and Signal Processing, 2004. Proceedings. (ICASSP'04). IEEE International Conference on (vol. 1, pp. I-493). IEEE.*

(Continued)

*Primary Examiner* — Ibrahim Siddo
(74) *Attorney, Agent, or Firm* — Austin Rapp & Hardman

(57) ABSTRACT

A method for measuring speech signal quality by an electronic device is described. The method includes obtaining a modified single-channel speech signal. The method also includes estimating multiple objective distortions based on the modified single-channel speech signal. The multiple objective distortions include at least one foreground distortion and at least one background distortion. The method further includes estimating a foreground quality and a background quality based on the multiple objective distortions. The method additionally includes estimating an overall quality based on the foreground quality and the background quality.

30 Claims, 49 Drawing Sheets

(56) References Cited

U.S. PATENT DOCUMENTS

| | | |
|---|---|---|
| 2004/0002857 A1 | 1/2004 | Kim |
| 2004/0186716 A1 | 9/2004 | Morfitt et al. |
| 2005/0004792 A1 | 1/2005 | Ando et al. |
| 2006/0200346 A1 | 9/2006 | Chan et al. |
| 2007/0011006 A1 | 1/2007 | Kim |
| 2009/0018825 A1* | 1/2009 | Bruhn .................... G10L 25/69 704/222 |
| 2011/0213614 A1 | 9/2011 | Lu et al. |
| 2011/0246192 A1 | 10/2011 | Homma |
| 2011/0288865 A1 | 11/2011 | Chan et al. |
| 2012/0010881 A1 | 1/2012 | Avendano et al. |
| 2012/0020484 A1 | 1/2012 | Grancharov |
| 2012/0059650 A1 | 3/2012 | Faure et al. |
| 2012/0099734 A1 | 4/2012 | Joly |
| 2015/0006164 A1 | 1/2015 | Lu et al. |

OTHER PUBLICATIONS

Sen, D., & Lu, W. (2012). Objective evaluation of speech signal quality by the prediction of multiple foreground diagnostic acceptability measure attributes. The Journal of the Acoustical Society of America, 131(5), 4087-4103.*

(Sen, D. (May 2004), Predicting foreground SH, SL and BNH DAM scores for multidimensional objective measure of speech qualify. In Acoustics, Speech, and Signal Processing, 2004, Proceedings. (ICASSP'04). IEEE International Conference on (Vo\. 1, pp. 1-493). IEEE.).*

(Sen, D., & Lu, VV. (2012). Objective evaluation of speech signal quality by the prediction of multiple foreground diagnostic acceptability measure attributes. The Journal of the Acoustical Society of America, 131(5), 4087-4103).*

Hu Y., et al., "Evaluation of Objective Quality Measures for Speech Enhancement," IEEE Transactions on Audio, Speech, and Language Processing, vol. 16 (1), Jan. 2008, pp. 229-238.

Deep S. et al., "Objective evaluation of speech signal quality by the prediction of multiple foreground diagnostic acceptability measure attributes", The Journal of the Acoustical Society of America, American Institute of Physics for the Acoustical Society of America, New York, NY, US, vol. 131, No. 5, May 1, 2012 (May 1, 2012), pp. 4087-4103, XP012160208, ISSN: 0001-4966, DOI: 10.1121/1.3699262.

International Search Report and Written Opinion—PCT/US2014/044163—ISA/EPO—Sep. 26, 2014.

Kim et al., "Perceptual model for non-Intrusive Speech Quality Assessment", Acoustics, Speech, and Signal Processing, 2004. Proceedings. (ICASSP ' 04). IEEE International Conference on Montreal, Quebec, Canada May 17-21, 2004, Piscataway, NJ, USA,IEEE, Piscataway, NJ, USA, vol. 3, May 17, 2004 (May 17, 2004), pp. 1060-1063, XP010718376,ISBN: 978-0-7803-8484-2.

Sen D: "Predicting foreground SH, SL and bnh dam scores for multidimensional objective measure of speech quality", Acoustics, Speech, and Signal Processing, 2004. Proceedings. (ICASSP ' 04). IEEE International Conference on Montreal, Quebec, Canada May 17-21, 2004, Piscataway, NJ, USA, IEEE, Piscataway, NJ, USA,vol. 1, May 17, 2004 (May 17, 2004), pp. 493-496, XP010717673,DOI: 10.1109/ICASSP.2004.1326030,ISBN: 978-0-7803-8484-2.

Tiemounou S. et al., "Assessment of speech quality degradation indicators for continuity dimension in super wideband telephony context", Computing, Networking and Communications (ICNC), 2013 International Conference on, IEEE, Jan. 28, 2013 (Jan. 28, 2013), pp. 932-936,XP032377026, DOI:10.1109/ICCNC.2013.6504215, ISBN: 978-1-4673-5287-1.

* cited by examiner

900

Diagram of Training weighting
For Rough Dimension

Same for intrusive and non-intrusive
Here use non- intrusive as example

Notice N conditions are used here.

FROM
FIG. 9B

Now:
- We have subjective "rough" scores for N conditions.
- We have features extracted for N conditions
  (54 features each condition).

Question:
Find the "b" that make below formula with least error?
FM' * b = S

Output:
B is the weighting. Save it for future testing of "rough".

996
b
Size: 54 x N

| Weight 001 |
|---|
| Weight 002 |
| Weight 003 |
| Weight 004 |
| Weight 005 |
| Weight 006 |
| Weight 008 |
| Weight 009 |
| Weight 010 |
| Weight 011 |
| Weight 002 |
| ... |
| Weight 049 |
| Weight 050 |
| Weight 051 |
| Weight 052 |
| Weight 053 |
| Weight 054 |

SYSTEMS AND METHODS FOR MEASURING SPEECH SIGNAL QUALITY

RELATED APPLICATIONS

This application is related to and claims priority to U.S. Provisional Patent Application Ser. No. 61/839,807 filed Jun. 26, 2013, for "SYSTEMS AND METHODS FOR MEASURING SPEECH SIGNAL QUALITY," U.S. Provisional Patent Application Ser. No. 61/888,945 filed Oct. 9, 2013, for "SYSTEMS AND METHODS FOR MEASURING SPEECH SIGNAL QUALITY," U.S. Provisional Patent Application Ser. No. 61/839,796 filed Jun. 26, 2013, for "SYSTEMS AND METHODS FOR INTRUSIVE FEATURE EXTRACTION," U.S. Provisional Patent Application Ser. No. 61/839,800 filed Jun. 26, 2013, for "SYSTEMS AND METHODS FOR NON-INTRUSIVE FEATURE EXTRACTION" and U.S. Provisional Patent Application Ser. No. 61/876,177 filed Sep. 10, 2013, for "SYSTEMS AND METHODS FOR FEATURE EXTRACTION."

TECHNICAL FIELD

The present disclosure relates generally to electronic devices. More specifically, the present disclosure relates to systems and methods for measuring speech signal quality.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or with higher quality are often sought after.

Some electronic devices (e.g., cellular phones, smartphones, audio recorders, camcorders, computers, etc.) capture or utilize audio signals. For example, a smartphone may capture a speech signal.

Speech signal quality may be difficult to quantify. Furthermore, characteristics of speech signals that impact how people perceive speech signals may be difficult to identify and/or quantify. Evaluating speech signal quality may be time consuming and expensive as well. As can be observed from this discussion, systems and methods that improve evaluation of speech signals may be beneficial.

SUMMARY

A method for measuring speech signal quality by an electronic device is described. A modified single-channel speech signal is obtained. Multiple objective distortions are estimated based on the modified single-channel speech signal. The multiple objective distortions include at least one foreground distortion and at least one background distortion. A foreground quality and background quality are estimated based on the multiple objective distortions. An overall quality is estimated based on the foreground quality and background quality.

Measuring speech signal quality may be performed in accordance with a hierarchical structure that includes a plurality of hierarchical levels. Each hierarchical level may depend on any and each relatively lower hierarchical level. The plurality of hierarchical levels may include three levels. A first hierarchical level may include estimating the multiple objective distortions. A second hierarchical level may include estimating the foreground quality and background quality. A third hierarchical level may include estimating the overall quality.

Estimating the overall quality may be further based directly on the multiple objective distortions. Each of the multiple objective distortions may represent an independent dimension of speech quality. The foreground distortions may include roughness, discontinuity, dullness and thinness. The background distortions may include hissing and variability.

The modified single-channel speech signal may be based on the original speech signal. The multiple objective distortions may be estimated without an original speech signal. An original speech signal may be obtained and the multiple objective distortions may be further based on the original speech signal.

An electronic device for measuring speech signal quality is also described. The electronic device includes a computational distortion estimator that estimates multiple objective distortions based on a modified single-channel speech signal. The multiple objective distortions include at least one foreground distortion and at least one background distortion. The electronic device also includes a computational foreground quality estimator coupled to the computational distortion estimator. The computational foreground quality estimator estimates a foreground quality based on the multiple objective distortions. The electronic device further includes a computational background quality estimator coupled to the computational distortion estimator. The computational background quality estimator estimates background quality based on the multiple objective distortions. The electronic device additionally includes a computational overall quality estimator coupled to the computational distortion estimator. The computational overall quality estimator estimates an overall quality based on the foreground quality and the background quality.

A computer-program product for measuring speech signal quality is also described. The computer-program product includes a non-transitory tangible computer-readable medium with instructions. The instructions include code for causing an electronic device to obtain a modified single-channel speech signal. The instructions also include code for causing the electronic device to estimate multiple objective distortions based on the modified single-channel speech signal. The multiple objective distortions include at least one foreground distortion and at least one background distortion. The instructions also include code for causing the electronic device to estimate a foreground quality and a background quality based on the multiple objective distortions. The instructions further include code for causing the electronic device to estimate an overall quality based on the foreground quality and the background quality.

An apparatus for measuring speech signal quality is also described. The apparatus includes means for obtaining a modified single-channel speech signal. The apparatus also includes means for estimating multiple objective distortions based on the modified single-channel speech signal. The multiple objective distortions include at least one foreground distortion and at least one background distortion. The apparatus further includes means for estimating a foreground quality and a background quality based on the multiple objective distortions. The apparatus additionally includes means for estimating an overall quality based on the foreground quality and the background quality.

BRIEF DESCRIPTION OF THE DRAWINGS

FIG. 9C is a block diagram illustrating weighting application;

DETAILED DESCRIPTION

Figure 1:
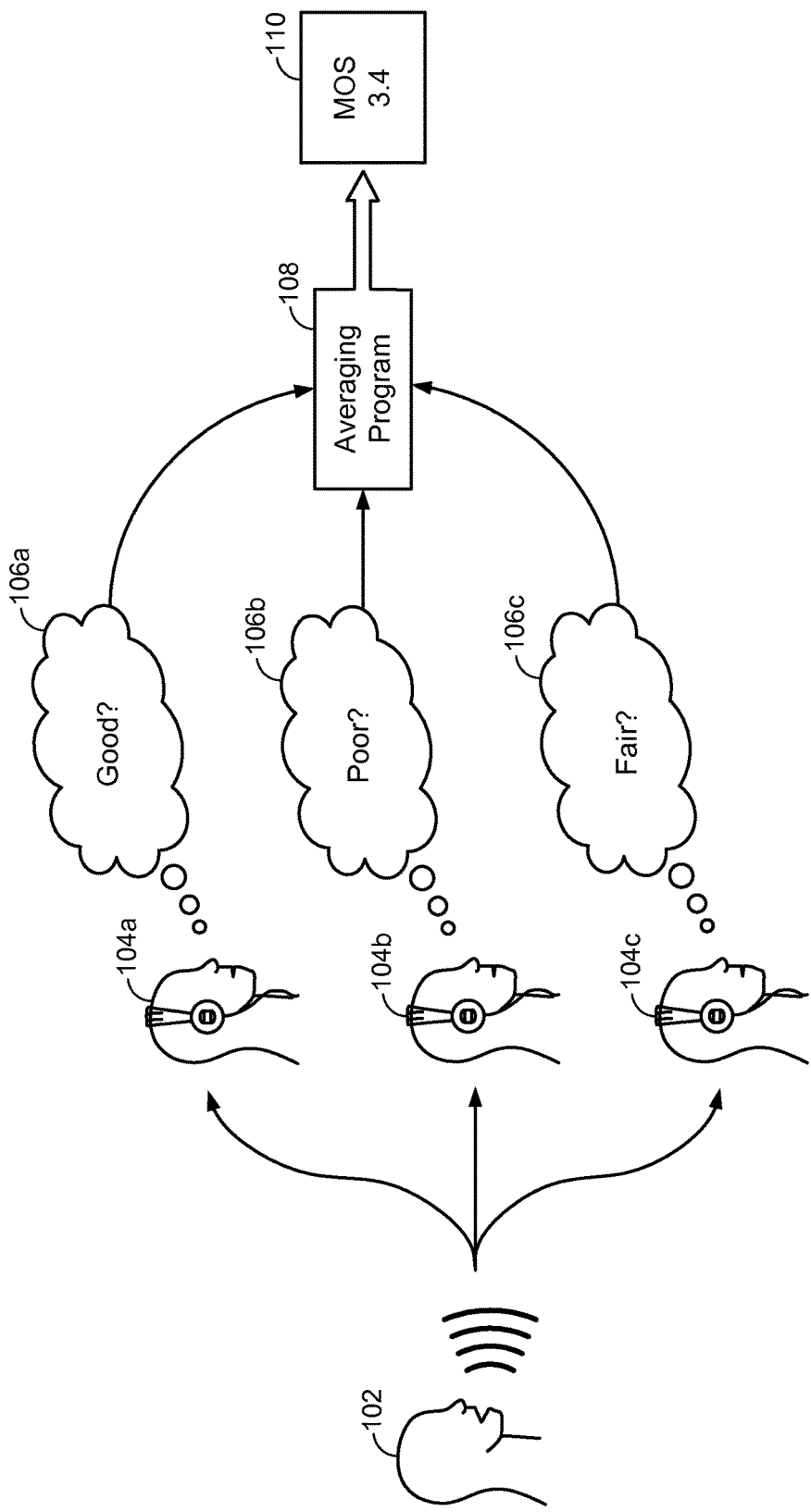
FIG. 1 illustrates a quality analysis using a subjective method.

Some configurations of the systems and methods disclosed herein utilize a hierarchical system of diagnosing speech distortions and overall quality. The quality of speech signals is most accurately measured by human listeners. However, undertaking such an evaluation with multiple listeners is expensive, both in terms of time and money.

Thus, systems and methods (e.g., algorithms, computational systems, etc.) which are able to accurately replicate human listener responses (regarding speech quality) would be beneficial. For example, these systems and methods could replace the requirement for multiple human listeners.

The systems and methods disclosed herein provide a computational engine that emulates the hydro-mechanical function of the human cochlea, its mechanical innervation to the Auditory nerve and the functionality of the inner/outer hair cells. The output of the inner hair cells (from the computational engine), can be used to infer various aspects of human speech perception. The human listening process is highly complex, involving hydromechanics in the cochlea to neural processing the electrically transduced signals (post-cochlear function) in the upper auditory pathway and the Central Nervous System (CNS). Known approaches that have attempted to predict the overall quality (as a uni-dimensional quantity) have failed to cover wide range distortions or achieve high accuracy. For example, the current International Telecommunications Union (ITU) standard Perceptual Objective Listening Quality Assessment (P.OLQA) (P.863 that predicts a mean opinion score (MOS)) is not accurate when estimating quality of speech which have been degraded by systems that P.OLQA was not designed for.

Specifically, the present systems and methods may extract features from the output of a computational model of a human cochlea. The features may then be further analyzed to predict speech quality. Although the features described herein are discussed in the context of predicting speech quality, the features may be used in any suitable application and are not limited to speech quality prediction. The computational model of the cochlea used is a hydro-mechanical physiological model that accurately converts speech signals to inner hair cell responses. Specifically, a functional cochlear model may look at the input and output of the cochlea and attempt to emulate the function of the cochlea without understanding how the cochlea works. In contrast, the physiological cochlear model of the present systems and methods attempts to emulate the specific physiological responses of the cochlea (e.g., the eardrum, ear canal, fluid inside the cochlea, forces/displacement/velocity on various membranes, inner hair cells—and accounting for the physiological properties of these structures such as mass, elasticity and/or frictional characteristics) and where modelling is carried out through fundamental physics and not limited to using approximations such as modeling using electronic circuits like in the work of Heinz, Baumgarte, Meddis or Zwicker to produce the output. Accordingly, applying a physiological cochlear model to predict speech quality is one unique feature of the systems and methods disclosed herein.

Some configurations of the systems and methods disclosed herein utilize a "divide and conquer" strategy. For example, the systems and methods disclosed herein may first attempt to diagnose individual attributes/dimensions (e.g., distortions) of speech quality and then combine these individual attributes to predict overall quality of the signal. For instance, a hierarchical approach may be utilized, where multiple distortion diagnostics are performed first, then foreground and background distortion diagnostics are performed and finally the overall quality is estimated with a computational model.

The systems and methods disclosed herein provide an objective measurement of speech quality. Traditionally, subjective listening tests are performed to determine a mean opinion score (MOS). These subjective listening tests may be money consuming, time consuming and may not be repeatable.

Objective measurement of speech quality may overcome the disadvantages of subjective listening tests. While subjective measures are supposedly the most accurate, objective measures may be utilized to predict the output of subjective measures.

During objective measurement of speech quality testing original speech may be provided to an encoder (e.g., an Enhanced Variable Rate Codec (EVRC) codec). Psychoacoustic analysis may be performed on the original speech and the encoded speech. The results may be compared to estimate a MOS. Examples of this approach include International Telecommunications Union (ITU) standards such as P.861, P.862 and P.863. All three of these attempt to predict results of subjective MOS testing as described in ITU standard P.800.

Noise may be injected into the original speech. The noise-afflicted speech may be provided to an enhancement algorithm (e.g., noise suppressor). Psychoacoustic analysis may be performed on the original speech and the enhanced speech (e.g., noise-suppressed speech). The results may be compared to estimate a MOS. One example of this approach is provided in accordance with the European Telecommunications Standards Institute (ETSI), which attempts to predict results of subjective testing as described in ITU standard P.835.

Known approaches to objective measurement of speech quality may be one-dimensional. However, speech quality is multi-dimensional. One dimension may not be adequate or accurate. For example, current ITU standard P.OLQA (P.863 that predicts MOS) is not completely accurate. It may incorrectly predict MOS for EVRC codecs. One example of this is ITU Q9 WP2 Contribution COM12-C270rev1-E (201110). The systems and methods disclosed herein may provide higher accuracy in predicting MOS compared to known approaches. In some configurations, the systems and methods disclosed herein may be incorporated into anticipated ITU standards (e.g., P.TCA, P.ONRA and P.AMD). Table 1 illustrates some approaches (e.g., standardized and in progress) for measuring speech quality. The systems and methods disclosed herein may be applied to standards that are in progress of standardization.

TABLE 1

| Subjective | Objective | Notes |
| --- | --- | --- |
| MOS | PSQM (Perceptual Speech Quality Measure) PESQ (Perceptual Evaluation of Speech Quality) P.OLQA | Only 1 dimension: overall quality |
| P.835 | P.ONRA (Perceptual Objective Listening Quality Assessment (in progress)) | 3 dimensions: signal/ background/overall qualities |
| P.MULTI | P.AMD (Perceptual Approaches for Multi-Dimensional Analysis) (in progress)) | 4 foreground/2 background qualities |

The systems and methods disclosed herein may be applied to replace one-dimensional speech signal quality testing with the ability to detect multiple independent distortions. Once multi-dimensional 'detectability' is achieved, overall quality may be accordingly predicted. The systems and methods disclosed herein may employ a "divide and conquer" strategy. For example, a novel framework and features (e.g., advanced perceptual features) are provided.

A hierarchical system or structure may be utilized to diagnose speech distortions and overall quality. This may result in improved accuracy of prediction on overall quality. Additional advantages include providing diagnostic information on speech signals, potentially providing diagnostic information on network ailments, providing a possible tool for developing coding/enhancement algorithms and providing real-time feedback on quality.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 illustrates a speech signal quality analysis using a subjective method. The subjective method is an approach to measuring the quality of one or more speech signals based on perceptions of human listeners 104a-c. The subjective model may include a speech signal source 102 providing one or more speech signals to one or more human listeners 104a-c. The one or more human listeners 104a-c may listen to the one or more speech signals and rate the quality of the one or more speech signals based on the human listener's 104a-c perceptions of quality. For example, a human listener 104a may decide that a speech signal's quality is good 106a; another human listener 104b may decide that the same speech signal's quality is poor 106b; a third human listener 104c may decide that the same speech signal's quality is fair 106c. In subjective testing the three ratings would be averaged by an averaging program 108 and given a Mean Opinion Score (MOS) 110 of fair.

The subjective method is difficult to consistently use due to this method being time consuming for both the one or more human listeners 104a-c and a tester. Another potential downside to using this subjective method is the subjective method may be expensive. This subjective method may have the human listeners 104a-c get paid for their time; it may also need a dedicated area for testing to allow the results to be more consistent. The subjective method may also be difficult to obtain repeatable results. Since human listeners 104a-c may have drastic differences when determining the quality of the speech signal. For example, the same speech signal may be used in two different subjective method tests. The first subjective method test may result in the speech signal having a speech signal quality rating of fair and the second subjective method test may result in the same speech signal having a speech signal quality rating of good.

Algorithms or computational systems may be able to accurately replicate the human listener's 104a-c response. This may reduce the money spent on testing. For example, a computational engine that can simulate a human listener's 104a-c perception of speech could be a physiological cochlear model. The physiological cochlear model could predict the overall speech quality of the speech signal using the methods described herein. The physiological cochlear model could replicate hydromechanics in the cochlea and neural processing that is done in an upper auditory pathway and the central nervous system of a human ear. The physiological cochlear model could diagnose individual dimensions of speech quality and then combine these individual attributes to more accurately predict overall speech quality of the speech signal. The use of the physiological cochlear model for speech signal quality analysis may improve prediction of overall quality, provide diagnostic information on the speech signal and provide a possible tool for enhancement algorithms using real time quality feedback.

Figure 2:
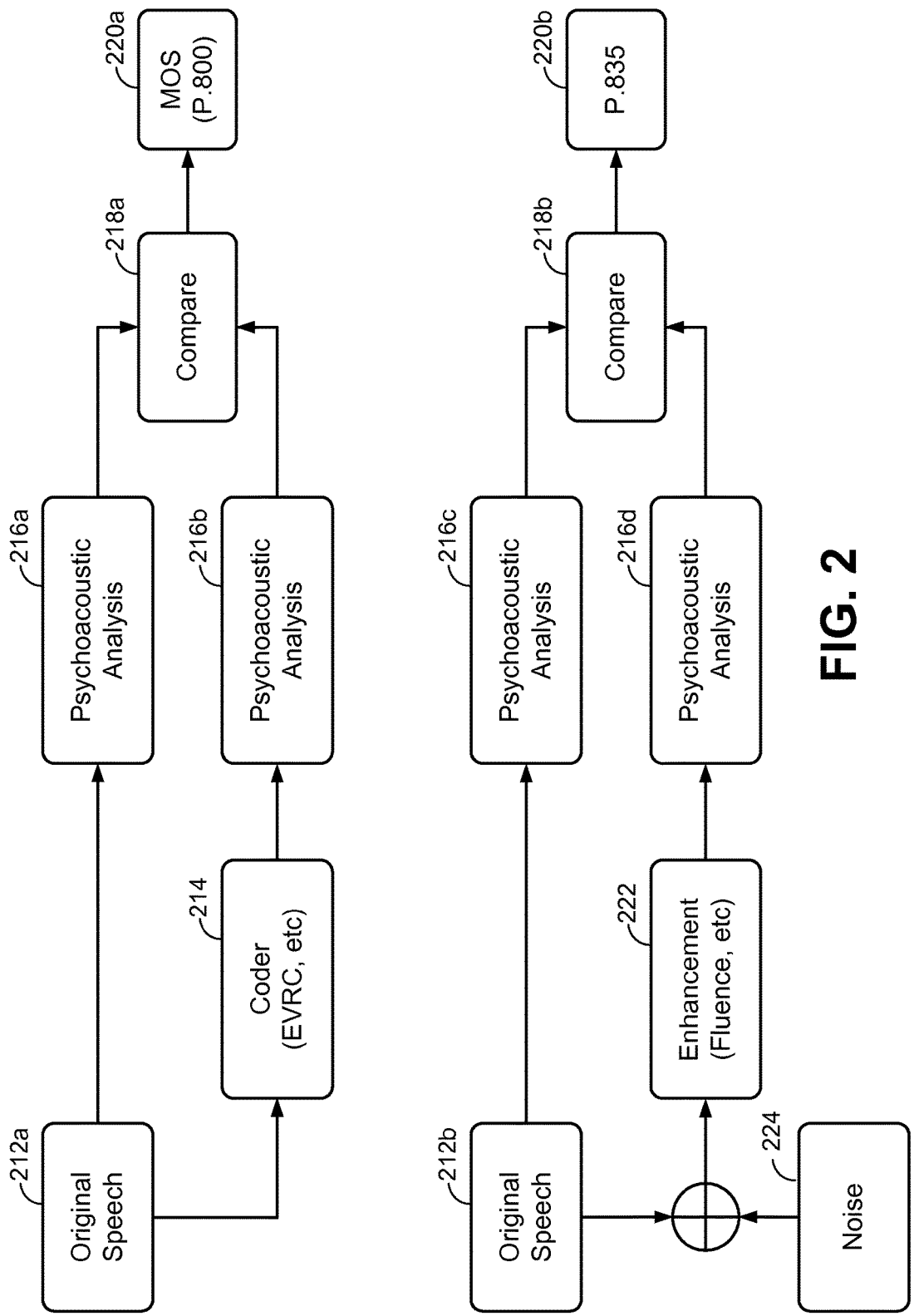
FIG. 2 is a block diagram illustrating two methods for objective determination of a speech signal's quality.

FIG. 2 is a block diagram illustrating two methods for computationally predicting subjective determination of a speech signal's quality—thereby producing an objective score. The original speech signal 212a-b may become a distorted speech signal after passing through a coder 214 and/or enhancement 222, for example. P.835 is an ITU subjective testing standard specifically for signals that have been distorted and then subsequently enhanced using various algorithms. P.800 is an ITU subjective testing standard that is more general in scope than P.835 and is valid for any distorted signals. The two methods show in FIG. 2 may provide an objective score of the distorted speech signal's quality (after coding and/or enhancement 214, 222) based on simulating human auditory perception. The two methods shown yield computational predictions (objective scores) of subjective evaluations using MOS (P.800) and P.835 subjective testing methodologies. Method P.800 yields an overall scored MOS, and method P.835 yields three scores: S-MOS, N-MOS and G-MOS. S-MOS is the score for a foreground quality of a speech signal, N-MOS is the score for a background noise of a speech signal, and G-MOS is the score for an overall quality of a speech signal. Both testing methods may use an intrusive or non-intrusive method.

For clarity, some explanation on the ITU standard on subjective speech quality is given as follows. For a speech signal, P.800 yields only one OVERALL score, called MOS. P.835 yields three scores: S-MOS, N-MOS and G-MOS. S-MOS is the score for foreground/signal only and N-MOS is the score for background/noise quality only. G-MOS is the score for overall quality, which is actually same as MOS in P.800. P.806 (which was finalized into an ITU standard in early 2014) yields 8 scores.

The methods in FIG. 2 may be done using just the distorted speech signal (after coding and/or enhancement 214, 222, for example) or a combination of the distorted/modified speech signal (outputted by a coder 214 or enhancement module 222) and the original speech signal 212a-b (used as a reference to compare against). The former (when the original speech signal 212a-b is not present) is a non-intrusive method while the latter (when both the modified/distorted signal and the original speech signal 212a-b are present) is an intrusive method. The modified speech signal may include changes to the original speech 212a-b signal, including processing. A processed speech signal may be one example of a modified speech signal.

The method predicting MOS score may obtain an original speech 212a signal. The original speech 212a signal may be used as the input for a psychoacoustic analysis 216a which tried to simulate human perception. The original speech 212a signal may also be used as input to a coder 214 to simulate signal compression and other types of signal processing that may be done by a wireless network. The coder 214 may output a modified speech signal and allows the method predicting MOS score to include the non-intrusive method of testing. The modified speech signal may be used as the input for a psychoacoustic analysis 216b which tries to simulate human perception.

Results from the psychoacoustic analysis 216a-b of the original speech signal and the modified speech signal may then be compared 218a. The comparison of the original speech signal and modified speech signal may provide the overall MOS 220a. MOS scoring may range from one to five. A score of one may have a quality of "bad"; two may have a quality of "poor"; three may have a quality of "fair"; four may have a quality of "good"; and five may have a quality of "excellent."

The objective test methodology for evaluating speech signals that include noise suppression algorithms may also obtain an original speech 212b signal and noise 224 for analysis. This method may yield P.835 scores which may include S-MOS, N-MOS and G-MOS scores. The original speech 212b signal and the noise 224 may be used as the input for a psychoacoustic analysis 216c which tries to simulate human auditory perception. The original speech 212b signal and the noise 224 may be used as input to an enhancement module 222. For example, the enhancement module 222 may reduce noise or echo that may be in the original speech 212b signal. The enhancement module 222 may output a modified speech signal and allows the P.835 predicting method to include the non-intrusive method of testing. The modified speech signal may be used as the input for a psychoacoustic analysis 216d which tries to simulate the human auditory perception.

Results from the psychoacoustic analysis 216c-d of the original speech 212b signal and the modified speech signal may then be compared 218b. The comparison of the original speech 212b signal and modified speech signal may provide one or more of the quality ratings of the P.835 220b test. P.835 scoring may have three ratings; S-MOS for foreground speech quality, N-MOS for background noise quality and G-MOS for overall speech quality. All three ratings may range from one to five. A score of one for S-MOS may have a rating of "very distorted"; two may have a rating of "fairly distorted"; three may have a rating of "somewhat distorted"; four may have a rating of "slightly distorted"; and five may have a rating of "not distorted." A score of one for N-MOS may have a rating of "very intrusive"; two may have a rating of "somewhat intrusive"; three may have a rating of "noticeable but not intrusive"; four may have a rating of "slightly noticeable"; and five may have a rating of "not noticeable." A score of one for G-MOS may have a rating of "bad"; two may have a rating of "poor"; three may have a rating of "fair"; four may have a rating of "good"; and five may have a rating of "excellent."

Figure 3:
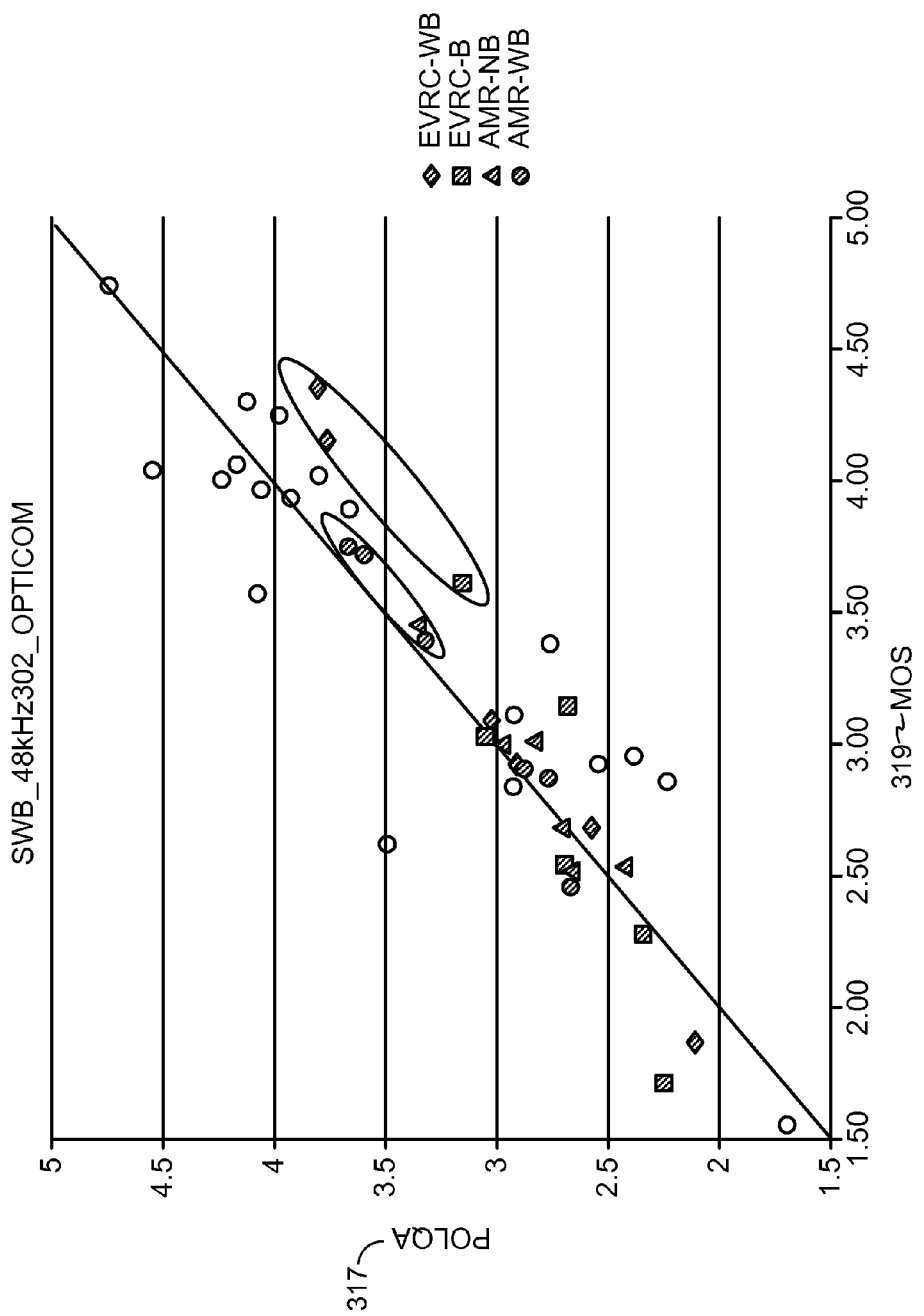
FIG. 3 is a graph illustrating the accuracy of predicting MOS using the current ITU standard of perceptual objective listening quality assessment (P.OLQA)

FIG. 3 is a graph illustrating the accuracy of predicting MOS using the current ITU standard of perceptual objective listening quality assessment (P.OLQA). The X-axis of the graph corresponds to the MOS 319 rating of a speech signal and the Y axis corresponds to the P.OLQA 317 rating of a speech signal. P.OLQA is a standard used to predict the quality of a speech signal through digital analysis.

The graph in FIG. 3 compares the P.OLQA score of a speech signal to the P.800 score (MOS). If the P.OLQA analysis properly predicts a score, that score should match or be close to the MOS of the speech signal. The diagonal line in the graph indicates where a point should be if the P.OLQA score and the MOS are close.

The graph in FIG. 3 indicates that the current P.OLQA analysis is not always in line with the MOS rating of speech signals. Typically the P.OLQA rating of a speech signal that has gone through enhanced variable rate CODEC (EVRC) modification may be under predicted as shown in the graph. The EVRC modified speech signal results are shown as diamonds and squares.

Figure 4:
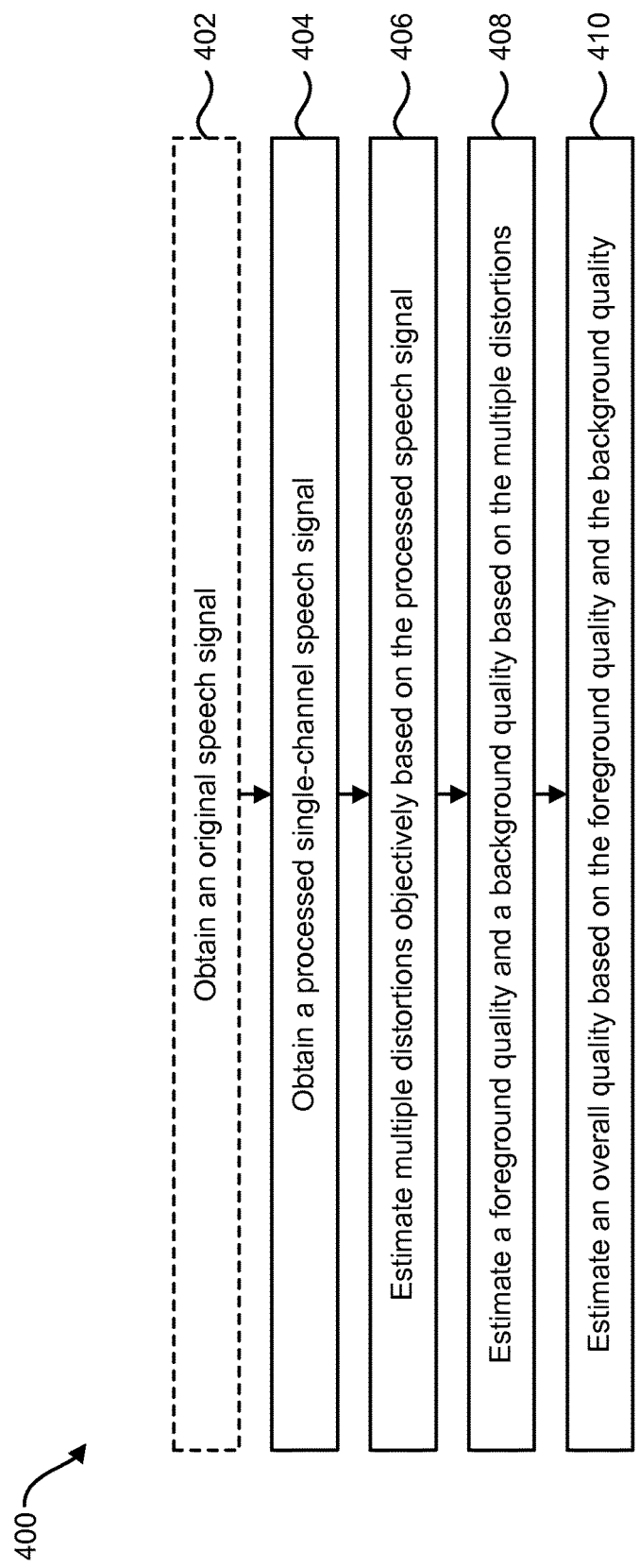
FIG. 4 is a flow diagram illustrating one configuration of a method for measuring speech signal quality.

FIG. 4 is a flow diagram illustrating one configuration of a method 400 for measuring speech signal quality. The method 400 may be performed by an electronic device. Examples of the electronic device include mobile devices (e.g., smartphones, cellular phones, tablet devices, laptop computers, etc.), desktop computers, Personal Digital Assistants (PDA), appliances, televisions, gaming systems and servers (e.g., a server included in a network device). An electronic device may optionally obtain 402 an original speech signal. For example, the electronic device may capture a speech signal with one or more microphones or may receive the speech signal from another device (e.g., storage device, computer, phone, headset, etc.). The original speech signal may be a raw or unmodified signal. For example, the original speech signal may be an electronically sampled version of a speech signal that has not been encoded and/or compressed. Approaches where the original speech signal is obtained may be referred to as intrusive approaches or methods. For example, intrusive approaches may include an explicit subtraction between the original speech signal and the modified speech signal (e.g., distorted speech signal). In other approaches, the original speech signal may not be obtained. These approaches may be referred to as non-intrusive approaches or methods. In non-intrusive approaches, for example, the original speech signal may not be available (e.g., there may not be an explicit subtraction between the modified speech signal and the original speech signal). For instance, the method 400 may be performed without obtaining the original speech signal in some implementations and/or scenarios. Specifically, the features may be especially amenable to predicting quality when no 'original' or 'clean' signal is available for a comparison. Such systems which do not require the original/clean signal are known as non-intrusive systems. As described above, the computational model of the cochlea may be a hydro-mechanical model that accurately converts speech signals to Inner Hair Cell responses. Accordingly, non-intrusive features may be extracted from the Cochlear Model for speech and audio signal analysis in a perceptual domain. Other similar models can also be used.

In some configurations, the electronic device may process the original speech signal to obtain the modified speech signal. For example, the electronic device may encode the original speech signal (and/or decode the resulting encoded speech signal, for example) to obtain the modified speech signal. Additionally or alternatively, the electronic device may enhance the original speech signal to obtain the modified speech signal. For example, the electronic device may perform noise suppression on a noise-injected version of the original speech signal. The electronic device may obtain 404 a modified single-channel speech signal. A "single-channel" speech signal may represent the speech signal as a single sample (of the pressure, for example) at any one time. For example, the modified single-channel speech signal may not contain multiple signals that provide spatially distinguishing information. In some configurations, for example, the modified single-channel speech signal may be based on an original speech signal that was captured with a single microphone.

In other configurations, the electronic device may obtain the modified speech signal from another device (e.g., storage device, computer, phone, headset, encoder, etc.). For example, the electronic device may receive the modified speech signal from a networked electronic device.

The modified speech signal may be based on the original speech signal. For example, the modified speech signal may be a distorted version of the original speech signal. Enhancing, encoding, decoding, noise suppression, expansion and compression of the original speech signal may distort the original speech signal such that one or more characteristics of the modified speech signal are different from those of the original speech signal.

In some configurations, the electronic device may process the modified speech signal using a physiological model (e.g., physiological cochlear model) as described herein. Processing the modified speech signal using the physiological model may more accurately approximate the processing performed by the human auditory system (than a functional model, for example). This may help to more accurately estimate speech signal quality as perceived by a human listener. For example, processing the modified speech signal using a physiological model may provide inner-hair cell data. The difference between the inner hair cell data and basilar membrane data is inner hair cell data is collected from a later data collection point in the human auditory system than the basilar membrane data—and is therefore subject to further processing beyond what is found at the basilar membrane. Most functional models primarily approximate Basilar membrane response and a few other functional models go on to approximate inner hair cell response—in a serial manner but none of these functional models treat the complete cochlea (physiological structures, fluid etc.) system in a holistic manner where each part of the physiological constituents are dependent on each other in a feed-forward and feed-back fashion. The systems and methods disclosed herein may be applied using the inner hair cell data, basilar membrane data or both data types.

The electronic device may estimate 406 multiple objective distortions based on the modified speech signal. For example, an objective distortion may be one or more metrics that represent distortions in the modified speech signal (e.g., differences between the original speech signal and the modified speech signal). In some implementations, the electronic device may estimate the multiple objective distortions additionally based on the original speech signal. For instance, one or more of the multiple objective distortions may be based on the modified speech signal, original speech signal or both the modified speech signal and the original speech signal. The multiple objective distortions may be estimated in parallel in some approaches, for example.

In some configurations, each of the multiple objective distortions may represent an independent dimension of speech quality. For example, each of the distortions may be approximately uncorrelated with each other in accordance with human listener feedback. For instance, human listeners may detect separate distortions in speech signals. In other words, given many descriptors to describe distortions, human listeners tend to assign similar scores to correlated dimensions of speech quality. In one example, human listeners are given the descriptors "rough," "harsh," "fluttering," "discontinuous," "dull," "muffled," "distant," "thin," "hissing," "rushing," "roaring," "bubbling," "intermittent" and "variable" to describe distortions. In this example, human listeners tend to assign similar scores to "rough" and "harsh;" to "fluttering" and "discontinuous;" to "dull" and "muffled;" to "distant" and "thin;" to "hissing," "rushing" and "roaring;" and to "bubbling," "intermittent" and "variable." Accordingly, these descriptors can be grouped into uncorrelated or independent dimensions of speech quality.

In some configurations, a "roughness" distortion may correspond to the "rough" and "harsh" descriptors. Roughness of the speech signal may be a fast temporally localized degradation of the speech signal. Roughness may be a temporal foreground distortion. A "discontinuity" distortion may correspond to the "fluttering" and "discontinuous" descriptors. Discontinuity of the speech signal may be a slow temporally localized degradation of the speech signal. Discontinuity may be a temporal foreground distortion. A "dullness" distortion may correspond to the "dull" and "muffled" descriptors. Dullness of the speech signal may be degradation in a high frequency band of the speech signal. Dullness may be a spectral (e.g., frequency) foreground distortion. A "thinness" distortion may correspond to the "distant" and "thin" descriptors. Thinness of the speech signal may be degradation in a low frequency band of the speech signal. Thinness may be a spectral foreground distortion. A "hissing" distortion may correspond to the "hissing," "rushing" and "roaring" descriptors. Hissing of the speech signal may be degradation due to a level of background noise in the speech signal. A "variability" distortion may correspond to the "bubbling," "intermittent" and "variable" descriptors. Variability of the speech signal may be degradation due to a variability of noise in the speech signal. Each of these distortions may represent independent dimensions of speech quality. Each of the multiple objective distortions may be rated and provided a score. The score may indicate the level of distortion each of the multiple objective distortions may cause to the speech signal. It should be noted that other terms may be used for the independent dimensions of speech quality. For example, ITU standard P.806 provides a Perceptual Quality (PQ) scale that closely corresponds to the multiple objective distortions. The PQ scale includes S-FLT, S-RUF, S-LFC, S-HFC, B-LVL and B-VAR. S-FLT relates to slow-varying degradation in the speech signal (discontinuity). S-RUF relates to fast varying degradation in the speech signal (Roughness). S-LFC relates to degradation of low frequency coloration in the speech signal (Dullness). S-HFC relates to degradation of high frequency coloration in the speech signal (Thinness). B-LVL relates to degradation due to the level of background noise in the speech signal (Hissing). B-VAR relates to degradation due to the variability of the background noise in the speech signal (Variability). It may also be noted that P.806 includes a LOUD score for loudness and an OVRL is score for overall quality. OVRL may be the same as MOS in P.800 and G-MOS in P.835.

In some configurations, the multiple objective distortions may include at least one foreground distortion and/or at least one background distortion. For example, the multiple objective distortions may include four foreground distortions and two background distortions. The four foreground distortions may include "roughness," "discontinuity," "dullness" and "thinness." The two background distortions may include "hissing" and "variability." Foreground distortions may be distortions of the speech signal due to degradation of the speech in the speech signal. Background distortions may be distortions of the speech signal due to noise found in the speech signal. Accordingly, the systems and methods disclosed herein may utilize both temporal and spectral distortions.

The electronic device may estimate 408 a foreground quality and a background quality based on the multiple objective distortions. The foreground distortions may be received by a computational foreground quality estimator and then the computational foreground quality estimator may calculate foreground quality of the speech signal using the methods and procedures described herein. The foreground quality is a metric that indicates a quality of the modified speech signal corresponding to the foreground distortions, which may correspond to the S-MOS score of ITU standard P.835. The background distortions may be received by a computational background quality estimator and then the computational background quality estimator may calculate background quality of the speech signal using the methods and procedures described herein. The background quality is a metric that indicates a quality of the modified speech signal corresponding to the background distortions, which may correspond to the N-MOS score of ITU P.835.

The electronic device may estimate 410 an overall quality based on the foreground quality and the background quality. For example, the electronic device may generate a metric that estimates an overall quality of the modified speech signal using the methods and procedures disclosed herein. This overall quality may be an objective measure based on the foreground quality and the background quality. This overall quality may also approximate subjective measures of speech quality. For example, the overall quality may approximate a Mean Opinion Score (MOS) of subjective listeners. For instance, the overall quality may approximate subjective measures taken in accordance with International Telecommunication Union (ITU) standards P.800, and/or P.835 and/or P.806.

In some configurations, estimating the overall quality may further be based directly on the multiple objective distortions. For example, the electronic device may estimate the overall quality based directly on the multiple objective distortions (rather than only indirectly based on the multiple objective distortions via the foreground quality and the background quality, for example) in addition to the foreground quality and background quality. In other words, the overall quality may be based on the foreground quality, background quality, roughness score, discontinuity score, dullness score, thinness score, hissing score and variability score. In other words, if the overall quality is based on the foreground quality, background quality, roughness score, discontinuity score, dullness score, thinness score, hissing score and variability score, the overall quality may be contingent upon these different factors.

The overall quality may be applied in one or more ways. For example, the overall quality may be utilized to evaluate quality of an encoder, an encoder/decoder (e.g., codec) and/or a noise suppressor (e.g., noise suppression algorithm). In some configurations, the overall quality may be utilized to automatically adjust network and/or device settings for communication systems (e.g., cellular telephone networks) to improve voice quality. The overall quality may be utilized to design encoders, encoders/decoders (e.g., codecs) and/or noise suppressors (e.g., noise suppression algorithms). For example, the overall quality may be used to test certain operating parameters to compare decoding, encoding and noise suppression.

The systems and methods disclosed herein may provide an objective measure of overall quality that approximates subjective measures. Some of the benefits of the systems and methods disclosed herein include cost reduction. For example, overall quality may be estimated more quickly and without human listeners. Additionally, the overall quality estimates herein may be repeatable, whereas subjective methods may not provide consistent results. The overall quality estimates determined in accordance with the systems and methods disclosed herein may be based on multiple objective distortions (e.g., multiple dimensions of speech quality), whereas other objective approaches are uni-dimensional. Accordingly, the overall quality estimates in accordance with the systems and methods disclosed herein may more accurately approximate subjective measures (e.g., MOS) than other objective approaches (e.g., the ITU standard P.863 (P.OLQA)).

Measuring the speech signal quality (as described in connection with FIG. 4) may be performed in accordance with a hierarchical structure. The hierarchical structure may include a plurality of hierarchical levels, where each hierarchical level depends on any and each relatively lower hierarchical level. For example, the plurality of hierarchical levels may include three levels. A first hierarchical level (e.g., a lowest hierarchical level) may include estimating the multiple objective distortions. A second hierarchical level may include estimating the foreground quality and the background quality. A third hierarchical level (e.g., a highest hierarchical level) may include estimating the overall quality. Accordingly, the second hierarchical level may be based on the first hierarchical level and the third hierarchical level may be based on the second hierarchical level and (at least indirectly based on) the first hierarchical level. Thus, the foreground quality and the background quality are estimated based on the multiple objective distortions and the overall quality is estimated based on the foreground quality and the background quality.

Using multiple hierarchical levels in accordance with the systems and methods disclosed herein may create improvements in the ability to diagnose and resolve problems with the transmission of the speech signal. For example, if the speech signal quality is acceptable the overall quality is provided and is a single point of data to verify. However, if the speech signal quality is not acceptable the speech signal can be further analyzed using foreground quality data and background quality data. If the background quality data indicates the background quality is not acceptable, immediately the four multiple objective distortions that correspond to the foreground quality are ruled out. The speech signal can then be further analyzed using the multiple objective distortions that correspond to the background quality.

It should be noted that measuring the speech signal quality (and/or one or more procedures included therein) as provided by the systems and methods disclosed herein may be predictive in nature. For example, "estimating" an overall quality may include predicting what a subjective quality measure (e.g., MOS) would be if a subjective listening test were actually performed. It should also be noted however that listening tests are not necessary in accordance with the systems and methods disclosed herein. In other words, the systems and methods disclosed herein may be performed without a subjective listening test to compare objective results to.

Figure 5:
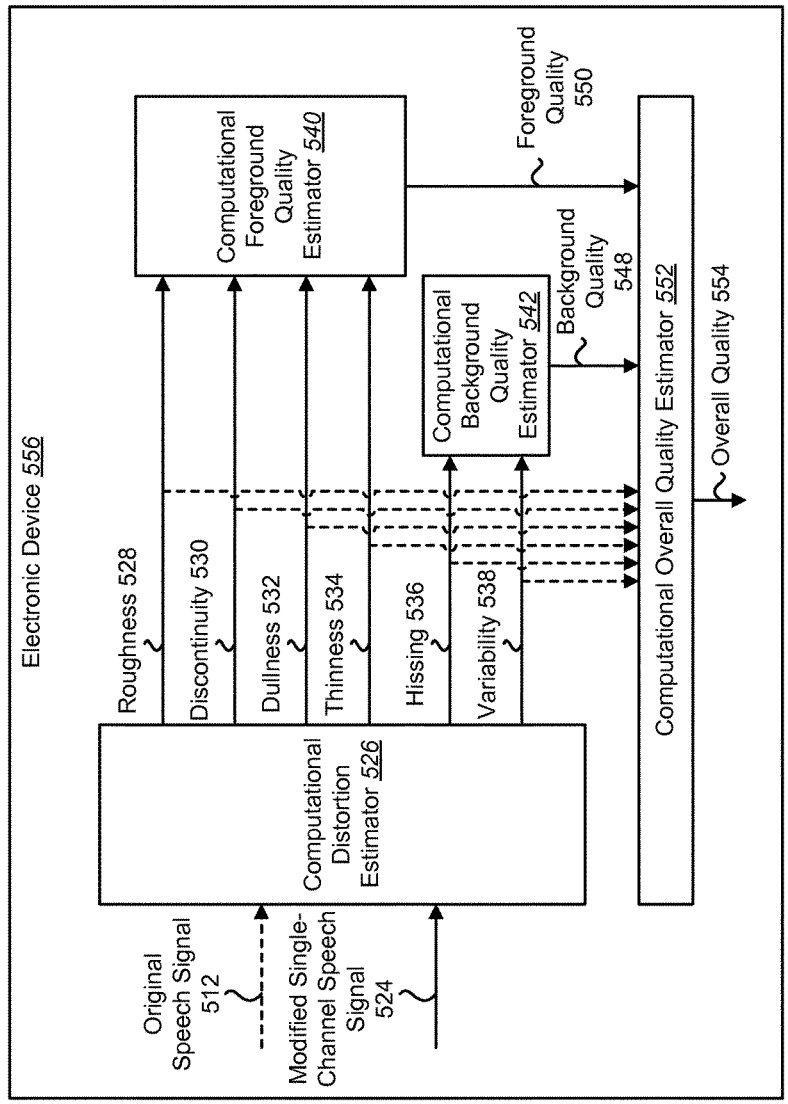
FIG. 5 is a block diagram illustrating one configuration of an electronic device configured for measuring speech signal quality.

FIG. 5 is a block diagram illustrating one configuration of an electronic device 556 configured for measuring speech signal quality. The electronic device could perform one or more of the procedures of the method 400 described in connection with FIG. 4. The electronic device 556 includes a computational distortion estimator 526 coupled with an optional computational foreground quality estimator 540 and an optional computational background quality estimator 542 and/or a computational overall quality estimator 552. When hardware is coupled the components are either directly or indirectly connected. For example, if a first component is coupled to a second component the components could either have a direct link or intervening components in the link may exist. The electronic device 556 and/or one or more components thereof may be implemented in hardware (e.g., circuitry), software or a combination of both. Examples of the electronic device 556 include mobile devices (e.g., smartphones, cellular phones, tablet devices, laptop computers, etc.), servers (e.g., a server included in a network device) and soft-phone devices (e.g. Skype, FaceTime etc.).

The electronic device 556 (and/or the computational distortion estimator 526, for example) may obtain a modified single-channel speech signal 524. In some implementations and/or scenarios, the electronic device 556 may additionally obtain an original speech signal 512. In other implementations and/or scenarios, the electronic device 556 may not obtain an original speech signal 512. This may be accomplished as described above in connection with FIG. 4.

The computational distortion estimator 526 may estimate multiple objective distortions based on the modified single-channel speech signal 524 (and/or optionally based on the original speech signal 512). The distortions are objective because a listener does not subjectively evaluate the distortion. In some implementations and/or scenarios (e.g., in non-intrusive approaches), the computational distortion estimator 526 may estimate the multiple objective distortions without the original speech signal 512. This may be accomplished as described above in connection with FIG. 4. For example, the computational distortion estimator 526 may estimate roughness 528, discontinuity 530, dullness 532, thinness 534, hissing 536 and/or variability 538 based on the modified single-channel speech signal 524 and/or the original speech signal 512. The computational distortion estimator 526 may utilize a computational algorithm to perform the objective distortion estimates. This may be "objective" because subjective human listener(s) do not determine the distortion estimates.

In some configurations, one or more of the multiple objective distortions may be provided to a computational foreground quality estimator 540. This may be accomplished as described above in connection with FIG. 4. For example, the roughness 528, discontinuity 530, dullness 532 and thinness 534 distortions may be provided to the computational foreground quality estimator 540. The computational foreground quality estimator 540 may estimate a foreground quality 550 based on the multiple objective distortions (e.g., roughness 528, discontinuity 530, dullness 532 and thinness 534 distortions). The foreground quality 550 may be provided to the computational overall quality estimator 552.

In some configurations, one or more of the multiple objective distortions may be provided to a computational background quality estimator 542. This may be accomplished as described above in connection with FIG. 4. For example, the hissing 536 and variability 538 distortions may be provided to the computational background quality estimator 542. The computational background quality estimator 542 may estimate a background quality 548 based on the multiple objective distortions (e.g., hissing 536 and variability 538 distortions). The background quality 548 may be provided to the computational overall quality estimator 552.

The computational overall quality estimator 552 may estimate an overall quality 554 based on the foreground quality 550 and the background quality 548. This may be accomplished as described above in connection with FIG. 4. For example, the computational overall quality estimator 552 may estimate an overall quality 554 based on the foreground quality 550 and the background quality 548. In another example, the computational overall quality estimator 552 may estimate the overall quality 554 based directly on the roughness 528, discontinuity 530, dullness 532, thinness 534, hissing 536 and/or variability 538 distortions in addition to the foreground quality 550 and the background quality 548. It should be noted that the electronic device 556 may measure the speech signal quality in accordance with a hierarchical structure as described in connection with FIG. 4.

Figure 6:
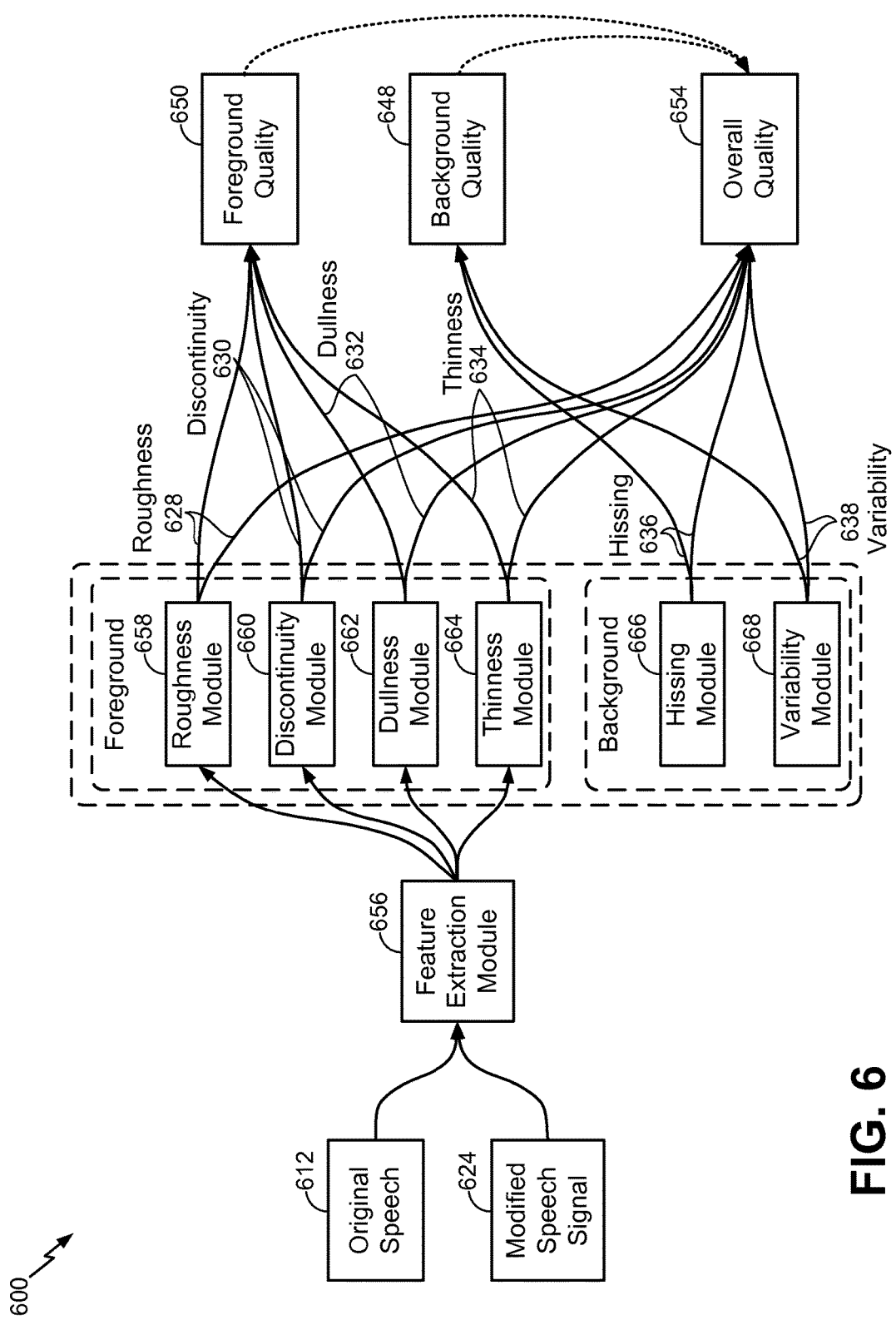
FIG. 6 is a block diagram illustrating one example of a hierarchical structure that may be implemented in accordance with the systems and methods disclosed herein.

FIG. 6 is a block diagram illustrating one example of a hierarchical structure 600 that may be implemented in accordance with the systems and methods disclosed herein. The hierarchical structure 600 illustrated in FIG. 6 is one example of an intrusive approach. In some configurations, features may be extracted 656 from the original speech signal 612 and the modified speech signal 624. For example, the original speech signal 612 and the modified speech 624 signal may be provided to a cochlear modeler that models human cochlea. The cochlear model modifies the original speech signal 612 and the modified speech signal 624 to approximate the effects of human cochlea in auditory processing.

In this hierarchical structure 600, multiple objective distortions may be estimated based on the original speech signal 612 (e.g., cochlear modeled original speech signal) and modified speech signal 624 (e.g., cochlear modeled modified speech signal). In one example, the distortions may include roughness 628, discontinuity 630, dullness 632, thinness 634, hissing 636 and/or variability 638 distortions. As described above, the roughness 628 distortion may correspond to the "rough" and "harsh" descriptors. The roughness 628 distortion may be determined by a roughness module 658. The discontinuity 630 distortion may correspond to the "fluttering" and "discontinuous" descriptors. The discontinuity 630 distortion may be determined by a discontinuity module 660. The dullness 632 distortion may correspond to the "dull" and "muffled" descriptors. The dullness 632 distortion may be determined by a dullness module 662. The thinness 634 distortion may correspond to the "distant" and "thin" descriptors. The thinness 634 distortion may be determined by a thinness module 664. The hissing 636 distortion may correspond to the "hissing," "rushing" and "roaring" descriptors. The hissing 636 distortion may be determined by a hissing module 666. The variability 638 distortion may correspond to the "bubbling," "intermittent" and "variable" descriptors. The variability 638 distortion may be determined by a variability module 668.

The roughness 628, discontinuity 630, dullness 632 and thinness 634 distortions may be categorized as foreground distortions. The hissing 636 and variability 638 distortions may be categorized as background distortions. As described above, a foreground quality 650 may be optionally estimated based on the roughness 628, discontinuity 630, dullness 632 and thinness 634 distortions. Furthermore, a background quality 648 may be optionally estimated based on the hissing 636 and variability 638 distortions.

As illustrated in the structure, the overall quality 654 may be based directly on the foreground quality 650 and the background quality 648. Optionally, the overall quality 654 may be based directly on the multiple objective distortions in addition to the foreground quality 650 and background quality 648.

The objective scores of individual distortions may be synthesized to two overall scores: one for foreground quality 650 and the other for background quality 648. For example, the foreground quality 650 may be denoted signal quality (SIG, SGN) and a background quality 648 may be denoted as background quality 436 (BGN).

The foreground quality 650 and background quality 648 scores may be synthesized to one final overall quality 654 score. The overall quality 654 may be denoted as overall quality 654 (MOS). Some possible synthesis approaches are given as (but not limited to): linear regression (e.g., $MOS = b_2*SIG + b_1*BGN + b_0$) or non-linear regression (e.g., $MOS = b_4*SGN^2 + b_3*SGN + b_2*BGN^2 + b_1*BGN + b_0$).

The systems and methods disclosed herein may provide three levels of objective scores for each speech signal under test, which may provide more details on speech quality distortions, such as high frequency distortions and level of background noise. Additionally, the systems and methods disclosed herein may make the development of algorithms easier. For example, developers can focus on certain types of attributes/distortions and therefore reduce the range of factors to explore. The systems and methods disclosed herein may also provide improved accuracy of prediction on overall quality 654. When synthesized from several individual scores, for example, the prediction of overall quality 654 can be more accurate than predicting it directly based on single scores.

The hierarchical structure 600 may be implemented by an electronic device 556, such as a wireless communication device, also known as a mobile device, mobile station, subscriber station, client, client station, user equipment (UE), remote station, access terminal, mobile terminal, terminal, user terminal, subscriber unit, etc. Other examples of electronic devices 556 include laptops or desktop computers, cellular phones, smart phones, wireless modems, e-readers, tablet devices, gaming systems, etc. Furthermore, the present systems and methods may be used on a base station, an electronic device 556 performing adaptive noise cancellation, etc.

The overall quality 654 that is determined by the hierarchical structure 600 may simulate human subjective scores for a given portion of speech. In other words, the hierarchical structure 600 may determine the overall quality 654 based on trained data instead of requiring human listeners 140a-c to provide subjective scores in real time. To do this, the hierarchical structure 600 may use an extraction of features 656 from the modified speech signal or the original speech signal 612 to separate the different distortions. The features may be used to determine a prediction score for each of the multiple objective distortion dimensions.

Figure 7:
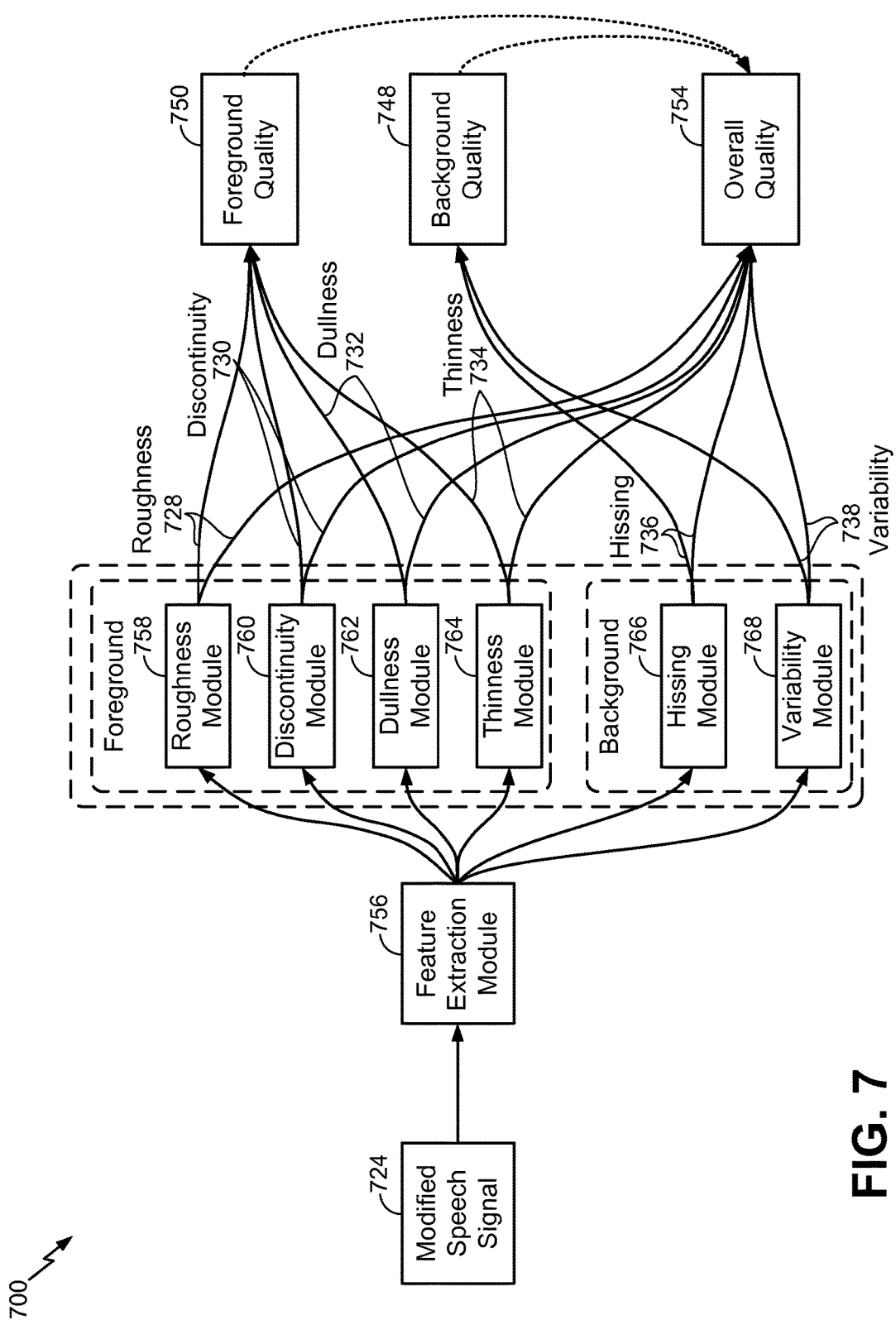
FIG. 7 is a block diagram illustrating another example of a hierarchical structure that may be implemented in accordance with the systems and methods disclosed herein.

FIG. 7 is a block diagram illustrating another example of a hierarchical structure 700 that may be implemented in accordance with the systems and methods disclosed herein. The hierarchical structure 700 illustrated in FIG. 7 is one example of a non-intrusive approach. The elements described in this example may be similar to corresponding elements as described in connection with FIG. 6. In this example, however, the features may be extracted and the distortions may be determined based on the modified speech signal 724 (without the original speech signal 612, for instance).

In this hierarchical structure 700, multiple objective distortions may be estimated based on the modified speech signal 724 (e.g., cochlear modeled modified speech signal). In one example, the distortions may include roughness 728, discontinuity 730, dullness 732, thinness 734, hissing 736 and/or variability 738 distortions. As described above, the roughness 728 distortion may correspond to the "rough" and "harsh" descriptors. The roughness 728 distortion may be determined by a roughness module 758. The discontinuity 730 distortion may correspond to the "fluttering" and "discontinuous" descriptors. The discontinuity 730 distortion may be determined by a discontinuity module 760. The dullness 732 distortion may correspond to the "dull" and "muffled" descriptors. The dullness 732 distortion may be determined by a dullness module 762. The thinness 734 distortion may correspond to the "distant" and "thin" descriptors. The thinness 734 distortion may be determined by a thinness module 764. The hissing 736 distortion may correspond to the "hissing," "rushing" and "roaring" descriptors. The hissing 736 distortion may be determined by a hissing module 766. The variability 738 distortion may correspond to the "bubbling," "intermittent" and "variable" descriptors. The variability 738 distortion may be determined by a variability module 768.

The roughness 728, discontinuity 730, dullness 732 and thinness 734 distortions may be categorized as foreground distortions. The hissing 736 and variability 738 distortions may be categorized as background distortions. As described above, a foreground quality 750 may be optionally estimated based on the roughness 728, discontinuity 730, dullness 732 and thinness 734 distortions. Furthermore, a background quality 748 may be optionally estimated based on the hissing 736 and variability 738 distortions.

As illustrated in the structure, the overall quality 754 may be based directly on the foreground quality 750 and the background quality 748. Optionally, the overall quality 754 may be based directly on the multiple objective distortions in addition to the foreground quality 750 and background quality 748.

The objective scores of individual distortions may be synthesized to two overall scores: one for foreground quality 750 and the other for background quality 748. For example, the foreground quality 750 may be denoted signal quality (SIG, SGN) and a background quality 748 may be denoted as background quality 436 (BGN).

The foreground quality 750 and background quality 748 scores may be synthesized to one final overall quality 754 score. The overall quality 754 may be denoted as overall quality 754 (MOS). Some possible synthesis approaches are given as (but not limited to): linear regression (e.g., $MOS=b_2*SIG+b_1*BGN+b_0$) or non-linear regression (e.g., $MOS=b_4*SGN^2+b_3*SGN+b_2*BGN^2+b_1*BGN+b_0$).

The systems and methods disclosed herein may provide three levels of objective scores for each speech signal under test, which may provide more details on speech quality distortions, such as high frequency distortions and level of background noise. Additionally, the systems and methods disclosed herein may make the development of algorithms easier. For example, developers can focus on certain types of attributes/distortions and therefore reduce the range of factors to explore. The systems and methods disclosed herein may also provide improved accuracy of prediction on overall quality 754. When synthesized from several individual scores, for example, the prediction of overall quality 754 can be more accurate than predicting it directly based on single scores.

The hierarchical structure 700 may be implemented by an electronic device 556, such as a wireless communication device, also known as a mobile device, mobile station, subscriber station, client, client station, user equipment (UE), remote station, access terminal, mobile terminal, terminal, user terminal, subscriber unit, etc. Other examples of electronic devices 556 include laptops or desktop computers, cellular phones, smart phones, wireless modems, e-readers, tablet devices, gaming systems, etc. Furthermore, the present systems and methods may be used on a base station, an electronic device 556 performing adaptive noise cancellation, etc.

The overall quality 754 that is determined by the hierarchical structure 700 may simulate human subjective scores for a given portion of speech. In other words, the hierarchical structure 700 may determine the overall quality 754 based on trained data instead of requiring human listeners 140a-c to provide subjective scores in real time. To do this, the hierarchical structure 700 may use an extraction of features 756 from the modified speech signal or the original speech signal 712 to separate the different distortions. The features may be used to determine a prediction score for each of the multiple objective distortion dimensions.

Figure 8:
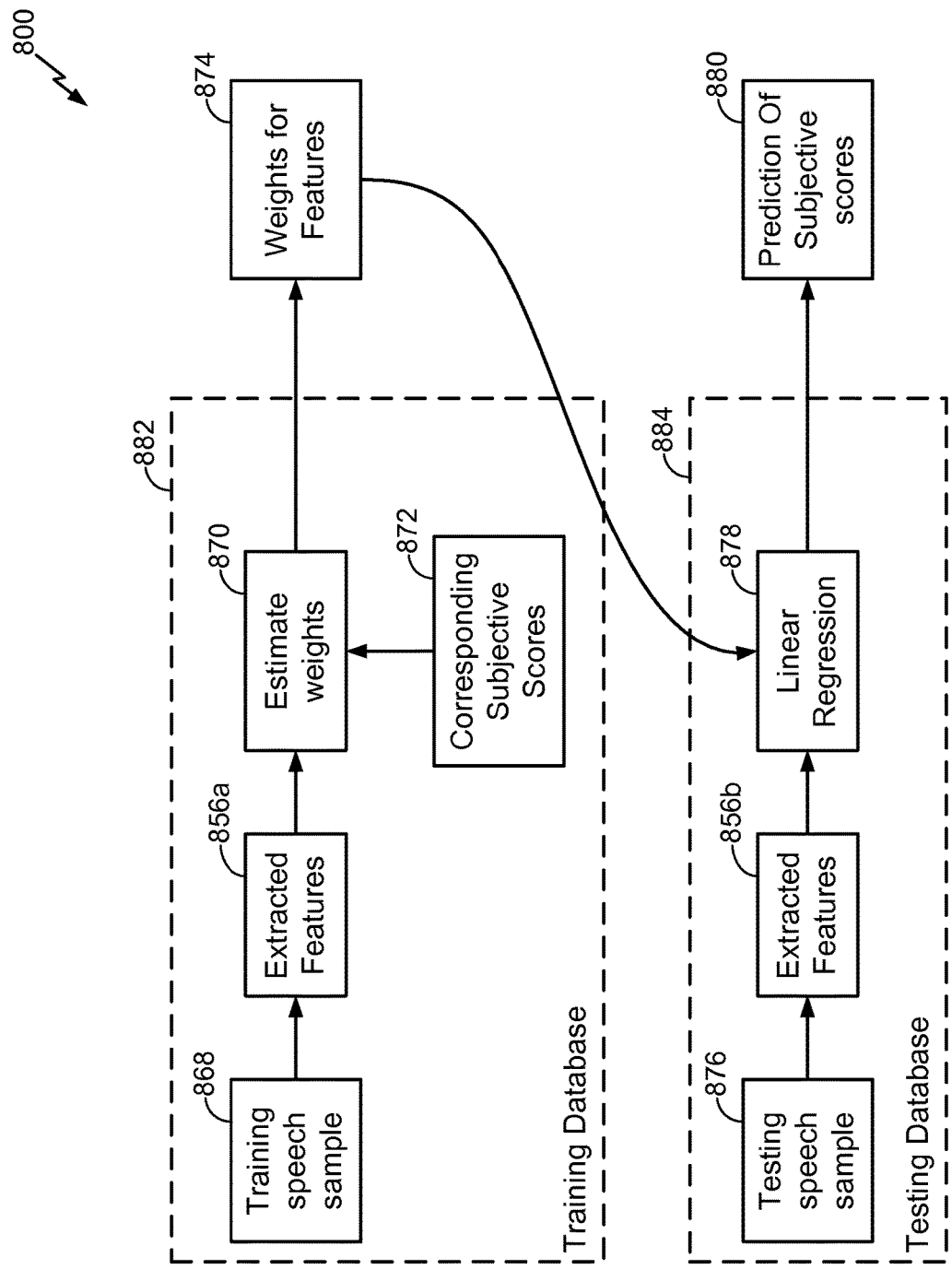
FIG. 8 is a block diagram illustrating prediction of one single dimension of subjective quality measurement scores based on extracted features and training speech samples.

FIG. 8 is a block diagram illustrating a method 800 for prediction of one single dimension of subjective quality measurement scores based on extracted features 856a and one or more training speech samples 868. A training database 882 may include one or more training speech samples 868 from which features are extracted 856a. The training database 882 may also include corresponding subjective scores 872 for the one or more training speech samples 868. These may be collected using the subjective human listener method, i.e., where many human listeners 104a-c are each asked to listen to the one or more training speech samples 868 and then asked to rate the one or more training speech samples 868 in one or more categories. In one configuration, the training database 882 may include scores for the one or more training speech samples 868 in each of the distortion dimensions illustrated in FIG. 5, i.e., roughness 528, discontinuity 530, dullness 532, thinness 534, hissing 536 and variability 538. Furthermore, the training database 882 may have one or more training speech samples 868 for many different conditions (e.g., different codecs, different network technologies, different modulation schemes, etc.) along with corresponding subjective scores 872.

Estimate weights 870 may then be estimated based on the extracted features 856a from the one or more training speech samples 868 and the corresponding subjective scores 872. In other words, estimate weights 870 may be determined that would cause the extracted features 856a from the one or more training speech samples 868 to produce the estimate weights 870 that correspond to the one or more training speech samples 868. This training may be performed offline before the computational overall quality estimator 540 (as illustrated in FIG. 5, for example) determines an overall quality 554 for a portion of the original speech signal 512.

The weights for features 874 may then be applied to extracted features 856b from one or more testing speech samples 876 (i.e., original speech 512 or degraded speech for which an overall quality 554 is desired), e.g., using a linear regression 878 algorithm. The one or more testing speech samples 876 may be located in a testing database 884. In one configuration, a set of weights for features 874 may be determined from training data for each of the distortion dimensions, i.e., roughness 528, discontinuity 530, dullness 532, thinness 534, hissing 536 and variability 538. Therefore, a prediction of subjective scores 880 for a particular dimension may be determined by applying the weights for features 874 for a particular distortion dimension to the extracted features 856b of the testing speech samples 876.

Figure 9:
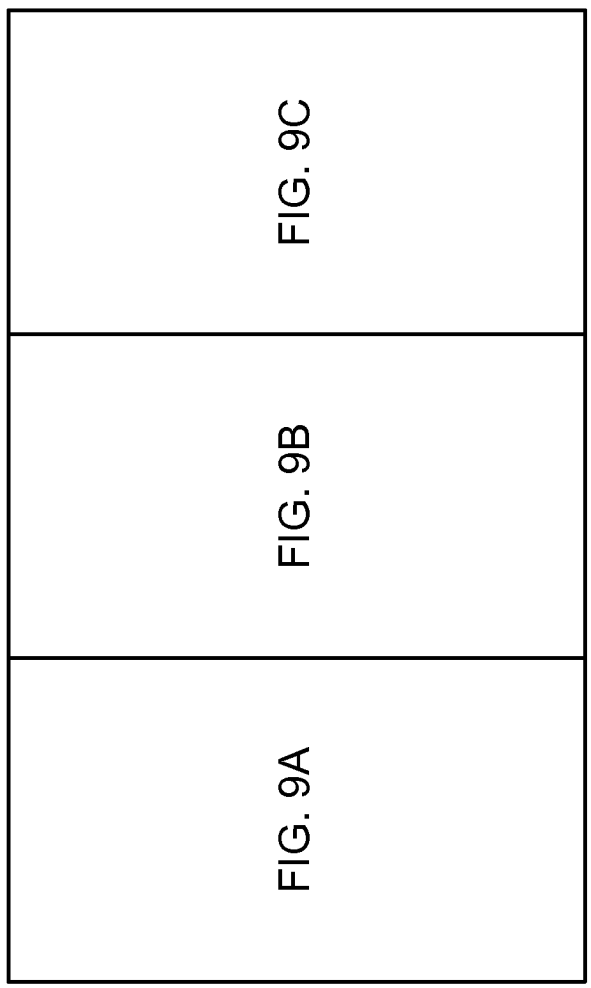
FIG. 9 is a block diagram illustrating multiple parts of an example corresponding to FIGS. 9A-9C.
Figure 9A:
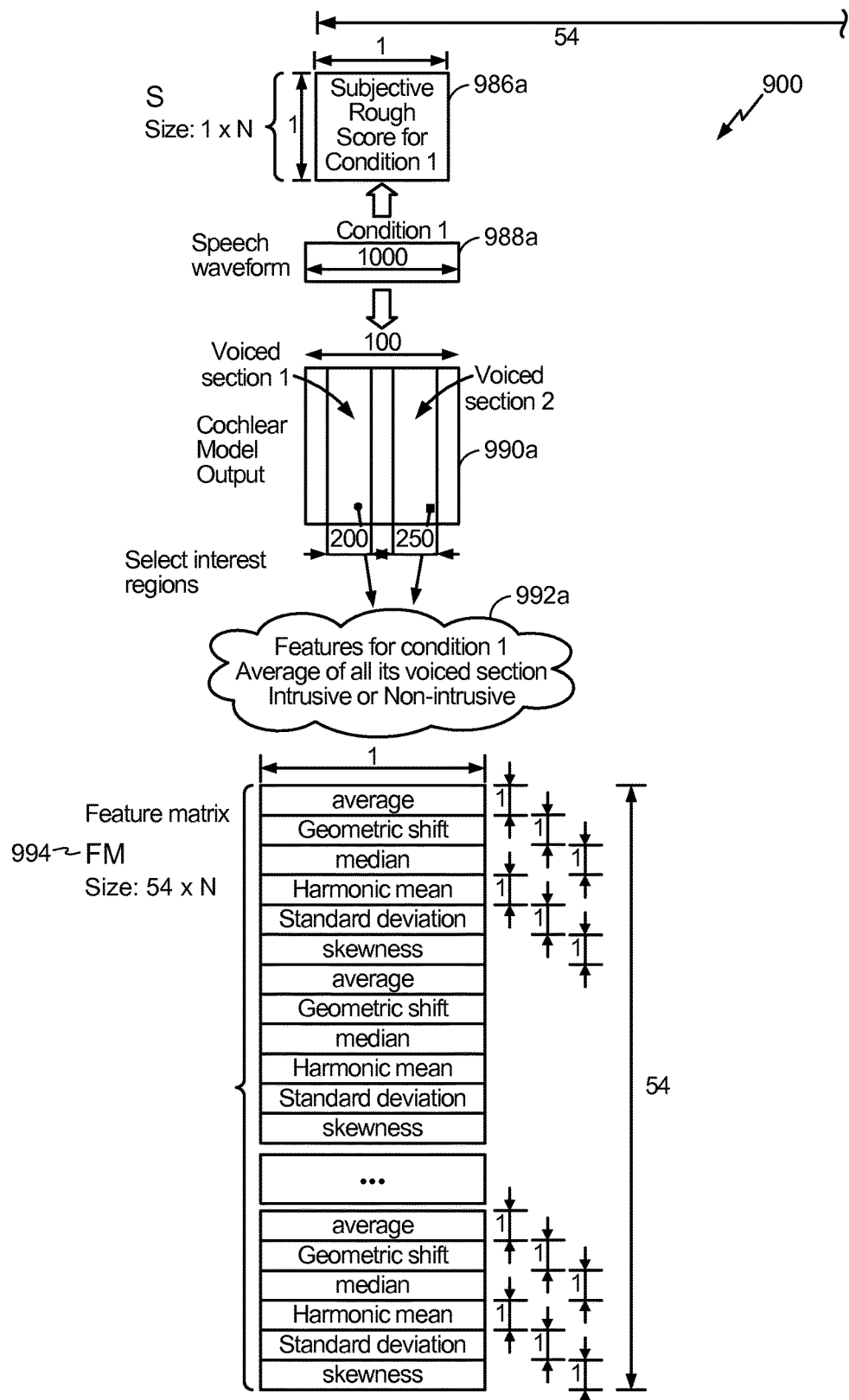
FIG. 9A is a block diagram illustrating a feature matrix.
Figure 9B:
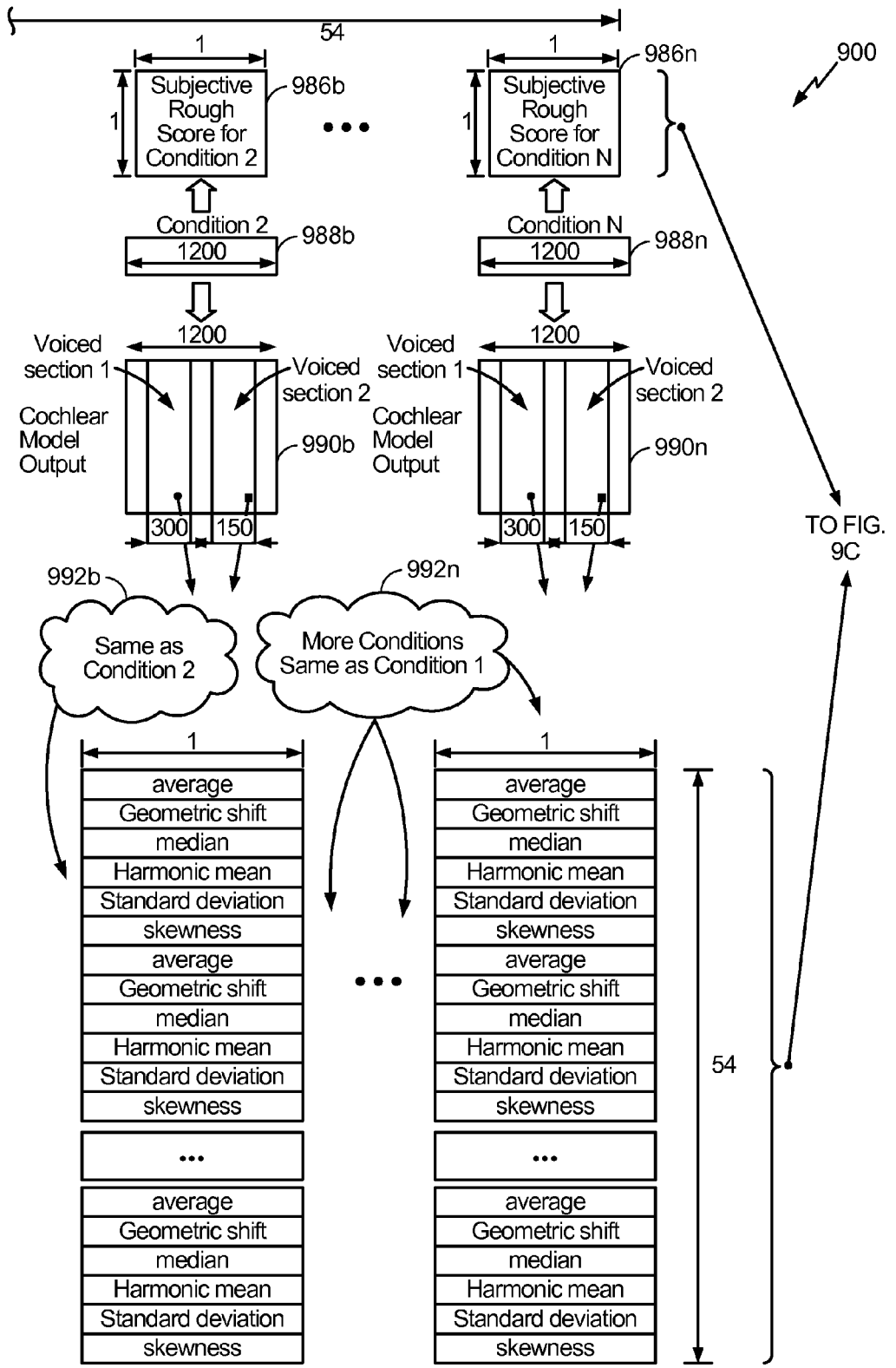
FIG. 9B is a block diagram illustrating additional features.

FIG. 9 is a block diagram illustrating multiple parts of an example corresponding to FIGS. 9A-9C. The weights 996 (denoted as the vector b in FIG. 9C) may be determined during a training period (e.g., offline before the overall quality 554 is determined). The weights 996 may be applied to speech features 992a-n shown in FIG. 9B (intrusive or non-intrusive) during runtime to determine an overall quality 554 of the speech. Specifically, a set of weights 996, b, may be determined for each distortion dimension.

A training database 882 may include training speech samples 868 for N conditions 988a-n as shown in FIG. 9A, each condition 988a-n corresponding to a different set of circumstances under which the speech was received, e.g., different codecs, different network technologies, different modulation schemes, etc. The training database 882 may also include a subjective score 986a-n for each distortion dimension for each of the N conditions. In other words, for each condition, the training database may have 6 subjective scores 872, one for each distortion dimension. Collectively, the subjective scores for all N conditions for a particular distortion dimension (roughness in FIG. 9C) may be referred to as S.

Each feature vector in the feature matrix 994 (e.g., each column in the FM) may be determined for a particular condition 988a-n, i.e., using intrusive or non-intrusive feature extraction via analysis serials of selected sections of cochlear model output 990a-n. The feature vectors are placed in the feature matrix 994, FM. Therefore, if N conditions 988a-n are used, the feature vector may have N columns. Specifically, FM 994 is a 54×N matrix in this example, although the specific sizes of data may vary.

Weights 996 may then be estimated based on the feature matrix 994, FM, and the known subjective scores 986a-n, S. In other words, weights 996, b, may be determined that would cause the feature matrix 986, FM, to produce the subjective scores 986a-n, S, that correspond to the N conditions 988a-n. Therefore, the weights 996 as shown in FIG. 9C, b, are calculated to satisfy Equation (1):

$$FM*b=S \quad (1)$$

where FM is the feature matrix 994 determined for N conditions 988a-n of training speech, b is the desired weights 996 for a particular distortion dimension and S is the subjective score 986a-n vector for the particular distortion dimension. Therefore, the weights 996 may be calculated according to Equation (2):

$$b=FM^{-1}*S \quad (2)$$

where $FM^{-1}$ is the inverse feature matrix 994. A weight set 996, b, may be determined for each distortion dimension and saved for future prediction of prediction scores for each distortion dimension, i.e., roughness 528, discontinuity 530, dullness 532, thinness 534, hissing 536 and variability 538. It should be noted that Equation (2) is the theoretical solution. In practice, there may be other ways to find the "b" that make FM*b match S best, e.g., multiple linear regression.

Even though this training may be performed offline before the computational overall quality estimator 552 (as illustrated in FIG. 5, for example) determines an overall quality 554 for a portion of the original speech signal 512, the weights 996 may then be applied to features extracted from testing speech samples 876 for which an overall quality 554 is desired.

Figure 10:
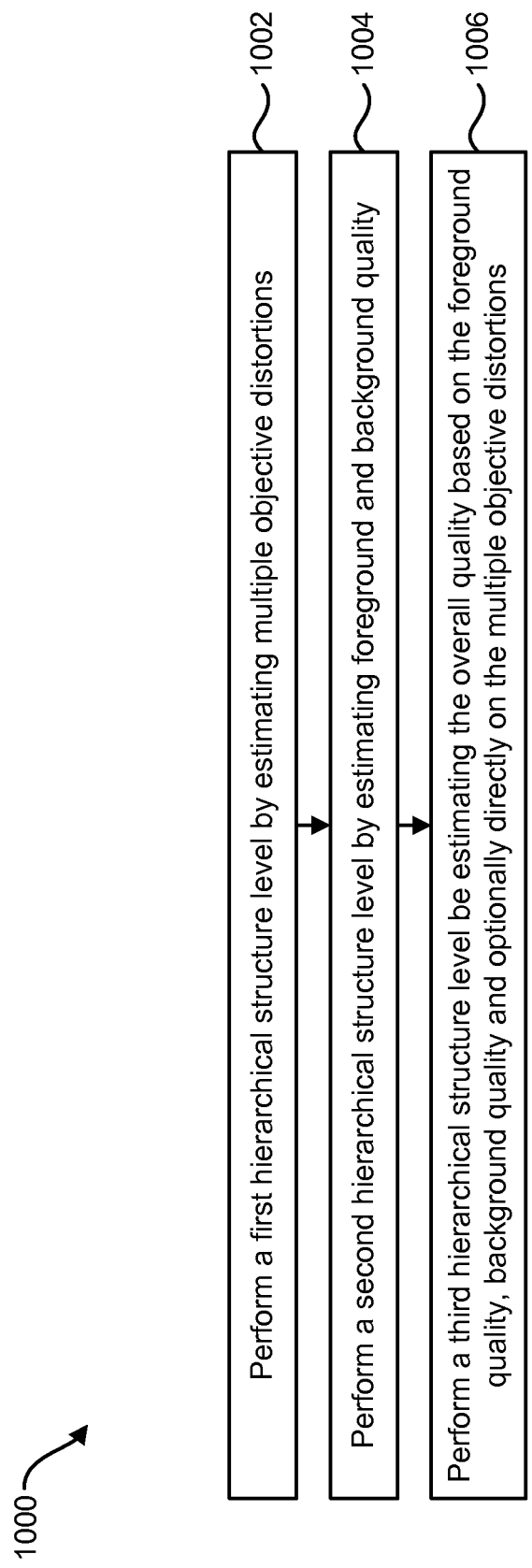
FIG. 10 is a flow diagram illustrating one example of a hierarchical structure that may be implemented for measuring speech signal quality.

FIG. 10 is a flow diagram illustrating one example of a hierarchical structure 1000 that may be implemented for measuring speech signal quality. The hierarchical structure 1000 may be performed by an electronic device 556. The electronic device 556 may perform 1002 a first hierarchical structure level by estimating multiple objective distortions of a modified speech signal 524 or based on an original speech signal 512. For example, an objective distortion may be one or more metrics that represent distortions in the modified speech signal 524. The multiple objective distortions may represent an independent dimension of speech quality. For example, the multiple objective speech distortions may be roughness 528, discontinuity 530, dullness 532, thinness 534, hissing 536, and variability 538.

The electronic device 556 may then perform 1004 a second hierarchical structure level by estimating foreground quality 550 and background quality 548. The foreground quality 550 and back ground quality 548 may be based on the multiple objective distortions estimated in the first hierarchical structure level. In other words, the second hierarchical structure level may not be performed before the first hierarchical structure level. The foreground quality 550 may be estimated by a foreground quality estimator 540 and the background quality 548 may be estimated by a background quality estimator 542.

The foreground quality 550 could be based on one or more of the objective distortions. For example, roughness 528, discontinuity 530, dullness 532 and thinness 534 may be foreground objective distortions. The foreground quality 550 may be determined using only dullness 532 and thinness 534 or any other possible combination of the foreground objective distortions. The background quality 548 could be based on one or more of the objective distortions. The background objective distortions may be hissing 536 and variability 538. The background quality 548 may be found using both hissing 536 and variability 538 or just hissing 536 or variability 538. The systems and methods disclosed herein may use any combination of the objective distortions. The objective distortions may include more than just roughness 528, discontinuity 530, dullness 532, thinness 534, hissing 536 or variability 538.

The electronic device 556 may then perform 1006 a third hierarchical structure level by estimating the overall quality 554 of the speech signal. The overall quality 554 of the speech signal may be based on the foreground quality 550, background quality 548 and optionally directly on the multiple objective distortions. In other words, the third hierarchical structure level may not be performed before the first hierarchical structure level or the second hierarchical structure level. The objective distortions may indirectly be used through the foreground quality 550 and background quality 548 to determine the overall quality 554. Additionally, the objective distortions may directly be used to determine the overall quality 554 in addition to the foreground quality 550 and background quality 548. The overall quality 554 may approximate subjective measures of speech quality.

Figure 11:
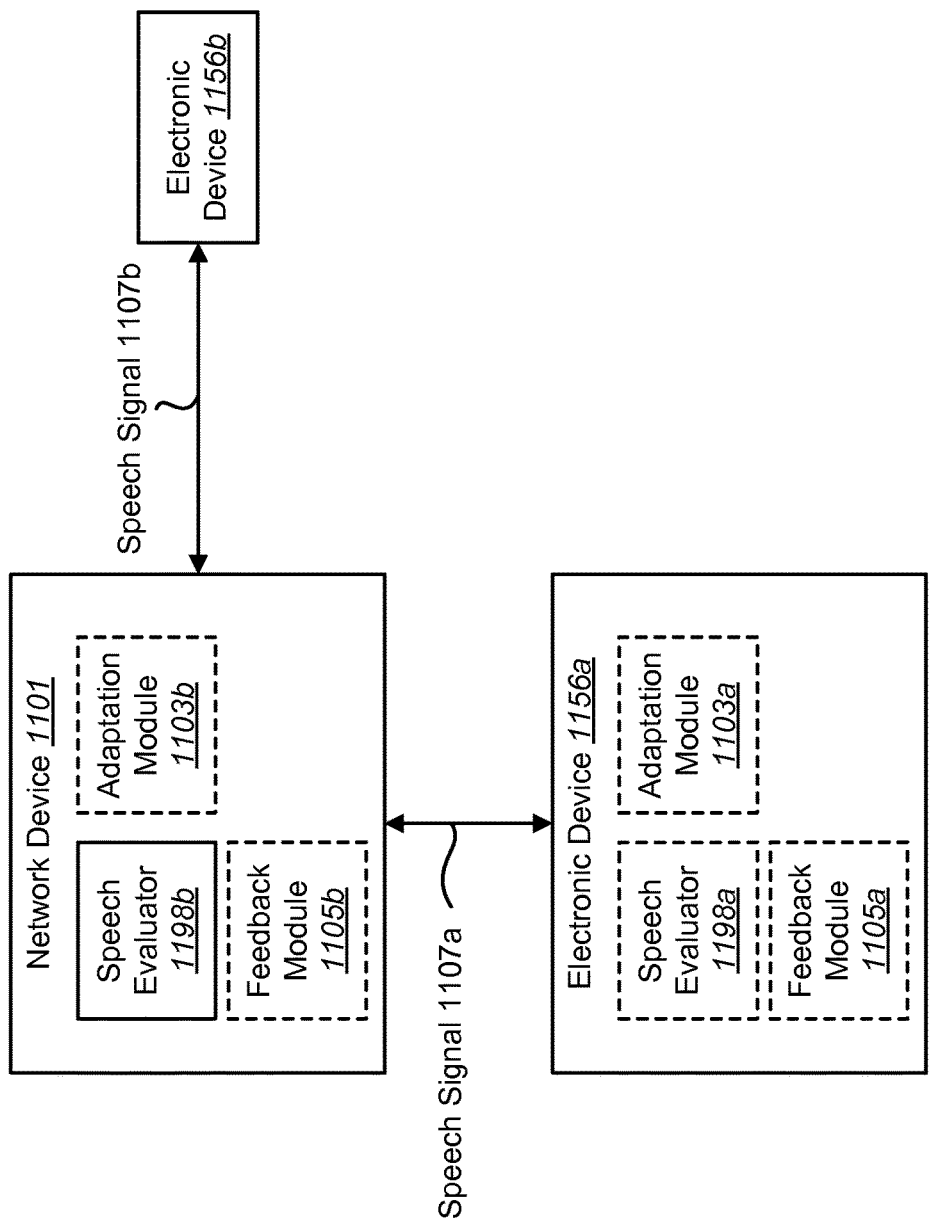
FIG. 11 is a block diagram illustrating one configuration of a network device and two electronic devices configured for measuring speech signal quality.

FIG. 11 is a block diagram illustrating one configuration of a network device 1101 and two electronic devices 1156*a-b* configured for measuring speech signal quality. The network device 1101 may include a speech evaluator 1198*b*, an adaptation module 1103*b*, and a feedback module 1105*b*. The network device 1101 may be a wireless router, a server, a base station, a cell phone tower or a computer system. The speech evaluator 1198*b* may be used to perform the methods disclosed herein. The speech evaluator 1198*b* may include a computational distortion estimator 526, computational foreground quality estimator 540, a computational background quality estimator 542 and a computational overall quality estimator 552. The network device 1101 may obtain one or more speech signals 1107*a-b* from one or more electronic devices 1156*a-b*. The speech signals 1107*a-b* may be a modified speech signal 524, an original speech 512 signal or both a modified speech signal 524 and an original speech signal 512. The network device 1101 may use the speech evaluator 1198*b* to determine multiple objective distortions found in the speech signals 1107*a-b*. The multiple objective distortions may be used to determine foreground quality 550 and background quality 548 of the speech signals 1107*a-b*. Then an overall quality 554 of the speech signals 1107*a-b* may be determined using the foreground quality 550 and background quality 548.

Depending on the overall quality 554 of the speech signals 1107*a-b*, the network device 1101 may determine that changes need to be made to a processing structure. The changes may be made by the adaptation module 1103*b*. For example, the adaptation module 1103*b* may be able to modify the encoding, decoding or transcoding done by the network device 1101. The adaptation module 1103*b* may also be able to change bandwidth allocated for the speech signals 1107*a-b* or change a bit rate of the network device 1101. For another example, an electronic device 1156*a-b* may send a speech signal 1107*a-b* to the network device 1101. The network device 1101 may send the same speech signal 1107*a-b* to another electronic device 1156*a-b*, after which the speech evaluator 1198*b* may determine the overall quality 554 of the speech signal 1107*a-b* when the network device 1101 received the speech signal 1107*a-b*, and the speech signal 1107*a-b* when the network device 1101 sent it to the other electronic device 1156*a-b*. If the overall quality 554 of the sent speech signal 1107*a-b* is too low the network device 1101 may use the speech evaluator 1198*b* to determine the encoding performed by the network device 1101 that may have caused the degradation. The network device 1101 may then use the adaptation module 1103*b* to change the encoding method to one that performs better with the speech signal 1107*a-b*. The adaptation module 1103*b* may be able to make just these changes in this example, but the specific changes the adaptation module 1103*b* may make may vary in other configurations.

The network device 1101 may make changes while the network device 1101 is connected to the one or more electronic devices 1156*a-b*. The network device 1101 may also determine that more extensive changes may need to be made, and may make these changes offline while no electronic device 1156*a-b* is connected to the network device 1101. The network device 1101 may also store the score of the overall quality 554 of the speech signals 1107*a-b* in the feedback module 1105*b*. When maintenance and upkeep is being done to the network device 1101 the feedback module 1105*b* may provide the score of the overall quality 554 of the speech signals 1107*a-b*. Using the stored score of the overall quality 554, certain changes may be made to hardware during the maintenance and upkeep. For example, if the overall quality 554 of the speech signals 1107*a-b* is consistently determined to be too low at a cell phone tower, the cell phone tower's hardware may be updated or replaced with newer hardware.

The feedback module 1105*b* may also provide feedback to the one or more electronic devices 1156*a-b* that are connected to the network device 1101. The feedback may include the score of the overall quality 554 for the speech signals 1107*a-b* when the network device 1101 received them and may also include the score of the overall quality 554 for the speech signals 1107*a-b* when the network device 1101 sent them to another electronic device 1156*a-b*. The feedback may indicate that the network device 1101 may not be the cause of speech signal degradation of the speech signals 1107*a-b*. The feedback provided to the one or more electronic devices 1156*a-b* may also show that the overall quality 554 of the speech signal when originally transmitted from the electronic devices 1156*a-b* was low, possibly indicating the network device 1101 may not be the cause of the signal degradation. The feedback may indicate ways the electronic devices 1156*a-b* can improve the overall quality 554 of the transmitted speech signals 1107*a-b*. For example, the feedback may indicate the compression of the speech signals 1107*a-b* performed by the electronic devices 1156*a-b* is not functioning properly.

The electronic device 1156*a* may include a speech evaluator 1198*a*, an adaptation module 1103*a* and a feedback module 1105*a*. The speech evaluator 1198*a* may be used to perform the methods disclosed herein. The electronic device 1156*a* may obtain or transmit a speech signal 1107*a* to the network device 1101. The speech signal 1107*a* may be a modified speech signal 524, an original speech signal 512 or both a modified speech signal 524 and an original speech signal 512. The electronic device 1156*a* may use the speech evaluator 1198*a* to determine the multiple objective distortions and overall quality 554 of the speech signal 1107*a*. The adaptation module 1103*a* may change the performance of the electronic device 1156*a* based on the overall quality 554 of the speech signal 1107*a*. The feedback module 1105*a* may provide carrier feedback to the network device 1101 about the overall quality 554 and the types of processing being performed by the electronic device 1156*a*. Accordingly, the systems and methods disclosed herein may provide measures of objective quality (and related diagnostics of speech quality impairments) in smart-phones and/or other devices (such that the user and/or network provider might be able to get a 'metric' of quality of their voice conversations, for example). Similar to the above, these metrics of quality may also be included in soft-phones applications such as Skype, etc.

Figure 12:
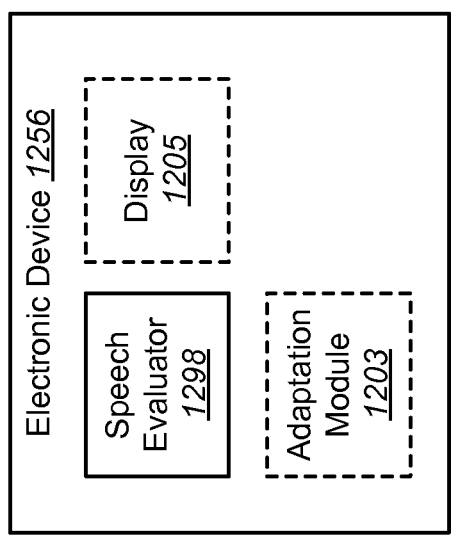
FIG. 12 is a block diagram illustrating one configuration of an electronic device configured for measuring speech signal quality.

FIG. 12 is a block diagram illustrating one configuration of an electronic device 1256 configured for measuring speech signal quality. The electronic device 1256 may be a computer system, a gaming system, a server or a mobile device. The electronic device 1256 may also be one or more electronic devices 1256 working together. I.e. Bluetooth headphones, noise cancelling headphones, mobile device or speakers.

The electronic device 1256 may include a speech evaluator 1298, an adaptation module 1203 and a display 1205. The speech evaluator 1298 may include a computational distortion estimator 526, computational foreground quality estimator 540, computational background quality estimator 542 and a computational overall quality estimator 552. The speech evaluator 1298 may be used to determine multiple objective distortions, foreground quality 550, background quality 548 and overall quality 554 of one or more speech signals the electronic device 1256 is sending and receiving. For example, the electronic device 1256 may be a mobile device that is receiving a speech signal that originated from a different wireless communication service provider. The speech evaluator 1298 may determine the overall quality 554 of the speech signal when received by the electronic device 1256. The speech evaluator 1298 may then send feedback to a network device 1101 to compare the overall quality 554 of the speech signal received by the mobile device and the overall quality 554 of the speech signal when the speech signal was first received by the network device 1101 within a network of the wireless communication service provider.

The electronic device 1256 may also be able to adapt its performance and processing parameters using the adaptation module 1203. The adaptation module 1203 may be able to modify the encoding, decoding or transcoding done by the electronic device 1256. The adaptation module 1203 may also be able to change bandwidth allocated for the one or more speech signals or change a bit rate of the electronic device 1256. For example, the overall quality 554 of the speech signal may be too low and the adaptation module 1203 may determine the electronic device 1256 should increase the antenna power. Increasing the antenna power may improve a connection between a cell tower and the electronic device 1256. The speech evaluator 1298 may determine the new score of the overall quality 554 is acceptable and the adaptation module 1203 may instruct the electronic device 1256 to continue with the increased antenna power. For another example, the electronic device 1256 may be a set of noise cancelling headphones. The noise cancelling headphones may perform active noise cancellation, where the headphones determine what noise is being suppressed and what noise is allowed using the multiple objective distortions. If one or more of the distortions are degrading the speech signal, the noise cancelling headphones may use the active noise suppression located within the adaptation module 1203 to adapt the noises that are being cancelled and what noises are allowed.

The electronic device 1256 may use the display 1205 to show the score of the overall quality 554 at the electronic device 1256. The display 1205 may show the multiple objective distortion scores, the foreground quality 550, background quality 548 or the overall quality 554 of the speech signal. This information may be used by the operator of the electronic device 1256 or during maintenance to make modifications or upgrades to the electronic device's 1256 hardware or processing parameters. The information provided on the display 1205 may also be used to show the overall quality 554 of the speech signal when it was received by a network device 1101. This information may allow the operator of the electronic device 1256 to know if degradation of the speech signal is occurring on the electronic device 1256 or if it is occurring on the network device 1101 or that the speech signal was already degraded when it was received by the network device 1101.

Figure 13:
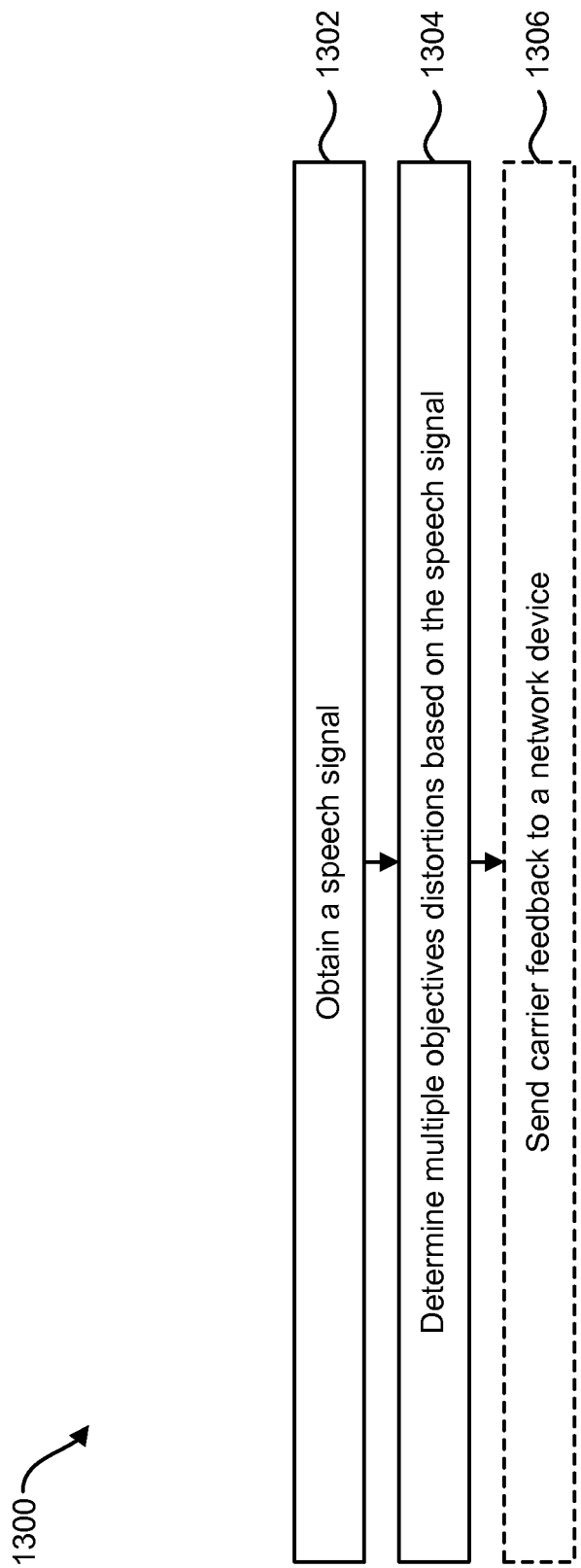
FIG. 13 is a flow diagram illustrating a method implemented by an electronic device for measuring speech signal quality.

FIG. 13 is a flow diagram illustrating a method 1300 implemented by an electronic device 1256 for measuring speech signal quality. The method 1300 may be performed by an electronic device 1256 (e.g. the electronic device described in connection with FIG. 11 and FIG. 12). Examples of the electronic device 1256 include mobile devices (e.g., smartphones, cellular phones, tablet devices, laptop computers, etc.), desktop computers, Personal Digital Assistants (PDA), appliances, televisions, gaming systems and servers (e.g., a server included in a network device). The electronic device 1256 may obtain 1302 a speech signal. The speech signal may be a modified speech signal 524, an original speech signal 512 or both a modified speech signal 524 and an original speech signal 512. The electronic device 1256 may use a speech evaluator 1298 to determine 1304 multiple objective distortions based on the speech signal. I.e. roughness 528, discontinuity 530, dullness 532, thinness 534, hissing 536 and variability 538.

The electronic device 1256 may then optionally send 1306 carrier feedback to a network device 1101. The carrier feedback may include the multiple objective distortions analysis or may be just the multiple objective distortion scores. The carrier feedback may be used to improve the quality of the speech signal by either adapting processes on the electronic device 1256, the network device 1101 or both the electronic device 1256 and the network device 1101.

Figure 14:
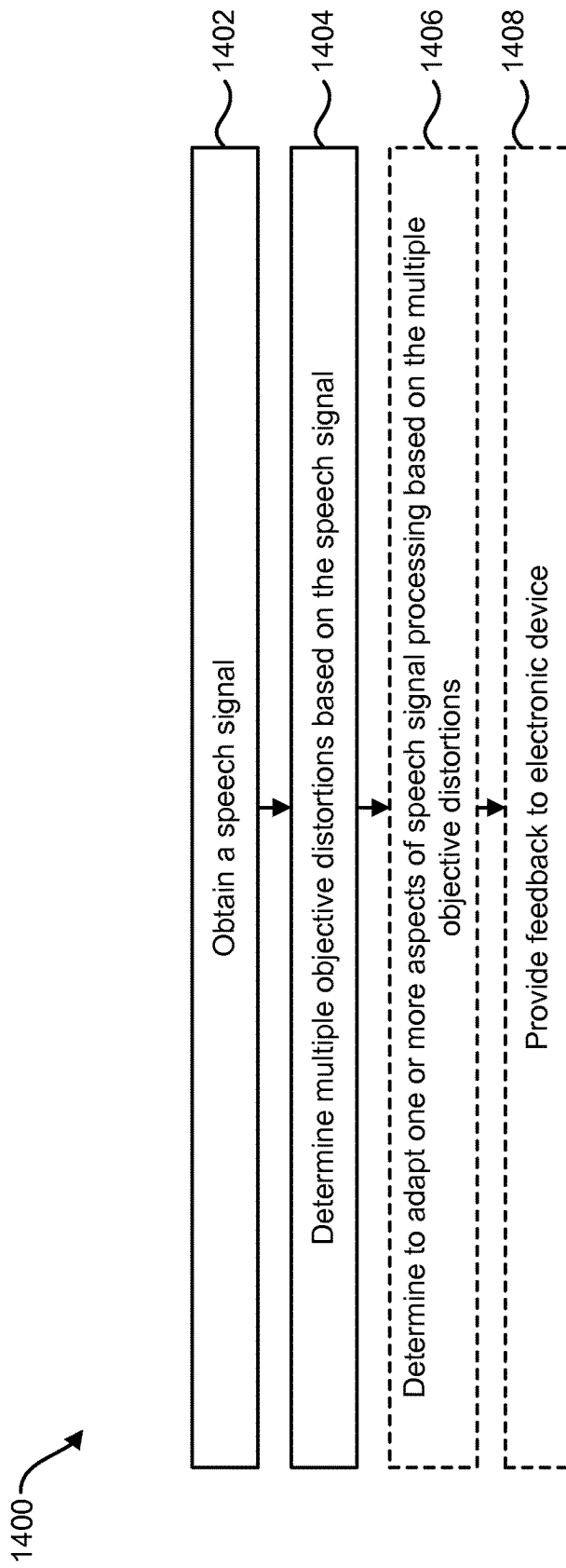
FIG. 14 is a flow diagram illustrating a method implemented by a network device for measuring speech signal quality.

FIG. 14 is a flow diagram illustrating a method 1400 implemented by a network device 1101 for measuring speech signal quality. The method may be performed by a network device 1101 (e.g. the network device described in connection with FIG. 11). Examples of the network device 1101 include desktop computers, servers and cell towers. The network device 1101 may obtain 1402 a speech signal. The speech signal may be a modified speech signal 524, an original speech 512 signal or both a modified speech signal 524 and an original speech signal 512. The network device 1101 may use a speech evaluator 1198*b* to determine 1404 multiple objective distortions based on the speech signal. I.e. roughness 528, discontinuity 530, dullness 532, thinness 534, hissing 536 and variability 538.

The network device 1101 may then optionally determine 1406 to adapt one or more aspects of speech signal processing based on the multiple objective distortions. For example, the network device 1101 may determine that the decoding being performed by the network device 1101 when the speech signal is first obtained is not adequate. The network device 1101 may then optionally provide 1408 feedback to an electronic device 1156a-b that is connected to the network device 1101. The feedback may indicate the adaptations the network device 1101 is making in order to improve one or more of the multiple objective distortions. The electronic device 1156a-b may then make adaptations accordingly to allow communication to continue between the network device 1101 and the electronic device 1156a-b.

Figure 15:
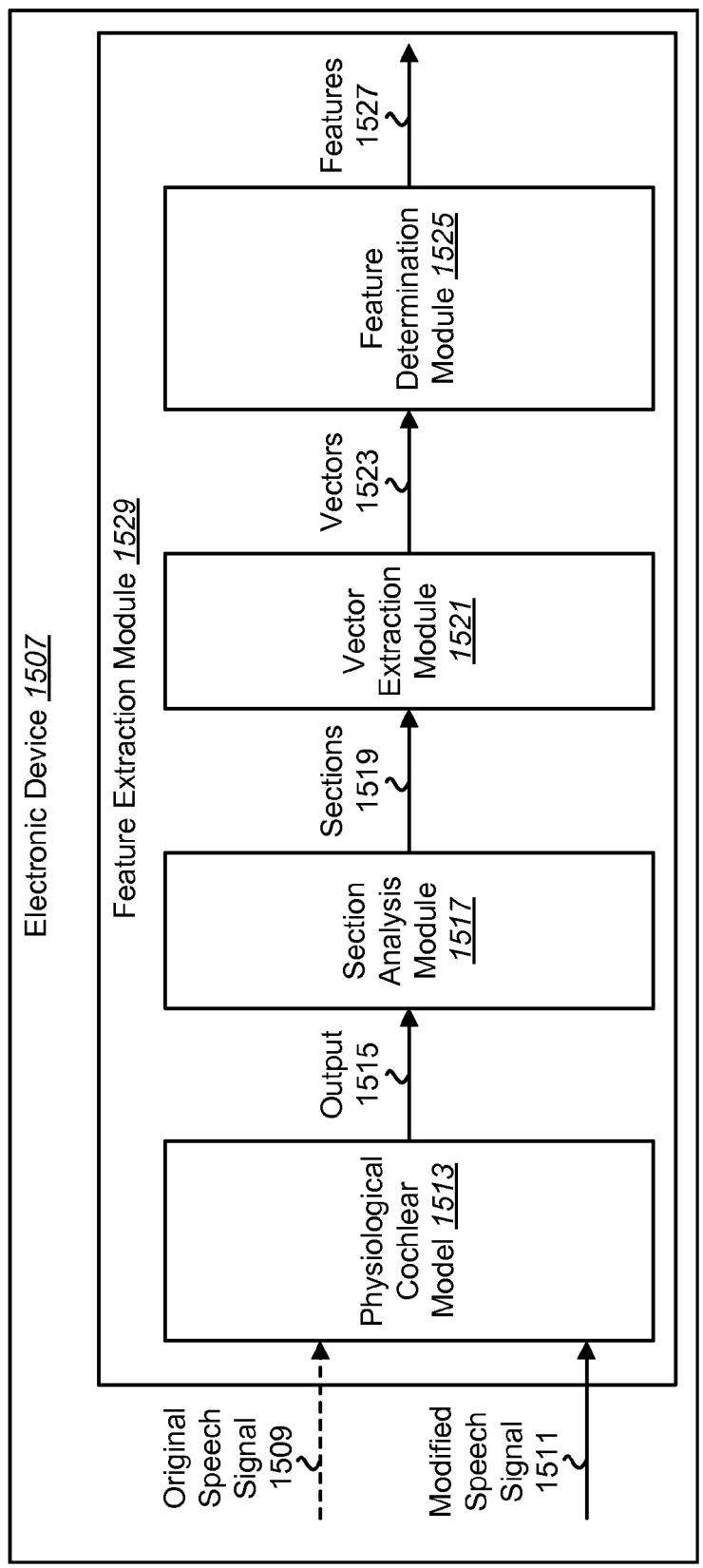
FIG. 15 is a block diagram illustrating one configuration of an electronic device for feature extraction.

FIG. 15 is a block diagram illustrating one configuration of an electronic device 1507 for feature extraction. The electronic device 1507 may include a feature extraction module 1529. The electronic device 1507 and/or one or more components thereof may be implemented in hardware (e.g., circuitry) or a combination of hardware and software. Additionally or alternatively, the term "module" may indicate that a component is implemented in hardware (e.g., circuitry) or a combination of hardware and software. For example, the feature extraction module 1529 may be implemented in hardware (e.g., circuitry) or in a combination of hardware and software (e.g., a processor with executable instructions). Lines or arrows depicted in one or more of the Figures may represent couplings between components and/or modules. A "coupling" may be direct or indirect. For example, one module may be coupled to another module directly (without any intervening component) or indirectly (with one or more intervening components).

Examples of the electronic device 1507 include mobile devices (e.g., smartphones, cellular phones, tablet devices, laptop computers, etc.), computers (e.g., desktop computers), network devices (e.g., base stations, routers, switches, gateways, servers, etc.), televisions, automobile electronics (e.g., electronic devices integrated into the console of an automobile), gaming systems, electronic appliances, etc. In some configurations, the electronic device 1507 may include one or more of the components of and/or perform one or more of the functions of the electronic device 556 described in connection with FIG. 5.

The feature extraction module 1529 may determine one or more features 1527 based on a modified speech signal 1511. In some configurations, determining the one or more features 1527 may be based on both a modified speech signal 1511 and an original speech signal 1509.

The electronic device 1507 may optionally obtain the original speech signal 1509. For example, the electronic device 1507 may capture a speech signal with a microphone or may receive the speech signal from another device (e.g., storage device, computer, phone, headset, etc.). The original speech signal 1509 may be a raw or unprocessed signal. For example, the original speech signal 1509 may be an electronically sampled version of a speech signal that has not been modified (e.g., degraded, distorted, encoded, compressed, decoded, processed, etc.). Approaches where the original speech signal 1509 is obtained may be referred to as intrusive approaches or methods. For example, intrusive approaches may include an explicit subtraction between the original speech signal 1509 and the modified speech signal 1511 (e.g., a speech signal that has been processed, degraded, distorted, enhanced, etc.). In other approaches, the original speech signal 1509 may not be obtained. These approaches may be referred to as non-intrusive approaches or methods. In non-intrusive approaches, for example, the original speech signal 1509 may not be available (e.g., there may not be an explicit subtraction between the modified speech signal 1511 and the original speech signal 1509). For instance, the systems and methods disclosed herein may be utilized without obtaining the original speech signal 1509 in some implementations and/or scenarios.

Intrusive and/or non-intrusive approaches may be utilized to objectively measure speech qualities (e.g., distortion-dimensions). Features may be extracted as described herein for voiced and/or silence parts of speech depending on the given application. For example, the two sets of features may be in the perceptual domain and therefore may be naturally suitable for speech quality measurement. It should be noted that not all features may be necessary for application of the systems and methods disclosed herein. Simple synthesis processes may be utilized for training and prediction and/or complicated processes may be utilized for improvement. The numerous features described take into account a wide range of speech distortions. A mapping model may be utilized to map extracted features to certain type distortion scores. One simple approach is using linear regression, as described herein. Higher order regressions or more complicated models, such as neural networks may be employed to map extracted features to prediction scores as well. For a given application, a training process may be utilized to set up proper parameters and/or weighting for the mapping model. For example, optimized weighting may be achieved, which produces predictions with least error against subjective scores. The trained model can then be applied directly to distorted signals (not in the training pool, for example). For example, the trained mapping model may be fed with features extracted from speech to be tested to achieve prediction of speech quality scores.

The electronic device 1507 may obtain the modified speech signal 1511. In some configurations, the electronic device 1507 may process the original speech signal 1509 to obtain the modified speech signal 1511. For example, the electronic device 1507 may encode the original speech signal 1509 (and/or decode the resulting encoded speech signal, for example) to obtain the modified speech signal 1511. Additionally or alternatively, the electronic device 1507 may enhance the original speech signal 1509 to obtain the modified speech signal 1511. For example, the electronic device 1507 may perform noise suppression on a noise-injected version of the original speech signal 1509. A "single-channel" speech signal may represent the speech signal as a single sample (of the pressure, for example) at any one time instant. For example, a single-channel speech signal may not contain multiple signals that provide spatially distinguishing information. In some configurations, for example, the modified speech signal 1511 may be based on an original speech signal 1509 that was captured with a single microphone.

In some configurations, the electronic device 1507 may obtain the modified speech signal 1511 from another device (e.g., storage device, computer, phone, headset, encoder, etc.). For example, the electronic device 1507 may receive the modified speech signal 1511 from a networked electronic device.

The modified speech signal 1511 may be based on the original speech signal 1509. For example, the modified speech signal 1511 may be a distorted version of the original speech signal 1509. Enhancing, encoding, decoding, transcoding, transmitting, receiving and/or error-correcting the original speech signal 1509 may distort the original speech signal 1509 such that one or more characteristics of the modified speech signal 1511 are different from those of the original speech signal 1509.

In some configurations, the modified speech signal 1511 and/or the original speech signal 1509 may be split into time periods (e.g., "frames"). For example, each period of the modified speech signal 1511 may include a number of samples over time. The time periods or frames may be uniform in length or may be of differing lengths.

The feature extraction module 1529 may obtain the modified speech signal 1511. Optionally, the feature extraction module 1529 may additionally obtain the original speech signal 1509. The feature extraction module 1529 may include a physiological cochlear model 1513, a section analysis module 1517, a vector extraction module 1521 and/or a feature determination module 1525. In some configurations, the feature extraction module 1529 may be included in the computational distortion estimator 526 described in connection with FIG. 5. In other configurations, the feature extraction module 1529 may be separate from or include the computational distortion estimator 526. In some configurations, the feature extraction module 1529 may be an example of the feature extraction module 656 described in connection with FIG. 6 and/or may be an example of the feature extraction module 756 described in connection with FIG. 7.

The electronic device 1507 (e.g., feature extraction module 1529) may process speech (e.g., the modified speech signal 1511 and/or the original speech signal 1509) using one or more physiological cochlear models 1513. A physiological cochlear model 1513 may model the response of one or more physical components of a cochlea. For example, the physiological cochlear model 1513 may model inner hair cells (IHC), cochlear length and/or fluid mechanics of the cochlea. Processing speech (e.g., the modified speech signal 1511) using the physiological cochlear model 1513 may more accurately approximate the processing performed by the human auditory system (in comparison with a functional model, for example). This may help to more accurately estimate speech signal quality as perceived by a human listener. For example, processing the modified speech signal 1511 using a physiological model may provide inner-hair cell data. This is different from, for example, basilar membrane data that is approximated using a functional model.

In some configurations, the physiological cochlear model may be implemented in accordance with one or of the following equations and descriptions. The Green's function integral equation guarantees that the integral over the Basilar Membrane (BM) velocity is equal to the stapes particle velocity $u_s$ times the scala height H (the normal velocity is zero on the upper wall). Solving the Green's Function integral equation is the starting point of the systems and methods disclosed herein. The Green's function integral equation is given by:

$$\phi(x,y) = \int_{x',y'} G(x,y|x',y') V_n(x',y') dx', dy' \quad (3)$$

where $\phi$ is the velocity of potential and $V_n$ is the normal component of the scala velocity defined with + into the box.

The following list of variables may be used in the equations disclosed herein:

p(x, t); 2p(x, t) Pressure re helicotrema; pressure across BM
x Position variable along the BM, measured from the stapes
f frequency (Hz)
w radian frequency=$2\pi f$
$\rho$ density of water
$\eta$ viscosity of water
Kp(x) BM partition stiffness parameter
Rp(x) BM partition resistance
mp BM partition mass
Vohc OHC Voltage
T (Vohc) BM Tension
xL Length of the BM
yH Height of a cochlear scala
X(f) cochlear map function (BM place vs. frequency)
Xz(f) second cochlear map function
i $\sqrt{-1}$
$\xi(x, t), \xi'(x, t), \xi''(x, t)$ BM particle displacement, velocity, acceleration
$\zeta(x, t), \zeta'(x, t), \zeta''(x, t)$ Cilia displacement, velocity, acceleration
f(x, t) TM force
us(t), u's(t) Stapes particle velocity and acceleration
(n+1, n, n−1) Discrete time (future, present, past)
* Spatial convolution
L(t) "Instantaneous" loudness
Im, Ip Intensity of masker and probe The basic cochlear equation is given by:

$$2\rho F(x) * \ddot{\xi}(x) + z_p(x,t) x \dot{\xi}(x) = 2\rho \dot{u}_s(t)((|x|-L))_L \quad (4)$$

where $\rho$ is the density of water, $\ddot{\xi}(x)$ is the BM particle acceleration, * is spatial convolution and $\dot{u}_s$ is Stapes particle acceleration. This equation is similar to an equation created by Allen and Sondhi, but modified to include the Tectorial Membrane (TM) force. The tectorial membrane force is defined by:

$$f(x,t) \equiv g z_{tc}(x,t) x \dot{\xi}(x,t) \quad (5)$$

Where $\dot{\xi}(x, t)$ is the BM particle velocity.

Integration of equation (4) allows one to find the BM displacement $\xi(x, t)$, given the stapes acceleration $\dot{u}_s$. However there is a serious problem when proceeding with this rigorous approach, since the final equations are not easily solved.

In Allen and Sondhi's equation impedance $Z_t$ was absent (i.e., infinite). The addition of the TM impedance in the present formulation leads to a forth order time term $$\frac{d^4 \xi(x, t)}{d t^4}$$

in equation (3), having a small leading coefficient. Such an equation is classically known as a stiff differential equation, which has singular properties.

The way to establish the order of the transfer function between p and $\xi$ (i.e., $z_p(t)$) is by the use of Laplace transforms. The approximate partition impedance $Z_p^{(1)}$ is obtained by ignoring the cilia impedance $Z_c(x, f)$. The superscript (1) indicates the modified (i.e. approximate) $Z_{tc}$. Writing out the full partition impedance in terms of the trans BM pressure−2P(x,s) over the BM displacement $\Xi(x, s)$, gives $sZ_p(x,s)$:

$$-2\frac{P(s)}{\Xi(s)} = [m_b s^2 + R_O s + K_O] + \left[ g^2 \frac{(m_c s^2 + r_c s + k_c)(m_t s^2 + r_t s + k_t)}{(m_c + m_t)s^2 + (r_c + r_t)s + (k_c + k_t)} \right] \quad (6)$$

The conclusion from this is that removing the cilia impedance only accounts from a five percent change in the BM impedance. Thus while it raises the order of the equation from two to four, the equation is inherently acting as a second order in time equation. This leads to very bad numerical properties, which must be attended to in the formulation of the equation.

The parallel of the TM and cilia impedance $z_{tc}(x,t)$ must be approximated at this point to process. After dropping the relative large (i.e. stiff) impedance $z_c \gg z_t$ from equation (4), the solution for the final equation may be obtained.

$$2\rho F(x) * \ddot{\xi}(x) + z_O(x,t) x \dot{\xi}(x) + g^2(x) z_t(x,t) x \ddot{\xi}(x) = 2\rho \dot{u}_s(t)((|x|-L))_L \quad (7)$$

In equation (7), the approximation of $Z_{tc} \equiv Z_t \| Z_c \approx Z_4$ which follows from the observation that $Z_c \gg Z_t$.

The kernel function F(x) operates on the BM acceleration. There is also a component of the BM impedance that is proportional to the BM acceleration. These two acceleration terms must be grouped as on before equation may be solved. When the impedance is of the second order form, we shall see that this regrouping is easily done. How to proceed in the general case is less obvious, and therefore it was necessary to make an approximation to the BM impedance function leading to equation (7), which is second order thereby exposing the acceleration term in the impedance.

Impedance functions are minimum phase, and every minimum phase function say M(s), may be written in the form:

$$M(s) \equiv m_0 \frac{1-R(s)}{1+R(s)} \quad (8)$$

where $$m_0 \equiv \int_0^t m(t)dt \Big|_{t\to 0},$$

and where R(s) is the reflectance corresponding to $M(s)/m_0$ found by solving the above equation for R(s). By writing the impedance (i.e., M) in this form, and expressing it in the time domain, it is possible to form a recursive time domain convolutional equation for m(t), which along with the Green's Function equation (3), defines the cochlear response. This seemingly complicated approach is necessary, since the final cochlear equation must account for the acceleration component in the impedance when inverting the kernel function F.

An augmented kernel is defined by:

$$Q(x) = \frac{1}{2} m_p((\delta))_L(x) + 2\rho F(x) \quad (9)$$

where $m_p \approx m_O + g^2 m_t$ and $$((\delta))_L(x) \equiv \sum_{k=-\infty}^{\infty} \delta(2Lk - x) \quad (10)$$

The mass term is rewritten as a convolution in space with the BM acceleration $\ddot{\xi}$. This allows the mass term and the kernel to be grouped. This representation depends on the convolution relation:

$$M_p \ddot{\xi}(x, t) = \frac{m_p}{2}((\delta))_L(x) * \ddot{\xi}(x, t) \quad (11)$$

This equation is easily verified.

The augmented kernel may be defined in order to include the impedance mass term $m\ddot{\xi}$ to the kernel since both operate on the BM acceleration $\ddot{\xi}$. This augmentation requires spreading the mass out at 2 delta functions at the two singular points, each with half of the total mass, following the real odd-harmonic symmetry.

In terms of the augmented kernel the BM equation of motion becomes:

$$Q(x) * \ddot{\xi} + (R_O + g^2 r_t) \dot{\xi} + (K_O + g^2 k_t) \xi = 2((|x|-L))_L \rho \dot{u}_s \quad (12)$$

this is solved by inverting Q(x), which gives:

$$\ddot{\xi} = -Q^{-1} * [(R_O + g^2 r_t) \dot{\xi} + (K_O + g^2 k_t) \xi - 2((|x|-L))_L \rho \dot{u}_s] \quad (13)$$

Once the BM displacement is found by integration of equation (13), the cilia displacement may be compute by solving for the cilia displacement $\Theta(x,s) \leftrightarrow \theta(x,t)$, given the BM displacement $\Xi(x,s) \leftrightarrow \xi(x,t)$, as described by the BM to cilia displacement transfer function:

$$\frac{\Theta(x, s)}{\Xi(x, s)} \equiv g(x) \frac{Z_t(x, s)}{Z_t(x|, s) + Z_c(x, s)} \quad (14)$$

Or in the time domain:

$$[z_t(x,t) + z_c(x,t)] x \Theta(x,t) = g(x) z_t(x,t) x \ddot{\xi}(x,t) \quad (15)$$

We repeat for clarity, that while $z_t$ was ignored when solving for the BM displacement $\xi$ in equation (13), it is not necessary, nor proper, to ignore it in this equation. In the case of equation (13) it is a small term, which is justified to ignore. In the cilia equation, it is large and a critically important impedance.

The finite difference discrete-time cochlear equation, is:

$$\frac{Q * [\xi_{n+1} - 2\xi_n + \xi_{n+1}]}{T^2} + \frac{(R_O + g^2 r_t)(\xi_n - \xi_{n-1})}{T} + (K_O + g^2 k_t)\xi_n = \frac{2\rho((|x|-L))_L(u_n - u_{n-1})}{T} \quad (16)$$

When doing numerical spatial convolutions by Fourier transform the element of length dx is defined as $\Delta \equiv L/K$, where integer K is a power of two and L is the length of the cochlea. Thus the basilar membrane coordinate $x=0 \ldots L$ is:

$$x_k = k\Delta, \; k = 0 \ldots K \quad (17)$$

The formula for "odd-harmonic" circular convolution over length 4 L, namely $$Q((x))_L * \xi((x))_L \equiv \int_{x=0}^{4L} Q(x') \xi(x-x') dx \quad (18)$$

For the discrete case between kernel function sample values $Q_k$ and test function sample value $\xi_k$, where k represents the spatial index (the time index n is suppressed for this example), is given by:

$$\Delta \sum_{k'=0}^{4K-1} Q_{k'} \xi_{k-k'} \quad (19)$$

For band limited functions, sample values are simple values of the function evaluated at the sample times, namely $\xi_k \equiv \xi(x_k)$. When $k=0$ (i.e. $x=0$) the kernel sample value $F_0$ is infinite. Fortunately this log singularity is integrable. Thus we define the sample value at zero by integrating over the logarithmic singularity, divided by $\Delta$.

$$F_0 \equiv \frac{L}{2H} - \frac{1}{\Delta\pi}\int_{-\Delta/2}^{\Delta/2}\log(1 - e^{\pi|x|/H})dx \quad (20)$$

The integral may be done by expanding the exponent in a Taylor series, and then integrating the lowest order term, giving:

$$F_0 = \frac{L}{2H} - \frac{1}{\pi}\left[\log\left(\frac{\pi\Delta}{2H}\right) - 1\right] \quad (21)$$

In a similar way, the sample values of the two singular mass terms in the augmented kernel must be defined similarly as:

$$m_{eff} \equiv \frac{1}{\Delta}\int_{-\Delta/2}^{\Delta/2} m_p \delta(x) dx = \frac{m_p}{\Delta} \quad (22)$$

From the definitions we find:

$$Q_0 = \frac{m_p}{2\Delta} + \frac{\rho L}{H} - \frac{2\rho}{\pi}\left[\ln\left(\frac{\pi\Delta}{2H}\right) - 1\right] \quad (23)$$

While for $1 \leq k \leq K-1$:

$$Q_k = \frac{\rho L}{H}\left(1 - \frac{k}{K}\right) - \frac{2\rho}{\pi}\ln(1 - e^{-k\pi\Delta/H}) \quad (24)$$

Because of odd-harmonic symmetry $Q_k = Q_{-k} = -Q_{2K-k}$. Finally, the inverse kernel $Q^{-1}$ is computed as:

$$Q^{-1} \equiv F^{-1}[1/FQ] \quad (25)$$

where F is an FFT of length 4 L.

Since the conservation of fluid volume must hold, the volume integral along the BM must equal the stapes volume velocity $H\dot{u}_s$. This important numerically control may be tested in the final program by setting the stapes input to zero (i.e. $\dot{u}_s=0$), and setting the volume velocity at $t=0$ to one at $x=L/2$, and the propagating this initial condition. For this test the volume velocity of the BM must remain one until the pulse reaches $x=L$.

Solving equation (16) for $\xi_{n+1}$ gives:

$$\xi_{n+1} = 2\xi_n - \xi_{n-1} - T^2 Q^{-1} * b_n \quad (26)$$

where:

$$b_n \equiv \quad (27)$$
$$\frac{(R_O + g^2 r_t)(\xi_n - \xi_{n-1})}{T} + (K_O + g^2 k_t)\xi_n - \frac{2((|x|-L))_L(u_n - u_{n-1})\rho}{T}$$

Equations (26) and (27) are the final numerical solution of the cochlea response and represent the cochlear recursive equation (feedback loop between the BM and the fluid).

The cilia displacement may finally be calculated from equation (13) which is:

$$(m_c + m_t)\ddot{\theta} + (r_c + r_t)\dot{\theta} + (k_c + k_t)\theta = g[m_t\ddot{\xi} + r_t\dot{\xi} + k_t\xi] \quad (28)$$

Or in discrete time form:

$$\frac{(m_c + m_t)}{T^2}(\theta_n + 2\theta_{n-1} + \theta_{n-2}) + \frac{(r_c + r_t)}{T}(\theta_{n-1} - \theta_{n-2}) + (k_c + k_t)\theta_{n-1} = \quad (29)$$
$$g\left[\frac{(m_t)}{T^2}(\xi_n + 2\xi_{n-1} + \xi_{n-2}) + \frac{(r_t)}{T}(\xi_{n-1} - \xi_{n-2}) + (k_t)\xi_{n-1}\right]$$

Solving equation (29) for $X_n$:

$$\theta_n = 2\theta_{n-1} - \theta_{n-2} - T\frac{(r_c + r_t)}{(m_c + m_t)}(\theta_{n-1} - \theta_{n-2}) - T^2\frac{(k_c + k_t)}{(m_c + m_t)}\theta_{n-1} \quad (30)$$
$$\frac{gm_t}{(m_c + m_t)}\left[(\xi_n + 2\xi_{n-1} + \xi_{n-2}) + T\frac{r_t}{m_t}(\xi_{n-1} - \xi_{n-2}) + T^2\frac{k_t}{m_t}\xi_{n-1}\right]$$

Rearranged in common terms:

$$\theta_n = -a_1\theta_{n-1} - a_2\theta_{n-2} + b[\xi_n + b_1\xi_{n-1} + b_2\xi_{n-2}] \quad (31)$$

which defines the coefficients $a \equiv [a_1, a_2]$ and $b \equiv [b, b_1, b_2]$ by inspection:

$$a_1 = -2 + T\frac{(r_c + r_t)}{(m_c + m_t)} + T^2\frac{(k_c + k_t)}{(m_c + m_t)} \quad (32)$$

$$a_2 = 1 - T\frac{(r_c + r_t)}{(m_c + m_t)} \quad (33)$$

$$b_1 = -2 + T\frac{r_t}{m_t} + T^2\frac{k_t}{m_t}\xi_{n-1} \quad (34)$$

$$b_2 = 1 + T\frac{r_t}{m_t} \quad (35)$$

$$b = \frac{gm_t}{(m_c + m_t)} \times \frac{A_{fp}}{HW_{bm}} \quad (36)$$

Note that coefficient vector b is unrelated to $b_n$ defined by equation (27).

The last step is best taken with root transformation from the s place to the z plane, based on the impulse invariance transformation, as described Rabiner and Gold. This transformation is based on an invariance of the digital and analog sample value. IN other words, $\xi_n \equiv \xi(nT)$ determines the mapping between s to Z domains. These impulse invariant coefficients are more accurate, and extend the digital solution to higher frequencies (i.e. much closer to the maximum frequency, one half the Nyquist sampling rates).

A second order digital resonator is commonly defined in terms of poles $s_p$ and zeros $s_z$ in the analog s plane, by the impulse invariant conical form:

This system has a pair of complex conjugate pole and zero radian frequencies determined by $s_p = \sigma_p \pm iw_p$ and $s_z = \sigma_z \pm iw_z$, and with damping parameters defined by $R_p = e^{\sigma_p T}$ and $R_z = e^{\sigma_z T}$. The Nyquist frequency is related to the sample period T by $f_{Nyquist} = 1/T$.

$$\theta_n + 2R_p\cos(\omega_p T)\theta_{n-1} + R_p^2\theta_{n-2} = H_0[\xi_n + 2R_z\cos(\omega_z T)\xi_{n-1} + R_z^2\xi_{n-2}] \quad (37)$$

These two sets of coefficients a, b are best defined via the auxiliary parameters defined in the analog domain:

$$\sigma_p = -0.5(r_c + r_t)/(m_c + m_t) \quad (38)$$

$$\sigma_z = -0.5 r_t/m_t \quad (39)$$

$$\omega_p = \sqrt{(k_c + k_t)/(m_c + m_t)} \quad (40)$$

$$\omega_z = \sqrt{k_t/m_t} \quad (41)$$

$$g = 1 \quad (42)$$

Leading to the digital resonator coefficient definitions based on impulse invariance:

$$R_p = e^{\sigma_p T} \quad (43)$$

$$R_z = e^{\sigma_z T} \quad (44)$$

$$a_1 = -2R_p * \cos(\sqrt{\omega_p^2 - \sigma_p^2} T) \quad (45)$$

$$a_2 = R_p^2 \quad (46)$$

$$b_1 = -2R_z * \cos(\sqrt{\omega_z^2 - \sigma_z^2} T) \quad (47)$$

$$b_2 = R_z^2 \quad (48)$$

There is a simple relation between the finite difference and impulse invariance coefficients. If the $a_2$ based on impulse invariance, is expanded in a Taylor series in T to order 1, the less accurate finite difference $a_2$ results:

$$a_2 = e^{-2\sigma_a T} = 1 - 2\sigma_a T + O(T^2) \quad (49)$$

To find the coefficients $k_t$, $k_c$, $m_t$ and $m_c$, we solve the three following equations, determined from the definitions for $w_p(x)$, $w_x(x)$ and $w_{cf}(x)$ which are known from the literature:

$$\omega_z^2(x) \equiv \frac{k_t}{m_t} = [0.17\omega_p^{1.11}]^2 \quad (50)$$

$$\omega_p^2(x) \equiv \frac{k_t + k_c}{m_t + m_c} \quad (51)$$

And an equation that determines the tuning curve slope in the tail:

$$\frac{k_t}{k_c + k_t} = 0.01 \quad (52)$$

The cilia parameters from the Poiseuille formula:

$$r_c = \frac{\mu W_c}{h W_{bm}} \quad (53)$$

$$m_c = \frac{\rho W_c h}{3 W_{bm}} \quad (54)$$

And finally the TM mass equation:

$$(m_c + m_t) = 0.02 \quad (55)$$

In some configurations, the physiological cochlear model 1513 may provide response data (e.g., inner hair cell data) over a cochlear length. For example, a number of place points (e.g., samples) may model the response of the physiological cochlear model 1513 over a cochlear length for each sample of speech (e.g., for each sample of the modified speech signal 1511). The place points may correspond to places along the length of the cochlea. Places along the length of the cochlea may correspond to and respond to sounds at particular frequencies. For example, a first place point in a set of place points may correspond to sounds approximately in the 20 kilohertz (kHz) range, while a last place point may correspond to sounds at very low frequencies (e.g., 12 hertz (Hz)). Accordingly, the physiological cochlear model 1513 may "oversample" in that it may produce multiple place points for each speech sample. In some configurations, the physiological cochlear model 1513 may produce a set of place points for each sample of the modified speech signal 1511.

The physiological cochlear model(s) 1513 may provide an output 1515. The output 1515 may include place points over a length of time. For example, the output 1515 may include a set of place points for each speech sample over a length of time. The output 1515 may be provided to the section analysis module 1517. The section analysis module 1517 may analyze sections of the output 1515 of the physiological cochlear model 1513. For example, the section analysis module 1517 may group (e.g., split) the output 1515 (e.g., portions of the output) into multiple sections 1519. Each of the sections 1519 may correspond to a place range along the cochlear length. In some configurations, the section analysis module 1517 may group the output 1515 into four sections 1519. For example, the first section may include place points from 1 to 150, the second section may include place points from 151 to 275, the third section may include place points from 276 to 450 and the fourth section may include place points from 451 to 512. Each of the sections may include place points over a length of time (e.g., N samples). It should be noted that other section 1519 sizes may be utilized.

The sections 1519 may be provided to the vector extraction module 1521. The vector extraction module 1521 may extract vectors 1523 for each section 1519. In particular, the vector extraction module 1521 may extract a place-based analysis vector and a time-based analysis vector for each section 1519. A "place-based analysis vector" is a vector that includes multiple values over place. For example, the vector extraction module 1521 may determine a place-based analysis vector by averaging a section 1519 over time (which yields a vector with multiple values over place, for instance). A "time-based analysis vector" is a vector that includes multiple values over time. For example, the vector extraction module 1521 may determine a time-based analysis vector by averaging a section 1519 over place (which yields a vector with multiple values over time, for instance).

The vectors 1523 (e.g., one or more time-based analysis vectors and one or more place-based analysis vectors) may be provided to the feature determination module 1525. The feature determination module 1525 may determine one or more features 1527 from each vector 1523 (e.g., analysis vector). A feature 1527 may be a metric that quantifies a vector 1523 characteristic. Examples of features 1527 include averages (e.g., means), medians, geometric shifts, harmonic means, standard deviations, skewnesses, variances and others. The feature determination module 1525 may determine one or more of these kinds of features 1527 from each vector 1523. In some configurations, the feature determination module 1525 may determine the mean, median, geometric shift, harmonic mean, standard deviation and skewness of each vector 1523.

In some configurations, the electronic device 1507 may estimate a distortion based on the one or more features 1527. For example, the electronic device 1507 may include a distortion estimation module (not shown) that estimates one or more distortions based on one or more features 1527. For instance, the distortion estimation module may perform a regression (e.g., linear regression, polynomial regression, second order regression, non-linear regression, etc.) based on one or more of the features 1527 and one or more weights to estimate a distortion. In some configurations, the electronic device 1507 may estimate one or more qualities (e.g., foreground quality, background quality, overall quality, etc.) based on the one or more distortions as described herein.

Figure 16:
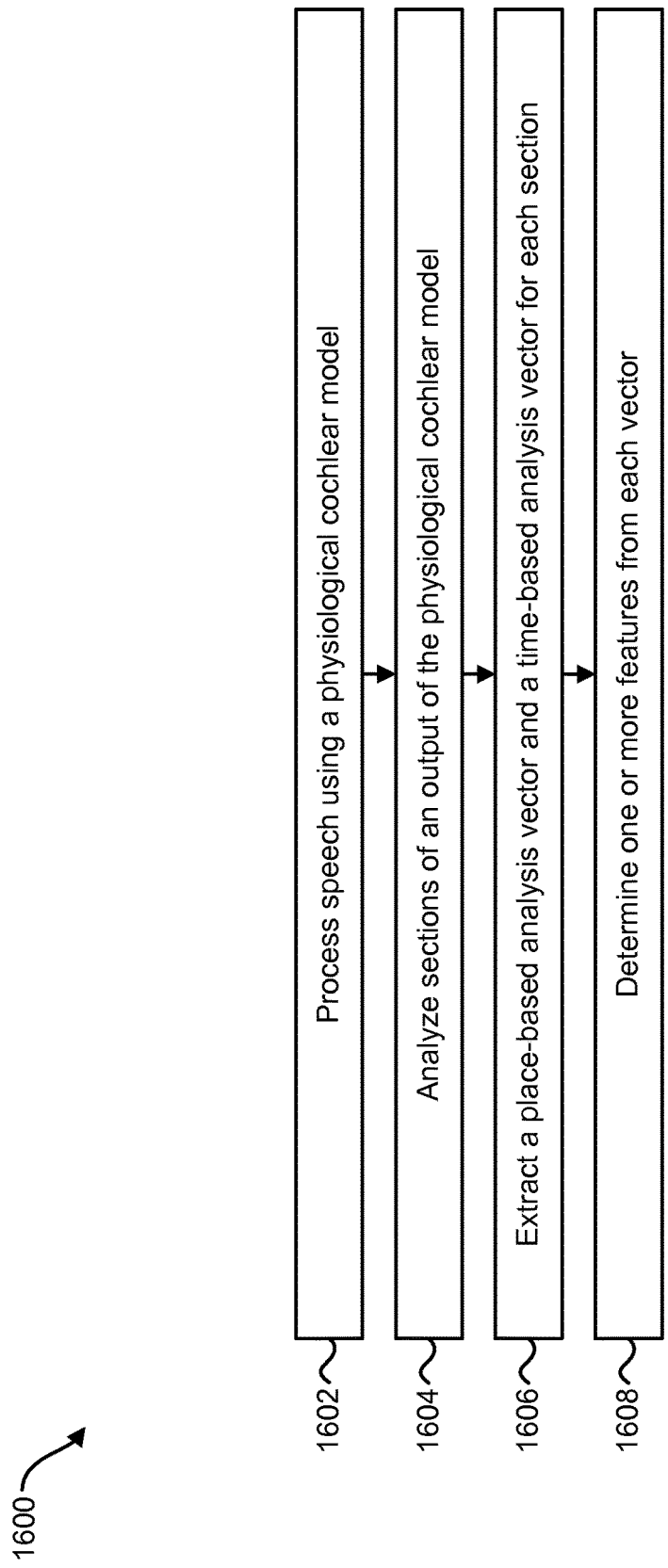
FIG. 16 is a flow diagram illustrating one configuration of a method for feature extraction.

FIG. 16 is a flow diagram illustrating one configuration of a method 1600 for feature extraction. The electronic device 1507 may perform one or more steps, functions and/or procedures of the method 1600.

The electronic device 1507 may process 1602 speech (e.g., the modified speech signal 1511 and/or the original speech signal 1509) using one or more physiological cochlear models 1513. This may be accomplished as described above. For example, the electronic device 1507 may determine a response of one or more physiological cochlear models 1513 based on the modified speech signal 1511 and/or the original speech signal 1509. For instance, the electronic device 1507 may determine a set of place points (e.g., samples) for each sample of a speech signal (e.g., the modified speech signal 1511). The output 1515 of the physiological cochlear model 1513 may include the sets of place points over a length of time (e.g., N samples).

The electronic device 1507 may analyze 1604 sections of the output 1515 of the physiological cochlear model 1513. This may be accomplished as described above. For example, the electronic device 1507 may group (e.g., split) portions of the output 1515 into multiple sections 1519 (e.g., four sections or another number of sections). Each of the sections 1519 may have a particular size (e.g., a number of place points by a number of N samples).

The electronic device 1507 may extract 1606 vectors 1523 for each section 1519. In particular, the electronic device 1507 may extract a place-based analysis vector and a time-based analysis vector for each section 1519. This may be accomplished as described above. For example, the electronic device 1507 may average a section 1519 over time to produce a place-based analysis vector 1523 and may average a section 1519 over place to produce a time-based analysis vector 1523.

The electronic device 1507 may determine 1608 one or more features 1527 from each vector 1523 (e.g., analysis vector). This may be accomplished as described above. For example, the electronic device 1507 may determine the mean, median, geometric shift, harmonic mean, standard deviation and skewness of each vector 1523.

Figure 17:
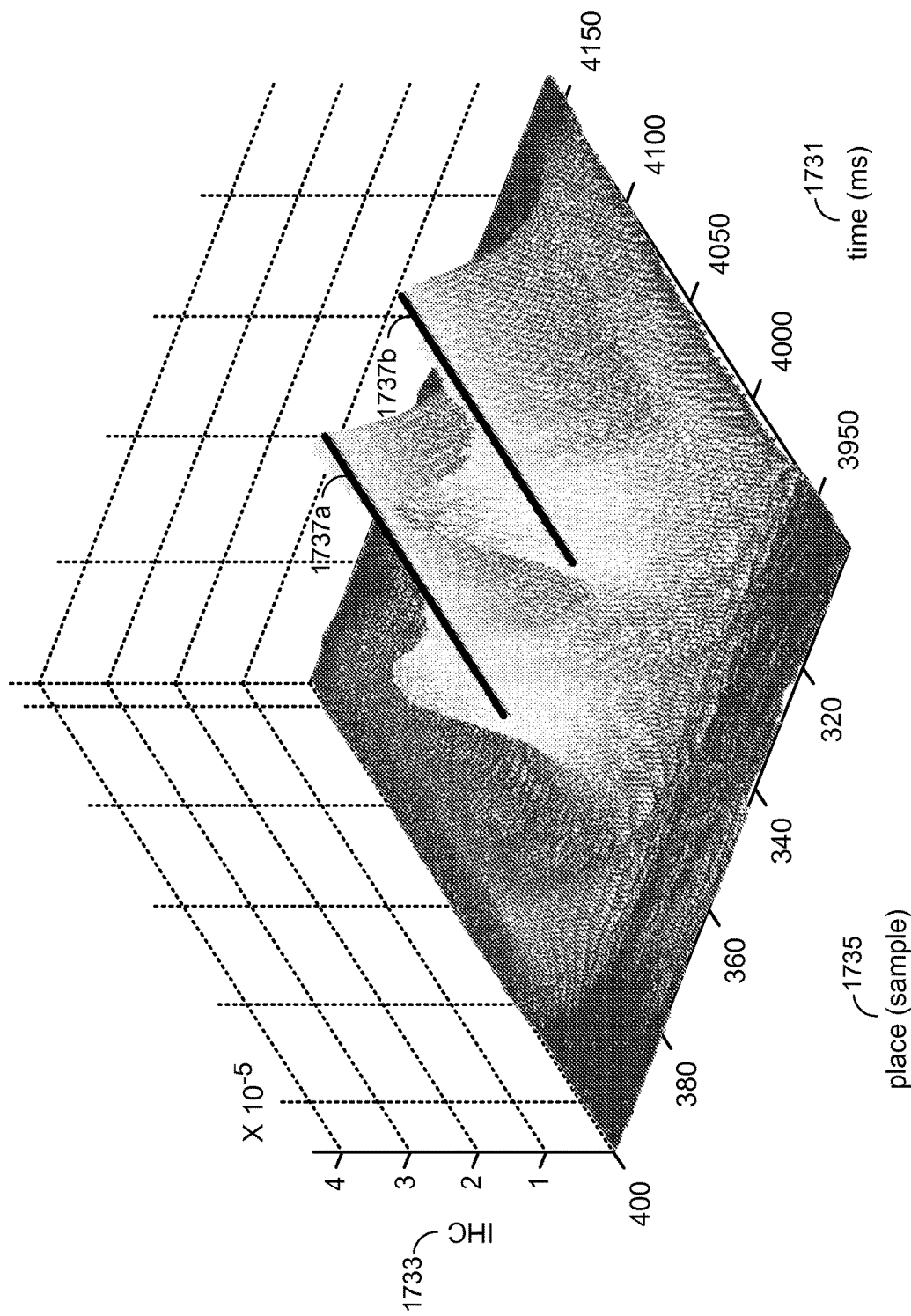
FIG. 17 is a graph illustrating one example of a physiological cochlear model output.

FIG. 17 is a graph illustrating one example of a physiological cochlear model output. In particular, the graph illustrates one example of a physiological cochlear model output for a voiced portion of speech. The axes of the graph include place (in samples) 1735, time (in milliseconds (ms)) 1731 and inner hair cell 1733 (amplitude of input speech signal). A physiological Cochlear Model (CM) is more accurate than known Psychoacoustic Masking Models (PMM). Specifically, the physiological cochlear model may provide much higher time-space resolution. The physiological cochlear model enables measurement of sound that approximates human perception. This may enable the determination of speech quality scores that better reflect human perception on speech distortions. The trend of the CM output is indicated by two lines 1737a-b included in the graph.

In the example illustrated in the FIG. 17, the CM output has three axes. The time axis is simple, where every input has one output. FIG. 17 illustrates a time 1731 plot between 3900 to 4150 milliseconds (ms). For input speech with an 8 kilohertz (kHz) sampling rate, this actually yields 8 points/ms. The place 1735 axis provides 512 points together, which map (non-linearly) to 15-20000 hertz (Hz). FIG. 17 is plotted from 300-400 along the place 1735 axis for better illustration. The IHC axis 1733 is the input amplitude.

Figure 18:
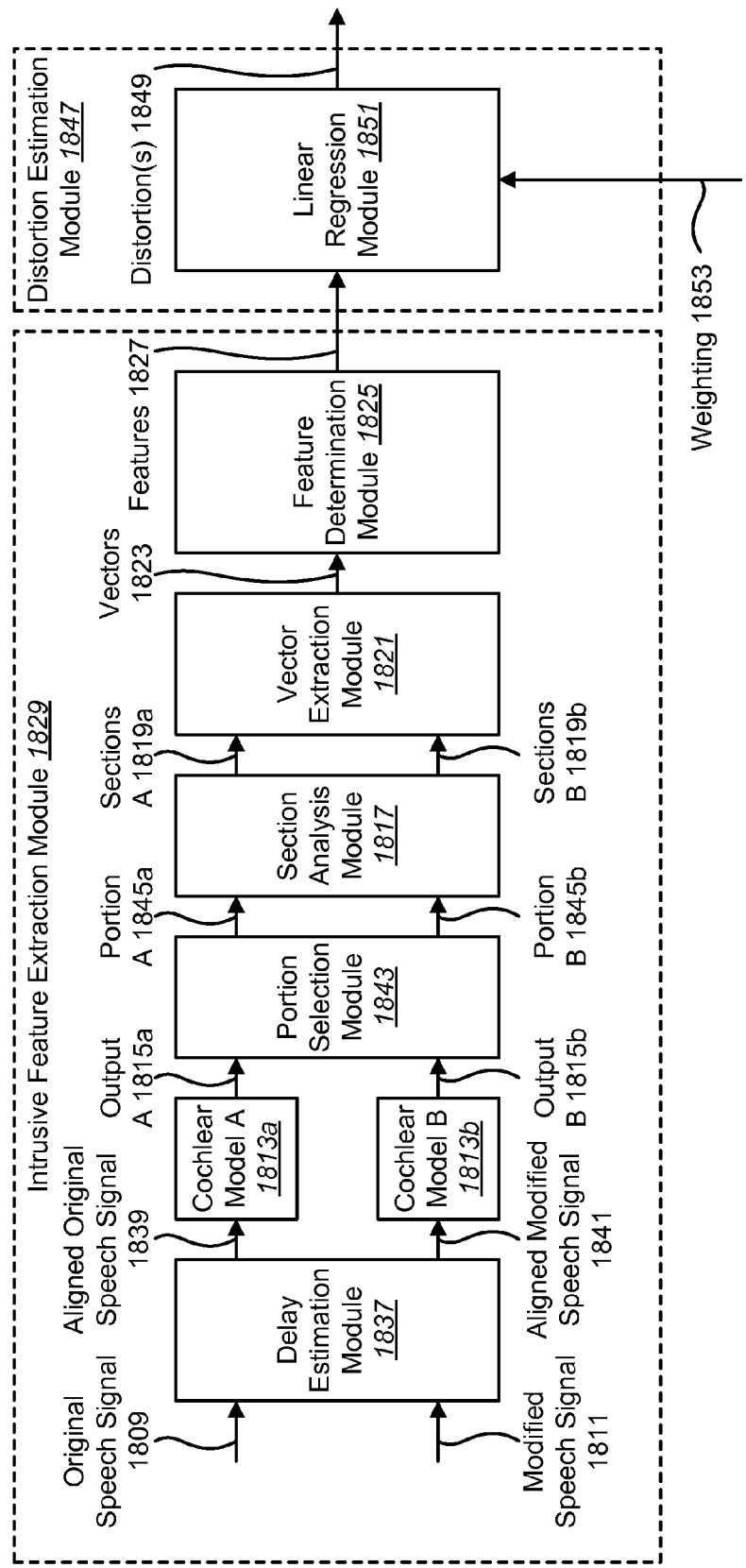
FIG. 18 is a block diagram illustrating one configuration of an intrusive feature extraction module.

FIG. 18 is a block diagram illustrating one configuration of an intrusive feature extraction module 1829. The intrusive feature extraction module 1829 may be one example of the feature extraction module 1529 described in connection with FIG. 15. The intrusive feature extraction module 1829 may include a delay estimation module 1837, cochlear models A-B 1813a-b, a portion selection module 1843, a section analysis module 1817, a vector extraction module 1821 and/or a feature determination module 1825. An original speech signal 1809 and a modified speech signal 1811 (e.g., a degraded version of the original speech signal 1809) may be used as the input for feature extraction. In other words, the intrusive feature extraction module 1829 may determine one or more features 1827. The one or more features 1827 may be used to estimate (e.g., predict) one or more distortions 1849 for the modified speech signal 1811. The length of the original speech signal 1809 and/or of the modified speech signal 1811 may be one frame, multiple frames or any suitable time length (e.g., 1, 2, 5, 10 seconds, etc.). Additionally or alternatively, the length of the original speech signal 1809 and/or the modified speech signal 1811 may be based on the speech itself (e.g., an entire sentence). For example, the length of the original speech signal and/or the modified speech signal 1811 may be configurable (by an operator of a wireless network and/or by a user, for instance).

The original speech signal 1809 and the modified speech signal 1811 may be optionally provided to the delay estimation module 1837. The delay estimation module 1837 may estimate a delay between the original speech signal 1809 and the modified speech signal 1811. For example, the delay estimation module 1837 may perform a correlation between the original speech signal 1809 and the modified speech signal 1811 to determine a delay (if there is a delay, for instance). The delay estimation module 1837 may delay the modified speech signal 1811, the original speech signal 1809 or both in order to align the modified speech signal 1811 and the original speech signal 1809. For example, if the delay estimation module 1837 estimates that the modified speech signal 1811 is delayed by a number of samples relative to the original speech signal 1809, the delay estimation module 1837 may delay the original speech signal 1809 in order to align the original speech signal 1809 and the modified speech signal 1811. Accordingly, the delay estimation module 1837 may provide an aligned original speech signal 1839 and an aligned modified speech signal 1841, where the aligned original speech signal 1839 and aligned modified speech signal 1841 are aligned in time (e.g., samples).

The aligned original speech signal 1839 may be provided to cochlear model A 1813a. The aligned modified speech signal 1841 may be provided to cochlear model B 1813b. The cochlear models A-B 1813a-b may be examples of the physiological cochlear model 1513 described in connection with FIG. 15. The cochlear models A-B 1813a-b may function as described in connection with FIG. 15. Accordingly, cochlear model A 1813a may produce output A 1815a and cochlear model B 1813b may produce output B 1815b.

The average human cochlea is about 3.5 centimeters (cm) in length, where each point on the cochlea responds to a different frequency. For example, the last place point may correspond to an approximate lowest perceivable frequency and the first place point may correspond to an approximate highest perceivable frequency. In some configurations, the cochlear models A-B 1813a-b may discretize the length of the cochlea into a number of place points (e.g., 512 place points or samples). For example, for each sample of the original speech signal 1809, cochlear model A 1813a may produce 512 place points and for each sample of the modified speech signal 1811, cochlear model B 1813b may produce 512 place points. Outputs A-B 1815a-b may include sets of place points over a range of samples (e.g., N). For example, output A 1815a may include N sets of place points corresponding to the original speech signal 1809 (e.g., aligned original speech signal 1839) and output B 1815b may include N sets of place points corresponding to the modified speech signal 1811 (e.g., aligned modified speech signal 1841).

Outputs A-B 1815a-b may be provided to the portion selection module 1843. The portion selection module 1843 may select portions A-B 1845a-b (e.g., "portions of interest") from the outputs A-B 1815a-b of the cochlear models A-B 1813a-b. For example, voiced portions of the original speech signal 1809 and the modified speech signal 1811 may be selected. For instance, voiced portions of speech signals may include vowel sounds, which may contribute significantly to perceived speech quality. In some configurations, the portion selection module 1843 may determine the energy of output A 1815a and/or output B 1815b. Portion A 1845a may be selected as a range of samples of output A 1815a where the energy of output A 1815a is above a first threshold. Portion B 1845b may be selected as a range of samples of output B 1815b where the energy of output B 1815b is above a second threshold. The first and second thresholds may be the same as or different from each other. The portion selection module 1843 may utilize other voice activity detection (VAD) approaches or modules to determine portions A-B 1845a-b.

Outputs A-B 1815a-b or portions A-B 1845a-b may be provided to the section analysis module 1817. The section analysis module 1817 may be one example of the section analysis module 1517 described in connection with FIG. 15. The section analysis module 1817 may analyze sections of outputs A-B 1815a-b of cochlear models A-B 1813a-b or portions A-B 1845a-b. For example, the section analysis module 1817 may group (e.g., split) outputs A-B 1815a-b or portions A-B 1845a-b into multiple sections A-B 1819a-b. In some configurations, the section analysis module 1817 may group each of outputs A-B 1815a-b or portions A-B 1845a-b into four sections A-B 1819a-b each. For example, the first section may include place points from 1 to 150, the second section may include place points from 151 to 275, the third section may include place points from 276 to 450 and the fourth section may include place points from 451 to 512. Each of sections A-B 1819a-b may include place points over a length of time (e.g., N samples).

The sections A-B 1819a-b may be provided to the vector extraction module 1821. The vector extraction module 1821 may be one example of the vector extraction module 1521 described in connection with FIG. 15. The vector extraction module 1821 may extract vectors 1823 for sections A-B 1819a-b. In particular, the vector extraction module 1821 may extract a place-based analysis vector and a time-based analysis vector for sections A-B 1819a-b.

The vectors 1823 (e.g., one or more time-based analysis vectors and one or more place-based analysis vectors) may be provided to the feature determination module 1825. The feature determination module 1825 may be one example of the feature determination module 1525 described in connection with FIG. 15. The feature determination module 1825 may determine one or more features 1827 from each vector 1823 (e.g., analysis vector). For example, the feature determination module 1825 may determine the mean, median, geometric shift, harmonic mean, standard deviation and skewness of each vector 1823.

In some configurations, the features 1827 may be provided to the distortion estimation module 1847. The distortion estimation module 1847 may be one example of the distortion estimation module described in connection with FIG. 15. The distortion estimation module 1847 may estimate one or more distortions 1849 based on the one or more features 1827. For example, the distortion estimation module 1847 may include a linear regression module 1851 that estimates one or more distortions 1849 based on one or more features 1827. For instance, the linear regression module 1851 may perform a linear regression based on one or more of the features 1827 and a weighting 1853 (e.g., one or more weights) to estimate one or more distortions 1849. The weighting 1853 may be determined based on training as described herein (e.g., as described in connection with one or more of FIGS. 8-9). In some configurations, the distortion estimation module 1847 may additionally or alternatively perform a polynomial regression, second order regression, non-linear regression, etc., in order to estimate the distortion(s) 1849. In some configurations, one or more qualities (e.g., foreground quality, background quality, overall quality, etc.) may be estimated based on the one or more distortions 1849 as described herein.

Some advantages of the intrusive approach described in connection with the systems and methods disclosed herein may include one or more of the following. The approach may be human perception oriented. It may provide high accuracy in speech quality measurement. It may provide insight (e.g., a description) on various types of speech distortions. The approach may utilize a hydro-mechanical cochlear model output (while other known solutions may not).

Figure 19:
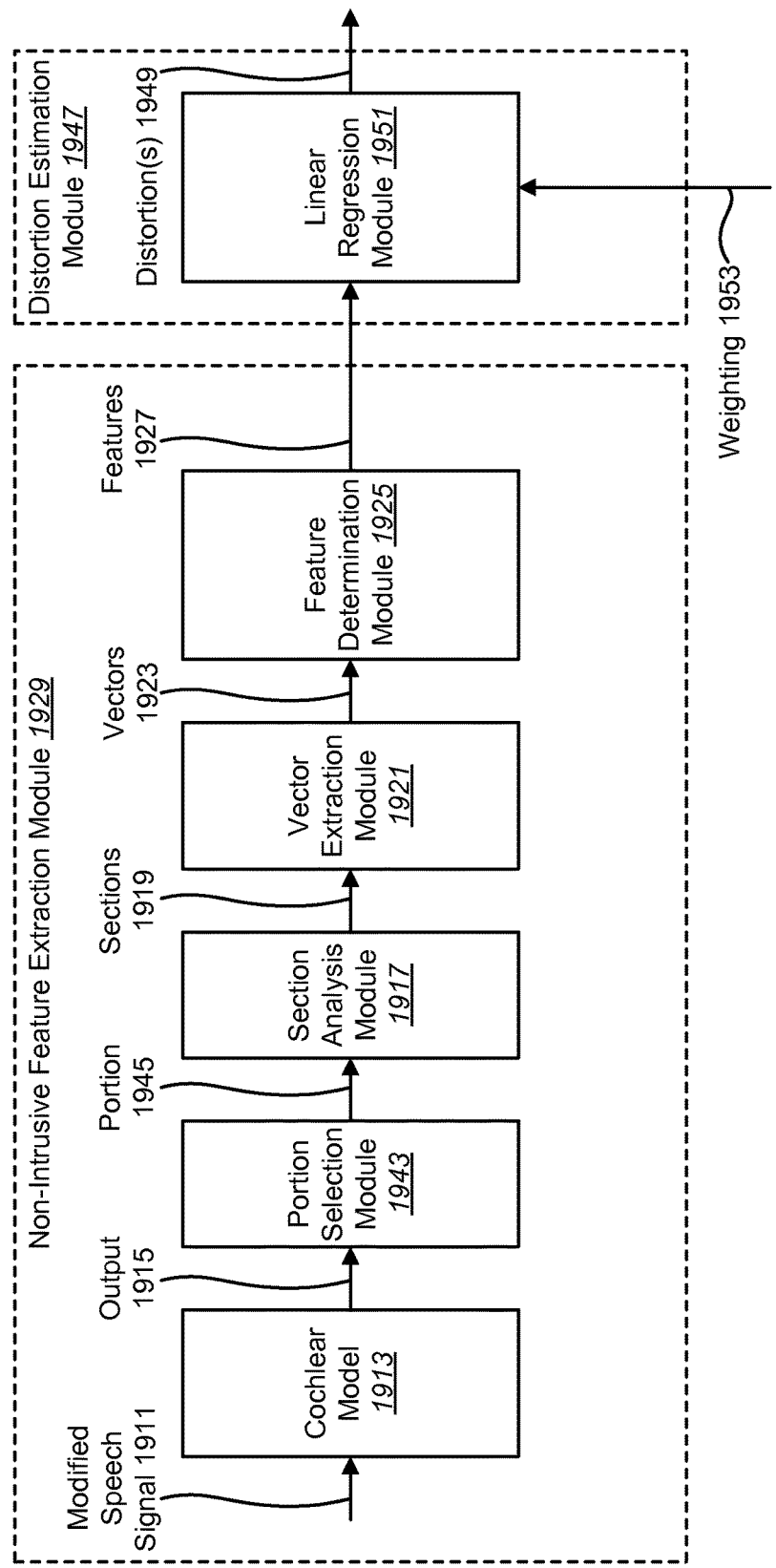
FIG. 19 is a block diagram illustrating one configuration of a non-intrusive feature extraction module.

FIG. 19 is a block diagram illustrating one configuration of a non-intrusive feature extraction module 1929. For example, FIG. 19 illustrates an approach for non-intrusive feature extraction from a cochlear model for speech and audio signal analysis in perceptual domain. The non-intrusive feature extraction module 1929 may be one example of the feature extraction module 1529 described in connection with FIG. 15. Non-intrusive feature extraction may be similar to the intrusive model of feature extraction, but the original speech (non-distorted) may not be available. The non-intrusive feature extraction module 1929 may include a cochlear model 1913, a portion selection module 1943, a section analysis module 1917, a vector extraction module 1921 and/or a feature determination module 1925. A modified speech signal 1911 (e.g., a degraded version of an original speech signal) may be used as the input for feature extraction. In other words, the non-intrusive feature extraction module 1929 may determine one or more features 1927. The one or more features 1927 may be used to estimate (e.g., predict) one or more distortions 1949 for the modified speech signal 1911. The length of the original speech signal 1909 and/or of the modified speech signal 1911 may be one frame, multiple frames or any suitable time length (e.g., 1, 2, 5, 10 seconds, etc.). Additionally or alternatively, the length of the modified speech signal 1911 may be based on the speech itself (e.g., an entire sentence). For example, the length of the modified speech signal 1911 may be configurable (by an operator of a wireless network and/or by a user, for instance).

The modified speech signal 1911 may be provided to the cochlear model 1913. The cochlear model 1913 may be an example of the physiological cochlear model 1513 described in connection with FIG. 15. The cochlear model 1913 may function as described in connection with FIG. 15. Accordingly, the cochlear model 1913 may produce an output 1915.

As described above, the average human cochlea is about 3.5 cm in length, where each point on the cochlea responds to a different frequency (ranging from an approximate lowest perceivable frequency to an approximate highest perceivable frequency, for example). In some configurations, the cochlear model 1913 may discretize the length of the cochlea into a number of place points (e.g., 512 place points or samples). For example, for each sample of the modified speech signal 1911, the cochlear model 1913 may produce 512 place points. The output 1915 may include sets of place points over a range of samples (e.g., N). For example, the output 1915 may include N sets of place points corresponding to the modified speech signal 1911.

The output 1915 may be provided to the portion selection module 1943. The portion selection module 1943 may select a portion 1945 (e.g., a "portion of interest") from the output 1915 of the cochlear model 1913. For example, voiced portions of the modified speech signal 1911 may be selected (e.g., voiced portions including vowel sounds). In some configurations, the portion selection module 1943 may determine the energy of the output 1915. The portion 1945 may be selected as a range of samples of the output 1915 where the energy of the output 1915 is above a threshold. The portion selection module 1943 may utilize other voice activity detection (VAD) approaches or modules to determine the portion 1945. Alternatively, silence portions may be detected and/or selected.

The output 1915 or the portion 1945 may be provided to the section analysis module 1917. The section analysis module 1917 may be one example of the section analysis module 1517 described in connection with FIG. 15. The section analysis module 1917 may analyze sections of the output 1915 of the cochlear model 1913 or of the portion 1945. For example, the section analysis module 1917 may group (e.g., split) the output 1915 or the portion 1945 into multiple sections 1919. In some configurations, the section analysis module 1917 may group the output 1915 or the portion 1945 into four sections 1919. For example, the first section may include place points from 1 to 150, the second section may include place points from 151 to 275, the third section may include place points from 276 to 450 and the fourth section may include place points from 451 to 512. Each of the sections 1919 may include place points over a length of time (e.g., N samples).

Each of the sections 1919 may be provided to the vector extraction module 1921. The vector extraction module 1921 may be one example of the vector extraction module 1521 described in connection with FIG. 15. The vector extraction module 1921 may extract vectors 1923 for each of the sections 1919. In particular, the vector extraction module 1921 may extract a place-based analysis vector and a time-based analysis vector for each section 1919.

The vectors 1923 (e.g., one or more time-based analysis vectors and one or more place-based analysis vectors) may be provided to the feature determination module 1925. The feature determination module 1925 may be one example of the feature determination module 1525 described in connection with FIG. 15. The feature determination module 1925 may determine one or more features 1927 from each vector 1923 (e.g., analysis vector). For example, the feature determination module 1925 may determine the mean, median, geometric shift, harmonic mean, standard deviation and skewness of each vector 1923.

In some configurations, the features 1927 may be provided to the distortion estimation module 1947. The distortion estimation module 1947 may be one example of the distortion estimation module described in connection with FIG. 15. The distortion estimation module 1947 may estimate one or more distortions 1949 based on the one or more features 1927. For example, the distortion estimation module 1947 may include a linear regression module 1951 that estimates one or more distortions 1949 based on one or more features 1927. For instance, the linear regression module 1951 may perform a linear regression based on one or more of the features 1927 and a weighting 1953 (e.g., one or more weights) to estimate one or more distortions 1949. The weighting 1953 may be determined based on training as described herein (e.g., as described in connection with one or more of FIGS. 8-9). In some configurations, the distortion estimation module 1947 may additionally or alternatively perform a polynomial regression, second order regression, non-linear regression, etc., in order to estimate the distortion(s) 1949. In some configurations, one or more qualities (e.g., foreground quality, background quality, overall quality, etc.) may be estimated based on the one or more distortions 1949 as described herein.

Some advantages of the non-intrusive approach described in connection with the systems and methods disclosed herein may include one or more of the following. The approach may be human perception oriented. It may provide high accuracy in speech quality measurement. It may provide insight (e.g., a description) on various types of speech distortions. The approach may utilize a hydro-mechanical cochlear model output (while other known solutions may not). It should be noted that the non-intrusive approach may not have access to as much information as intrusive methods. Therefore, it may be less accurate in quality measurement than the intrusive approach.

Figure 20:
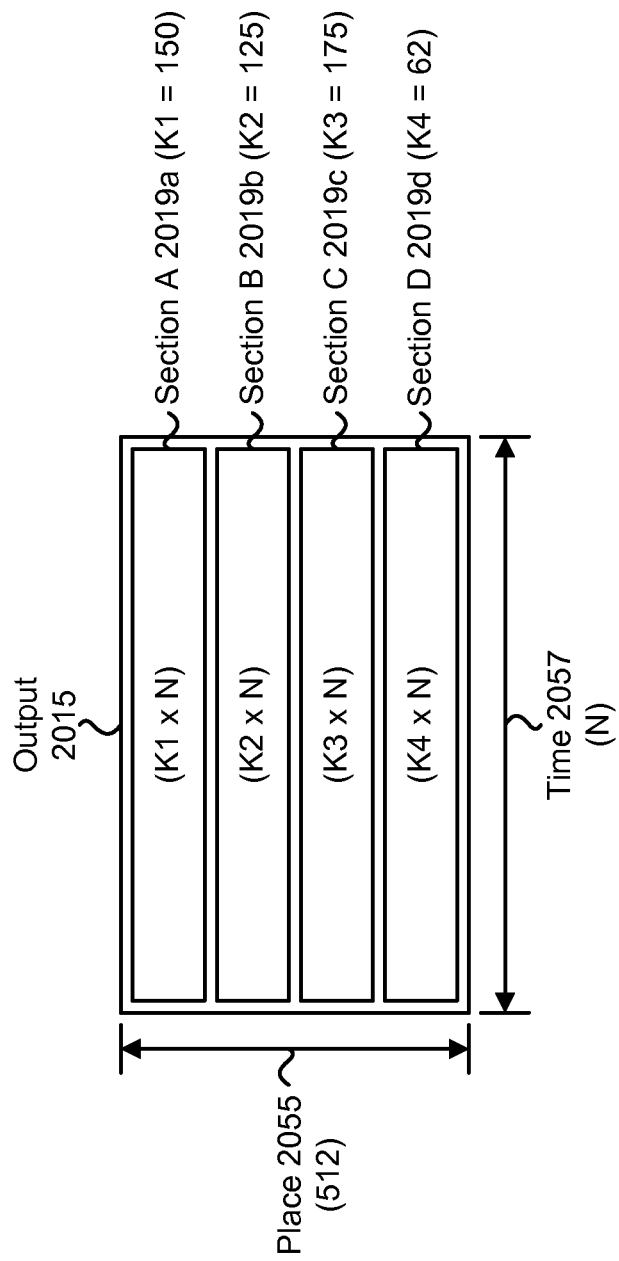
FIG. 20 is a block diagram illustrating one example of an output of a cochlear model that is being split into sections A-D.

FIG. 20 is a block diagram illustrating one example of an output 2015 of a cochlear model that is being split into sections A-D 2019a-d. In this example, the cochlear model may output 512 place points (e.g., samples) for every sample input, where each of the 512 place points corresponds to a point on the human cochlea. Therefore, if N samples are input, the cochlear model may output 512×N samples (e.g., the cochlear model output 2015 has a size of 512×N). As illustrated in FIG. 20, the horizontal axis is illustrated in time 2057. As illustrated in FIG. 20, the vertical axis is illustrated in place 2055 (e.g., place or position along the length of the cochlea, which can be mapped to frequency). In this example, the output 2015 includes 512 place points for each of N samples of a speech signal.

As described above, the output 2015 may be grouped or split into smaller sections. For example, a section analysis module (e.g., section analysis module 1517, 1817, 1917) may split the output 2015 of a cochlear model into four smaller sections A-D 2019a-d. Section A 2019a may include place points 1-150 across N samples of the time axis 2057 (resulting in a range (K1=150) of place points, for example). Section B 2019b may include place points 151-275 across N samples of the time axis 2057 (resulting in a range (K2=125) of place points, for example). Section C 2019c may include place points 276-450 across N samples of the time axis 2057 (resulting in a range (K3=175) of place points, for example). Section D 2019d may include place points 451-512 across N samples of the time axis 2057 (resulting in a range (K4=62) of place points, for example). Although the sections 2019 are illustrated with specific values, any suitable delineation may be used to define the sections 2019. Furthermore, the terms "section" and "region" may be used interchangeably to refer to parts of the cochlear model output. Splitting the output 2015 into smaller sections may enable approaches for managing a large amount of data and/or for frequency-related analysis.

Figure 21:
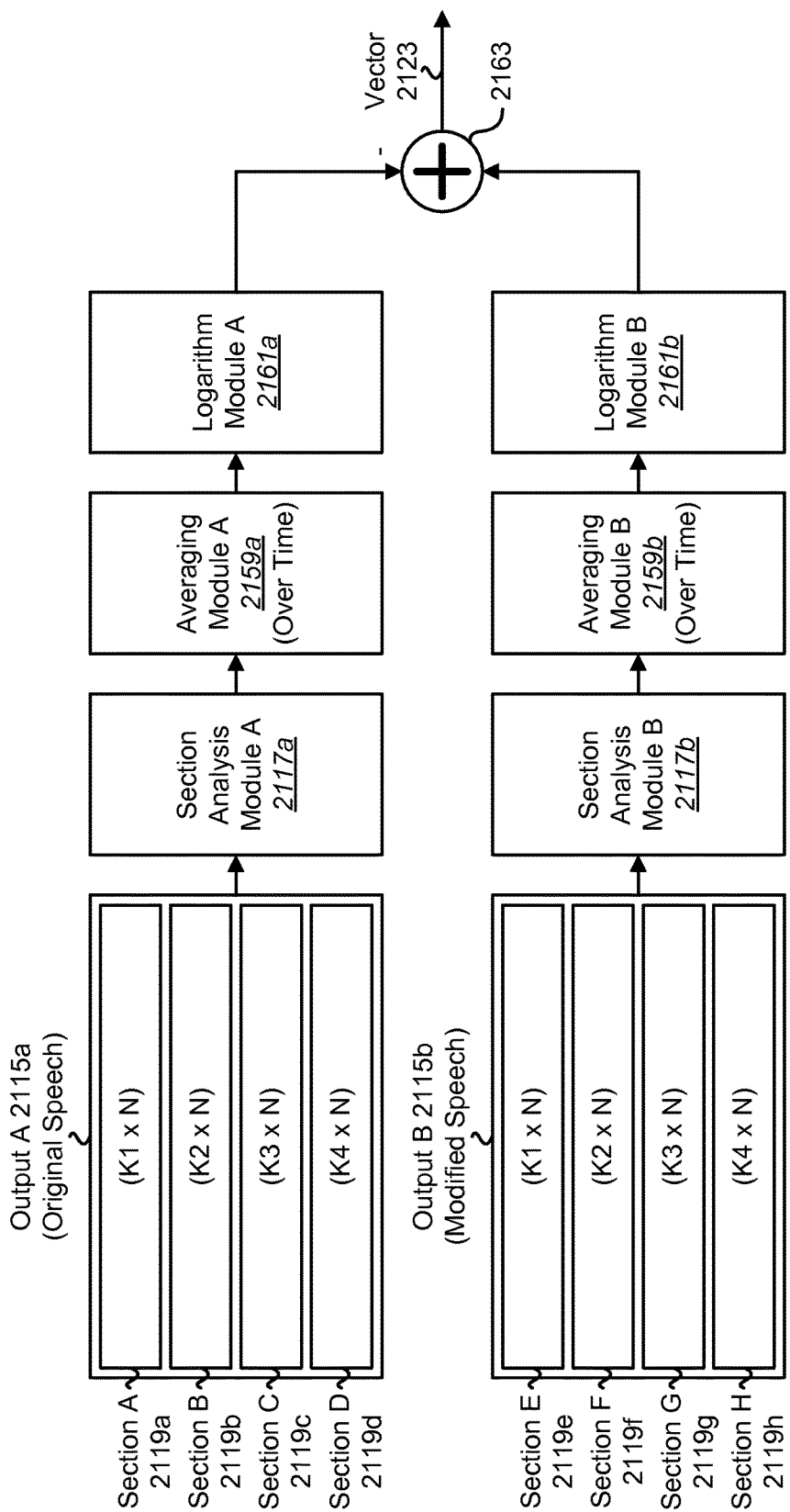
FIG. 21 is a block diagram illustrating one example of extracting a place-based analysis vector from sections of cochlear model outputs.

FIG. 21 is a block diagram illustrating one example of extracting a place-based analysis vector 2123 from sections 2119 of cochlear model outputs 2115. In particular, FIG. 21 illustrates an example of extracting a place-based (e.g., "type 1") analysis vector based on section A 2119a of the cochlear model output A 2115a for original speech and section E 2119e of the cochlear model output B 2115b for modified (e.g., degraded) speech. One or more of the operations described in connection with FIG. 21 may be performed by the electronic device 1507 (e.g., feature extraction module 1529) described in connection with FIG. 15.

Specifically, this example illustrates output A 2115a of a cochlear model that is based on an original speech signal. Output A 2115a includes sections A-D 2119a-d. Furthermore, this example illustrates output B 2115b of a cochlear model that is based on a modified speech signal. Output B 2115b includes sections E-H 2119e-h.

Section analysis module A 2117a splits output A 2115a into sections A-D 2119a-d and provides section A 2119a to averaging module A 2159a. In other words, section analysis module A 2117a provides K1×N samples (e.g., section A 2119a) of the cochlear model output A 2115a to averaging module A 2159a. Averaging module A 2159a averages section A 2119a over time. This average is provided to logarithm module A 2161a, which performs a $\log_{10}$ operation on the average. The logarithm of the average (e.g., first log average) is provided to a summer 2163.

Section analysis module B 2117b splits output B 2115b into sections E-H 2119e-h and provides section E 2119e to averaging module B 2159b. In other words, section analysis module B 2117b provides K1×N samples (e.g., section E 2119e) of the cochlear model output B 2115b to averaging module B 2159b. Averaging module B 2159b averages section E 2119e over time. This average is provided to logarithm module B 2161b, which performs a $\log_{10}$ operation on the average. The logarithm of the average (e.g., second log average) is provided to the summer 2163.

The summer takes the difference of the first log average and the second log average to produce the analysis vector 2123 (e.g., "type 1" analysis vector). This analysis vector 2123 (e.g., "type 1" analysis vector) may be referred to as a place-based analysis vector or an intrusive place-based analysis vector. For instance, place-based analysis vectors 2123 may be determined in an intrusive approach, which utilizes the original speech signal and a modified speech signal. Although these operations are illustrated for the first sections (section A 2119a and section E 2119e) of outputs A-B 2115a-b, an analysis vector 2123 may be determined for any and/or all of the four sections illustrated in one or more of FIGS. 20 and 21. As used herein, the terms "analysis serial" and "analysis vector" may be used interchangeably to refer to an intermediate vector from which features of speech are extracted.

Figure 22:
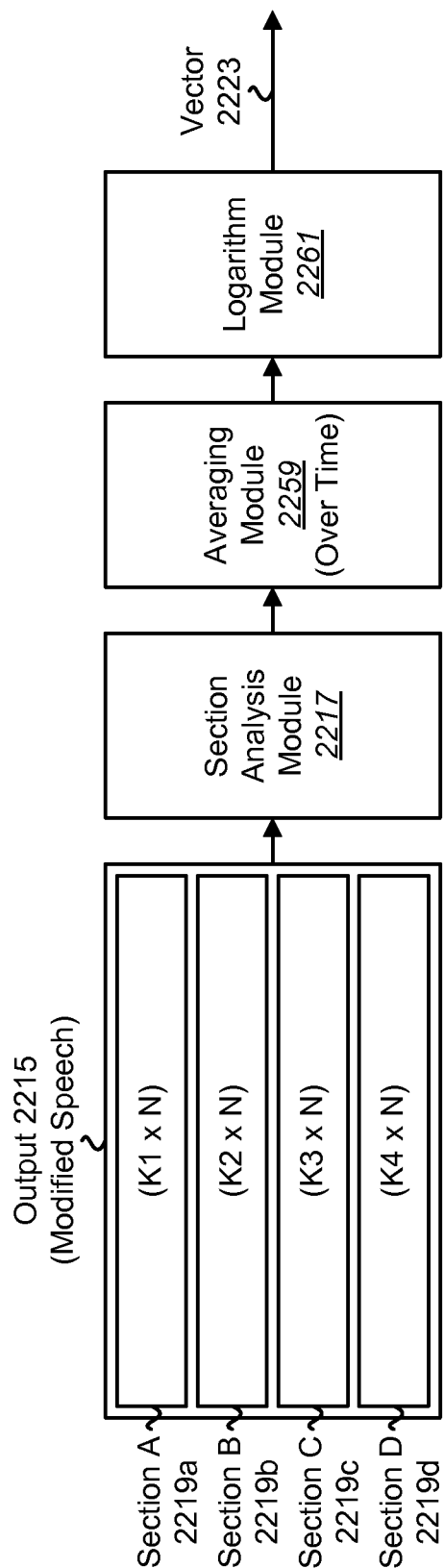
FIG. 22 is a block diagram illustrating another example of extracting a place-based analysis vector from section A of a cochlear model output.

FIG. 22 is a block diagram illustrating another example of extracting a place-based analysis vector 2223 from section A 2219a of a cochlear model output 2215. In particular, FIG. 22 illustrates an example of extracting a place-based (e.g., "type 2") analysis vector based on section A 2219a of the cochlear model output 2215 for modified (e.g., degraded) speech. It should be noted that a similar approach may be utilized to extract a place-based analysis vector for original speech. One or more of the operations described in connection with FIG. 22 may be performed by the electronic device 1507 (e.g., feature extraction module 1529) described in connection with FIG. 15.

Specifically, this example illustrates an output 2215 of a cochlear model that is based on a modified speech signal. The output 2215 includes sections A-D 2219a-d. The section analysis module 2217 splits the output 2215 into sections A-D 2219a-d and provides section A 2219a to the averaging module 2259. In other words, the section analysis module 2217 provides K1×N samples (e.g., section A 2219a) of the cochlear model output 2215 to the averaging module 2259. The averaging module 2259 averages section A 2219a over time. This average is provided to the logarithm module 2261, which performs a $\log_{10}$ operation on the average. The logarithm of the average (e.g., log average) is the analysis vector 2223 (e.g., "type 2" analysis vector). This analysis vector 2263 (e.g., "type 2" analysis vector) may be referred to as a place-based analysis vector or a non-intrusive place-based analysis vector. For instance, place-based analysis vectors 2223 may be determined in a non-intrusive approach, which utilizes the modified speech signal (and not the original speech signal, for example). Although these operations are illustrated for the first section (section A 2219a) of the output 2215, an analysis vector 2223 may be determined for any and/or all of the four sections illustrated in one or more of FIGS. 20 and 22.

Figure 23:
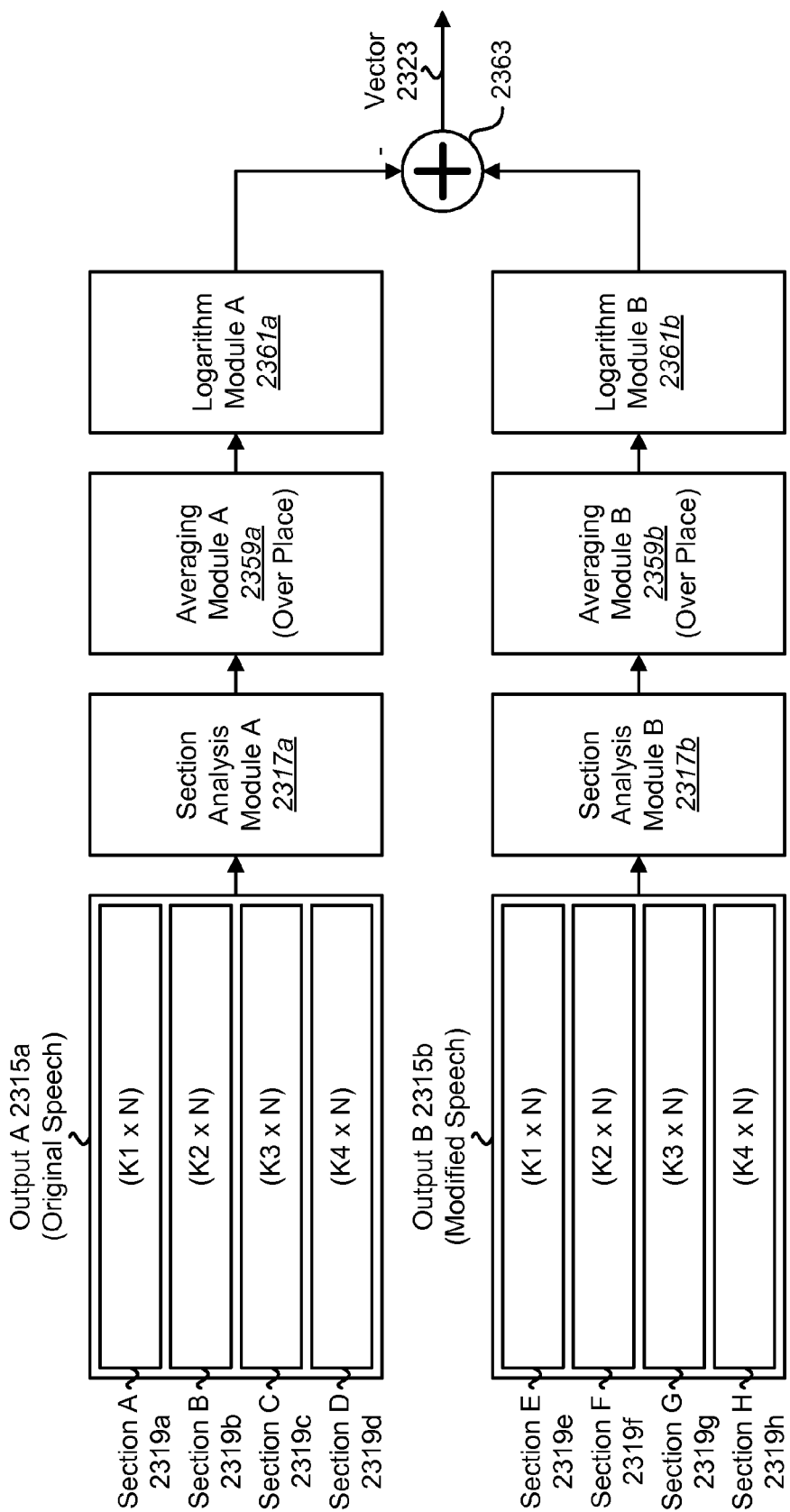
FIG. 23 is a block diagram illustrating one example of extracting a time-based analysis vector from sections of cochlear model outputs.

FIG. 23 is a block diagram illustrating one example of extracting a time-based analysis vector 2323 from sections 2319 of cochlear model outputs 2315. In particular, FIG. 23 illustrates an example of extracting a time-based (e.g., "type 3") analysis vector based on section A 2319a of the cochlear model output A 2315a for original speech and section E 2319e of the cochlear model output B 2315b for modified (e.g., degraded) speech. One or more of the operations described in connection with FIG. 23 may be performed by the electronic device 1507 (e.g., feature extraction module 1529) described in connection with FIG. 15.

Specifically, this example illustrates output A 2315a of a cochlear model that is based on an original speech signal. Output A 2315a includes sections A-D 2319a-d. Furthermore, this example illustrates output B 2315b of a cochlear model that is based on a modified speech signal. Output B 2315b includes sections E-H 2319e-h.

Section analysis module A 2317a splits output A 2315a into sections A-D 2319a-d and provides section A 2319a to averaging module A 2359a. In other words, section analysis module A 2317a provides K1×N samples (e.g., section A 2319a) of the cochlear model output A 2315a to averaging module A 2359a. Averaging module A 2359a averages section A 2319a over place. This average is provided to logarithm module A 2361a, which performs a $\log_{10}$ operation on the average. The logarithm of the average (e.g., first log average) is provided to a summer 2363.

Section analysis module B 2317b splits output B 2315b into sections E-H 2319e-h and provides section E 2319e to averaging module B 2359b. In other words, section analysis module B 2317b provides K1×N samples (e.g., section E 2319e) of the cochlear model output B 2315b to averaging module B 2359b. Averaging module B 2359b averages section E 2319e over place (e.g., place along the cochlea, which may correspond to frequency). This average is provided to logarithm module B 2361b, which performs a $\log_{10}$ operation on the average. The logarithm of the average (e.g., second log average) is provided to the summer 2363.

The summer takes the difference of the first log average and the second log average to produce the analysis vector 2323 (e.g., "type 3" analysis vector). This analysis vector 2323 (e.g., "type 3" analysis vector) may be referred to as a time-based analysis vector or an intrusive time-based analysis vector. For instance, time-based analysis vectors 2323 may be determined in an intrusive approach, which utilizes the original speech signal and a modified speech signal. Although these operations are illustrated for the first sections (section A 2319a and section E 2319e) of outputs A-B 2315a-b, an analysis vector 2323 may be determined for any and/or all of the four sections illustrated in one or more of FIGS. 20 and 23.

Figure 24:
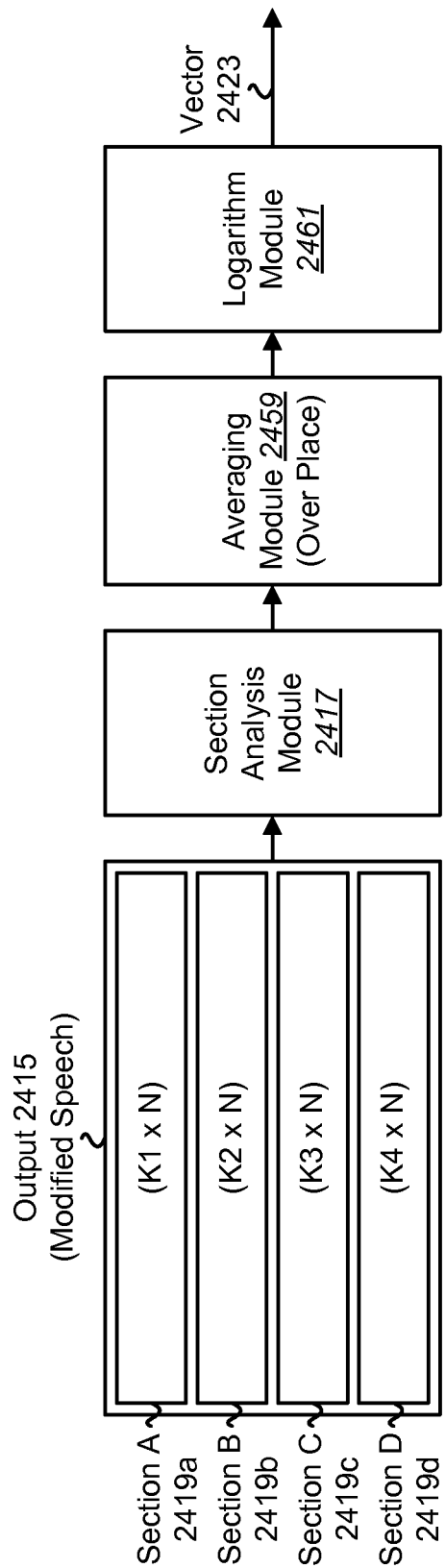
FIG. 24 is a block diagram illustrating another example of extracting a time-based analysis vector from section A of a cochlear model output.

FIG. 24 is a block diagram illustrating another example of extracting a time-based analysis vector 2423 from section A 2419a of a cochlear model output 2415. In particular, FIG. 24 illustrates an example of extracting a time-based (e.g., "type 4") analysis vector based on section A 2419a of the cochlear model output 2415 for modified (e.g., degraded) speech. It should be noted that a similar approach may be utilized to extract a time-based analysis vector for original speech. One or more of the operations described in connection with FIG. 24 may be performed by the electronic device 1507 (e.g., feature extraction module 1529) described in connection with FIG. 15.

Specifically, this example illustrates an output 2415 of a cochlear model that is based on a modified speech signal. The output 2415 includes sections A-D 2419a-d. The section analysis module 2417 splits the output 2415 into sections A-D 2419a-d and provides section A 2419a to the averaging module 2459. In other words, the section analysis module 2417 provides K1×N samples (e.g., section A 2419a) of the cochlear model output 2415 to the averaging module 2459. The averaging module 2459 averages section A 2419a over place (e.g., place along the cochlea, which may correspond to frequency). This average is provided to the logarithm module 2461, which performs a $\log_{10}$ operation on the average. The logarithm of the average (e.g., log average) is the analysis vector 2423 (e.g., "type 4" analysis vector). This analysis vector 2463 (e.g., "type 4" analysis vector) may be referred to as a time-based analysis vector or a non-intrusive time-based analysis vector. For instance, time-based analysis vectors 2423 may be determined in a non-intrusive approach, which utilizes the modified speech signal (and not the original speech signal, for example). Although these operations are illustrated for the first section (section A 2419a) of the output 2415, an analysis vector 2423 may be determined for any and/or all of the four sections illustrated in one or more of FIGS. 20 and 24.

Figure 25:
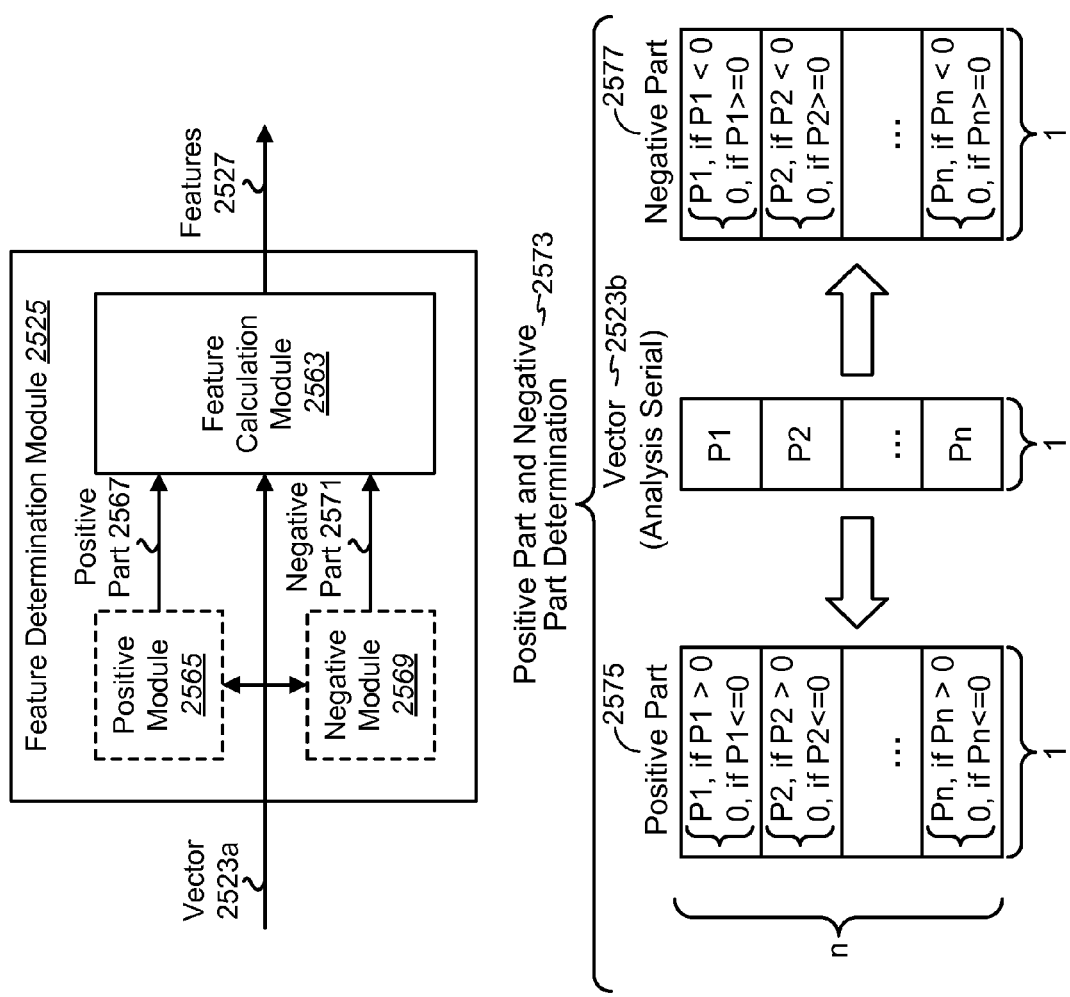
FIG. 25 includes a block diagram illustrating configurations of a feature determination module.

FIG. 25 includes a block diagram illustrating configurations of a feature determination module 2525. The feature determination module 2525 described in connection with FIG. 25 may be one example of one or more of the feature determination modules 1525, 1825, 1925 described herein. The feature determination module 2525 may include a feature calculation module 2563, a positive module 2565 and/or a negative module 2569. In some configurations, the positive module 2565 and the negative module 2569 may be implemented and/or utilized in intrusive approaches. In some configurations, the positive module 2565 and the negative module 2569 are optional and/or may not be implemented and/or utilized in non-intrusive approaches.

A vector 2523a may be provided to the feature determination module 2525. In particular, the vector 2523a may be provided to the feature calculation module 2563, to the positive module 2565 and/or to the negative module 2569.

The positive module 2565 may determine a positive part 2567 of the vector 2523a. For example, the positive module 2565 may change any negative values in the vector 2523a to zero. The positive module 2565 may also leave any positive values in the vector 2523a unchanged.

The negative module 2569 may determine a negative part 2571 of the vector 2523a. For example, the negative module 2569 may change any positive values in the vector 2523a to zero. The negative module 2569 may also leave any negative values in the vector 2523a unchanged.

The vector 2523a, the positive part 2567 and/or the negative part 2571 may be provided to the feature calculation module 2563. The feature calculation module 2563 may determine (e.g., calculate) one or more features for each of the vector 2523a, the positive part 2567 and/or the negative part 2571. For example, the feature calculation module 2563 may calculate an average (e.g., mean), median, geometric shift, harmonic mean, standard deviation, skewness and/or other feature for each of the vector 2523a, the positive part 2567 and/or the negative part 2571.

One approach for determining the positive part and the negative part of a vector 2523b is illustrated in FIG. 25. In particular, FIG. 25 provides one example of a positive part and negative part determination 2573. A vector 2523b (e.g., analysis vector or analysis serial) may have n values or entries: P1-Pn. A positive part 2575 (e.g., positive vector, analysis serial positive) and a negative part 2577 (e.g., negative vector, analysis serial negative) may be created. Each value in the positive part 2575 may be created based on the corresponding value in the vector 2523b with the same index (e.g., the first entry in the positive part 2575 is based on the first entry in the vector 2523b). For example, if P1>0 in the vector 2523b, P1 in the positive part 2575 is P1. However, if P1<=0 in the vector 2523b, P1 in the positive part 2575 is 0. Conversely, if P<0 in the vector 2523b, P1 in the negative part 2577 is P1. However, if P1>=0 in the vector 2523b, P1 in the negative part 2577 is 0. This may be done for every value or entry in the vector 2523b to populate the positive part 2575 and/or the negative part 2577, from which features (e.g., features 2527) may be extracted.

Figure 26:
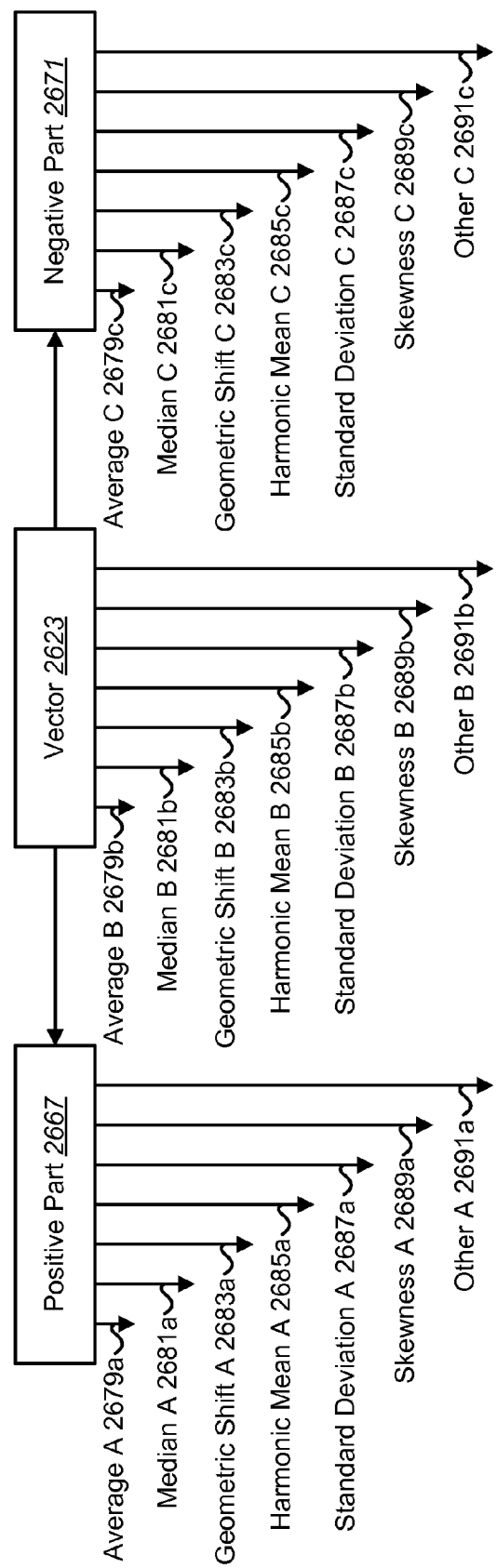
FIG. 26 illustrates an example of feature determination.

FIG. 26 illustrates an example of feature determination. In some configurations, the feature determination illustrated in FIG. 26 may be performed by one or more of the feature determination modules 1525, 1825, 2525 described herein. In particular, the feature determination illustrated in FIG. 26 may be performed in intrusive approaches (e.g., for intrusive place-based vectors ("type 1") and for intrusive time-based vectors ("type 3")). In this example, a single intrusive place-based vector or a single intrusive time-based vector may produce 18 features (e.g., feature values): 6 from the vector 2623 itself, 6 from the positive part 2667 of the analysis vector 2623 and 6 from the negative part 2671 of the analysis vector 2623. In some configurations, each of the features or feature values may be determined (e.g., calculated) by a corresponding module. For example, each module may yield a single feature or feature value.

In some configurations, a feature determination module (e.g., feature determination module 2525 described in connection with FIG. 25) may determine average A 2679a, median A 2681a, geometric shift A 2683a, harmonic mean A 2685a, standard deviation A 2687a and skewness A 2689a for the positive part 2667 of the vector 2623. Additionally or alternatively, the feature determination module may determine average B 2679b, median B 2681b, geometric shift B 2683b, harmonic mean B 2685b, standard deviation B 2687b and skewness B 2689b for the vector 2623 itself. Additionally or alternatively, the feature determination module may determine average C 2679c, median C 2681c, geometric shift C 2683c, harmonic mean C 2685c, standard deviation C 2687c and skewness C 2689c for the negative part 2671 of the vector 2623.

For the positive part 2667, the feature determination module may determine one or more other A 2691a features or feature values. For the vector 2623, the feature determination module may additionally or alternatively determine one or more other B 2691b features or feature values. For the negative part 2671, the feature determination module may additionally or alternatively determine one or more other C 2691c features or feature values. One or more features or features values may be grouped together in a feature set. For example, average B 2679b, median B 2681b, geometric shift B 2683b, harmonic mean B 2685b, standard deviation B 2687b and skewness B 2689b may be grouped into a feature set.

Figure 27:
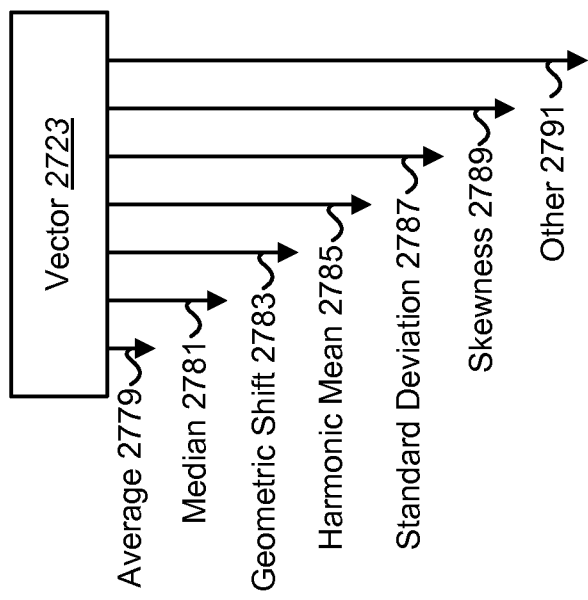
FIG. 27 illustrates another example of feature determination.

FIG. 27 illustrates another example of feature determination. In some configurations, the feature determination illustrated in FIG. 27 may be performed by one or more of the feature determination modules 1525, 1825, 1925, 2525 described herein. In particular, the feature determination illustrated in FIG. 27 may be performed in non-intrusive approaches (e.g., for non-intrusive place-based vectors ("type 2") and for non-intrusive time-based vectors ("type 4")) and/or in intrusive approaches (e.g., for intrusive place-based vectors ("type 1") and for intrusive time-based vectors ("type 3")). In this example, a single intrusive place-based vector or a single intrusive time-based vector may produce 6 features (e.g., feature values) from the vector 2723. In some configurations, each of the features or feature values may be determined (e.g., calculated) by a corresponding module. For example, each module may yield a single feature or feature value.

In some configurations, a feature determination module (e.g., feature determination module 2525 described in connection with FIG. 25) may determine an average 2779, a median 2781, a geometric shift 2783, a harmonic mean 2785, a standard deviation 2787 and a skewness 2789 for the vector 2723. For the vector 2723, the feature determination module may additionally or alternatively determine one or more other 2791 features or feature values. One or more features or features values may be grouped together in a feature set. For example, an average 2779, a median 2781, a geometric shift 2783, a harmonic mean 2785, a standard deviation 2787 and a skewness 2789 may be grouped into a feature set.

Figure 28:
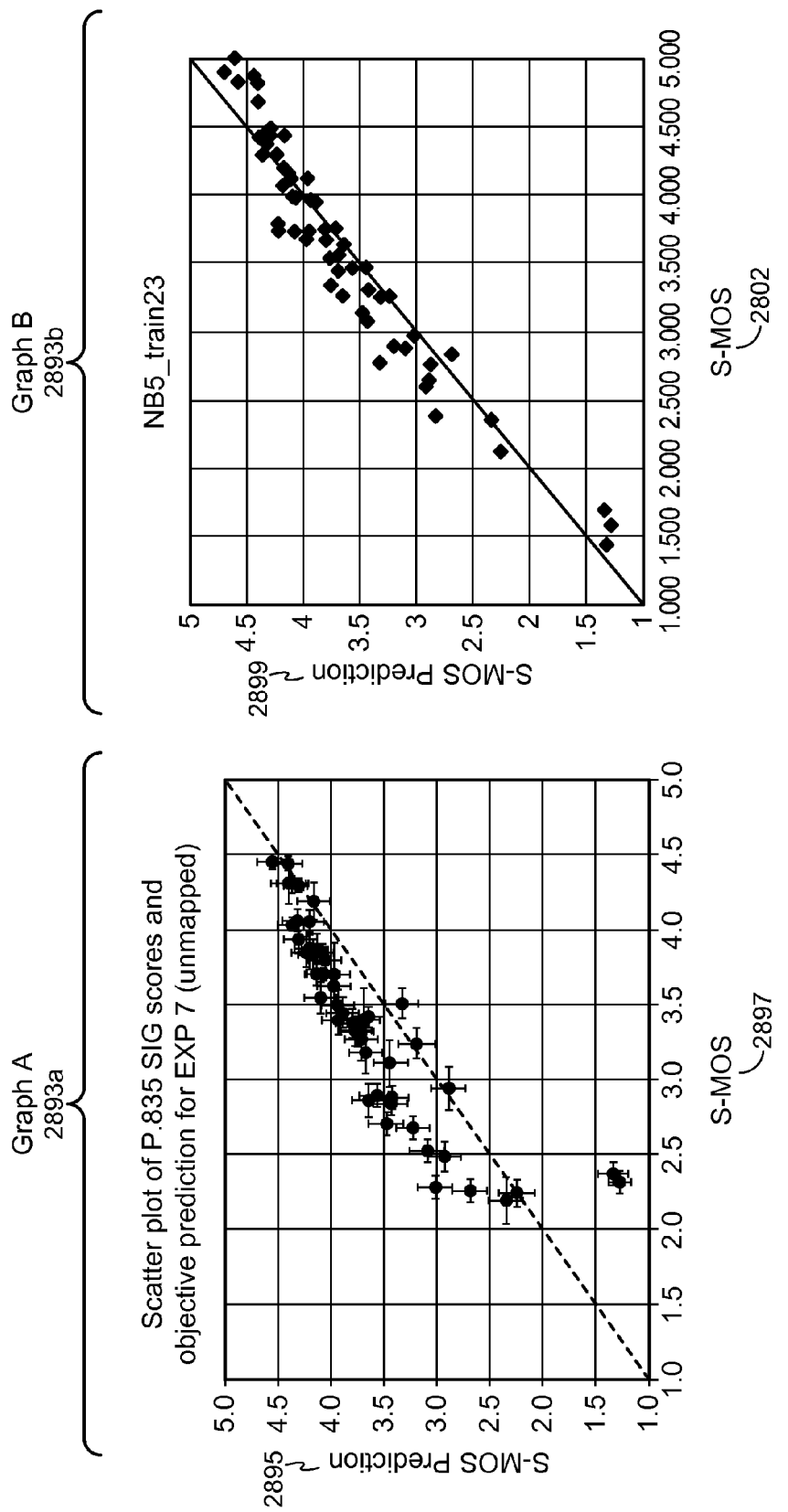
FIG. 28 illustrates one example of objective prediction in accordance with the systems and methods disclosed herein.
Figure 29:
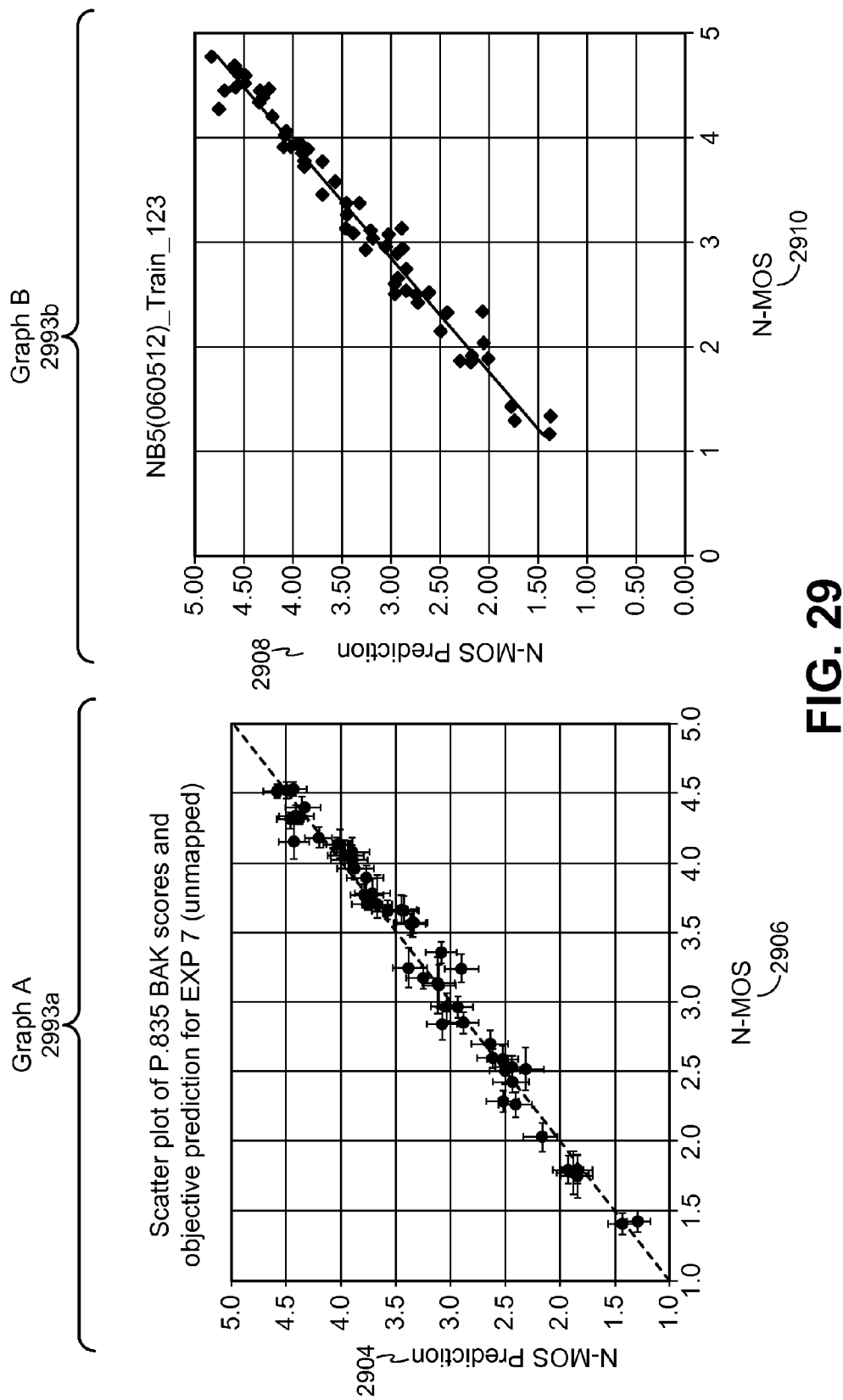
FIG. 29 illustrates another example of objective prediction in accordance with the systems and methods disclosed herein.
Figure 30:
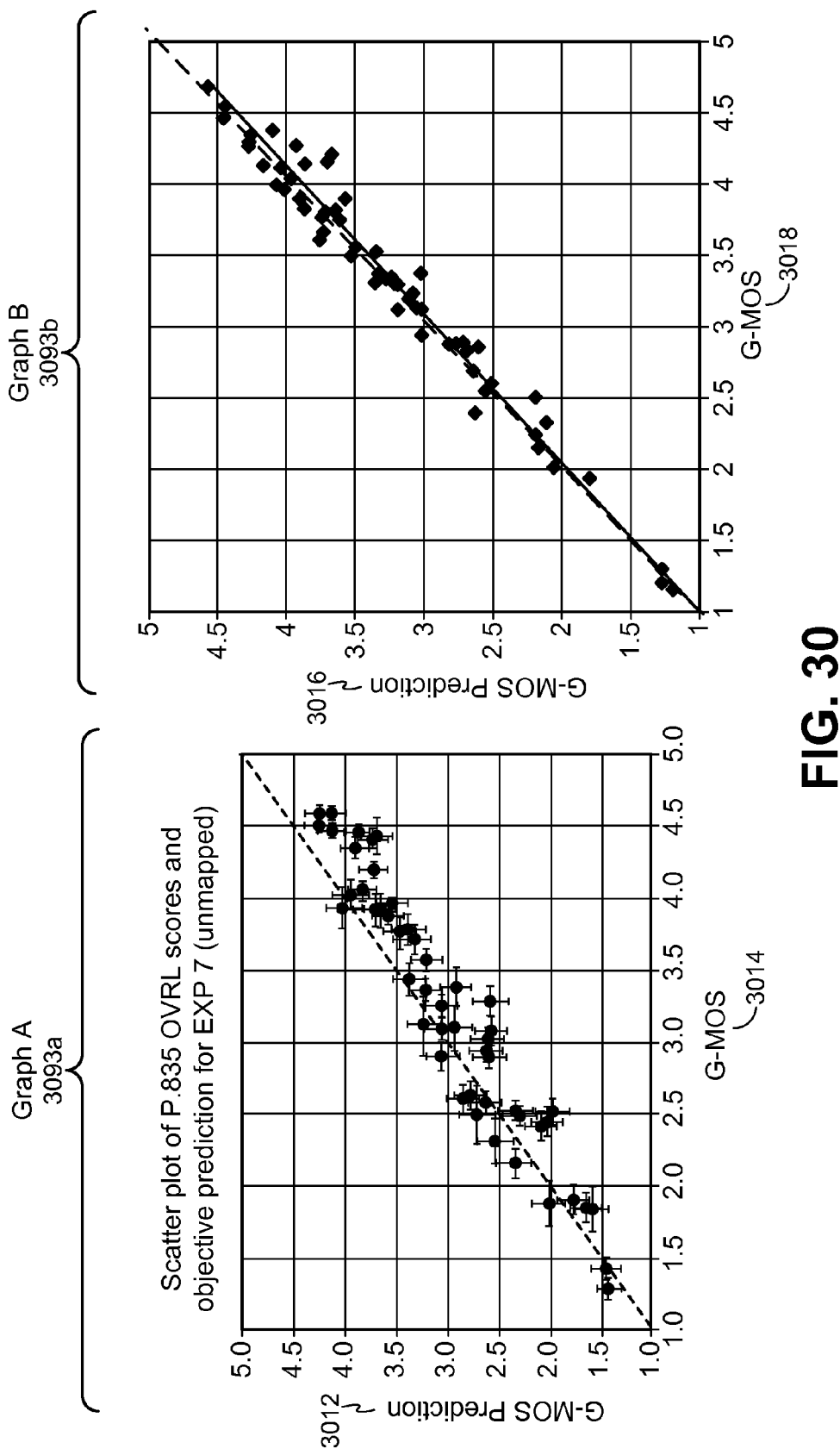
FIG. 30 illustrates another example of objective prediction in accordance with the systems and methods disclosed herein.

FIG. 28 illustrates one example of objective prediction in accordance with the systems and methods disclosed herein. Specifically, FIG. 28 includes graph A 2893a and graph B 2893b. Graph A 2893a is illustrated with a vertical axis of S-MOS prediction 2895 scores, which has a range of 1-5 and illustrates objective prediction scores for foreground quality of a speech signal or prediction of S-MOS (e.g., SIG means prediction of foreground score). Graph A 2893a is also illustrated with a horizontal axis of subjective S-MOS 2897 scores, which also has a range of 1-5 and is an example of a measure for foreground quality using a known approach. Graph A 2893a is a scatter plot of P.835 SIG scores versus objective prediction in a known approach. As can be observed, the known approach does not predict well for subjective scores less than 2.5. In FIGS. 28-30, the closer the points are to the diagonal line, the more accurate prediction they represent. It should be noted that all of the A graphs in FIGS. 28-30 are for one database (e.g., SIG (2893a), BAK (2993a) and OVR (3093a)). It should also be noted that all of the B graphs in FIGS. 28-30 are for another database (e.g., SIG (2893b), BAK (2993b) and OVR (3093b)).

Graph B 2893b is illustrated with a vertical axis of objective SIG 2899 scores, which has a range of 1-5 and are the prediction score for foreground quality of a speech signal using ITU standard P.835. Graph B 2893b is also illustrated with a horizontal axis of subjective SIG 2802 scores, which also has a range of 1-5 and is an example of an objective predictor in accordance with the systems and methods disclosed herein. As can be observed, the systems and methods disclosed herein may predict the subjective MOS with greater accuracy than the known approach.

FIG. 29 illustrates another example of objective prediction in accordance with the systems and methods disclosed herein. Specifically, FIG. 29 includes graph A 2993a and graph B 2993b. Graph A 2993a is illustrated with a vertical axis in objective P.835 BAK 2904 scores, which has a range of 1-5 and are a prediction score for background noise of a speech signal using ITU standard P.835. Graph A 2993a is also illustrated with a horizontal axis in subjective N-MOS 2906 scores, which also has a range of 1-5 and is an example of a measure for background noise using a known approach. Graph A 2993a is a scatter plot of P.835 BAK scores versus objective prediction in a known approach. As can be observed, the known approach predicts the subject scores fairly closely.

Graph B 2993b is illustrated with a vertical axis in objective P.385 NMOS (BAK) 2908 scores, which has a range of 1-5 and are the prediction score for background noise of a speech signal using ITU standard P.835. Graph B 2993b is also illustrated with a horizontal axis in subjective NMOS 2910 scores, which also has a range of 1-5 and is an example of an objective predictor in accordance with the systems and methods disclosed herein. As can be observed, the systems and methods disclosed herein may predict the scores with slightly less accuracy than the known approach, although both results are fairly close to the subjective scores.

FIG. 30 illustrates another example of objective prediction in accordance with the systems and methods disclosed herein. Specifically, FIG. 30 includes graph A 3093a and graph B 3093b. Graph A 3093a is illustrated with a vertical axis in objective OVRL P.835 3012 scores, which has a range of 1-5 and are a prediction score for overall quality of a speech signal using ITU standard P.835. Graph A 3093a is also illustrated with a horizontal axis in subjective G-MOS 3014 scores, which also has a range of 1-5 and is an example of a measure for overall quality using a known approach. Graph A 3093a is a scatter plot of P.835 BAK scores versus objective prediction in a known approach. As can be observed, the known approach predicts the subject scores fairly closely.

Graph B 3093b is illustrated with a vertical axis in objective GMOS (OVR) 3016 scores, which has a range of 1-5 and are the prediction score for overall quality of a speech signal using ITU standard P.835. Graph B is also illustrated with a horizontal axis in subjective GMOS (OVR) 3018 scores, which also has a range of 1-5 and is an example of an objective predictor in accordance with the systems and methods disclosed herein. As can be observed, the systems and methods disclosed herein may predict the scores with greater accuracy than the known approach.

Some preliminary results of the ability of the systems and methods disclosed herein to predict P.835 scores are given in Table 2. For example, the systems and methods disclosed herein may be applied to a model for P.ONRA. In the approaches described herein, a hydro-mechanical cochlear model may be used to convert speech into the perceptual domain. The cochlear model output, the Inner Hair Cell (IHC) voltage, may be essentially a representation of a speech signal in the time and space (e.g., distance along the Basilar membrane) axis. As compared to traditional psychoacoustic models, the representation has higher temporal resolution and more accurate spatial accuracy. Further processing of the IHC voltage yields 'salient feature sets' which may be subsequently fed through simple linear European Telecommunications Standards Institute (ETSI) TS 103 106 regression models to predict SMOS, NMOS and GMOS, for example.

In the preliminary results presented herein, the approaches described herein were trained with only 3 subjective databases (each having 60 conditions); while a known approach in comparison was trained with 7 databases. For example, the systems and methods disclosed herein have been tested on some P.835 databases for validation purposes. Four databases were used. Each database included 60 conditions, 2 speakers and 4 sentences. Three databases were used for training and one was used for testing. As is described herein, training and/or prediction may be performed with a linear regression of features. It should be noted that a complicated training model (e.g., neural network) could also be applied in accordance with the systems and methods disclosed herein. For example, the training process may be improved. Table 2 provides examples of some preliminary results of the systems and methods disclosed herein ("New") in comparison with a known approach ("Known"). "RMSE" denotes "Root Mean Square Error."

TABLE 2

|       | S-MOS | | N-MOS | | G-MOS | |
| --- | --- | --- | --- | --- | --- | --- |
|       | Known | New | Known | New | Known | New |
| ρ     | 0.87 | 0.96 | 0.99 | 0.99 | 0.97 | 0.99 |
| RMSE  | 0.45 | 0.24 | 0.13 | 0.22 | 0.36 | 0.16 |
| RMSE* | 0.33 | 0.13 | 0.04 | 0.12 | 0.23 | 0.09 |

Table 2 illustrates prediction results for one subjective test database. Predictions by TS 103 106 (retrained with 7 subjective databases) on the same database are listed here as the "Known" approach for comparison. The results show that the systems and methods disclosed herein are better at being able to predict S-MOS and G-MOS. Detailed comparisons are shown in FIG. 28. The performance of TS 103 106 drops for conditions with subjective S-MOS less than 3. A detailed comparison for N-MOS performance is shown in FIG. 29. There is no difference in terms of correlation coefficients (both showing 0.99). The G-MOS may be synthesized from S-MOS and N-MOS. The systems and methods disclosed herein provide slightly better prediction than TS 103 106. The correlation coefficients between subjective and objective scores are 0.99 vs 0.97. The current model also shows smaller RMSE (0.16 vs 0.36) and RMSE* (0.09 vs 0.23). A comparison of G-MOS is shown in FIG. 30.

Figure 31:
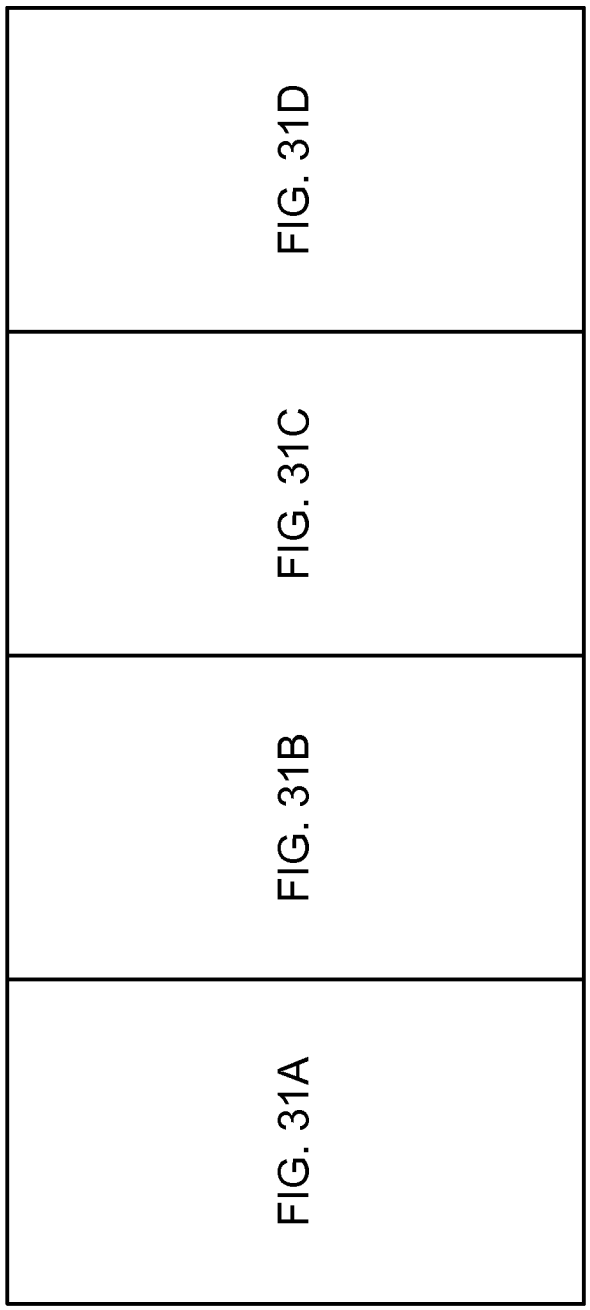
FIG. 31 is a block diagram illustrating multiple parts of an example corresponding to FIGS. 31A-31D.

FIG. 31 is a block diagram illustrating multiple parts of an example corresponding to FIGS. 31A-31D. FIGS. 31A-D show a block diagram illustrating one example of estimating or predicting a roughness distortion using intrusive feature extraction. Although specific numbers may be used for illustration, the actual size of various data at any point of the present systems and methods may vary.

Figure 31A:
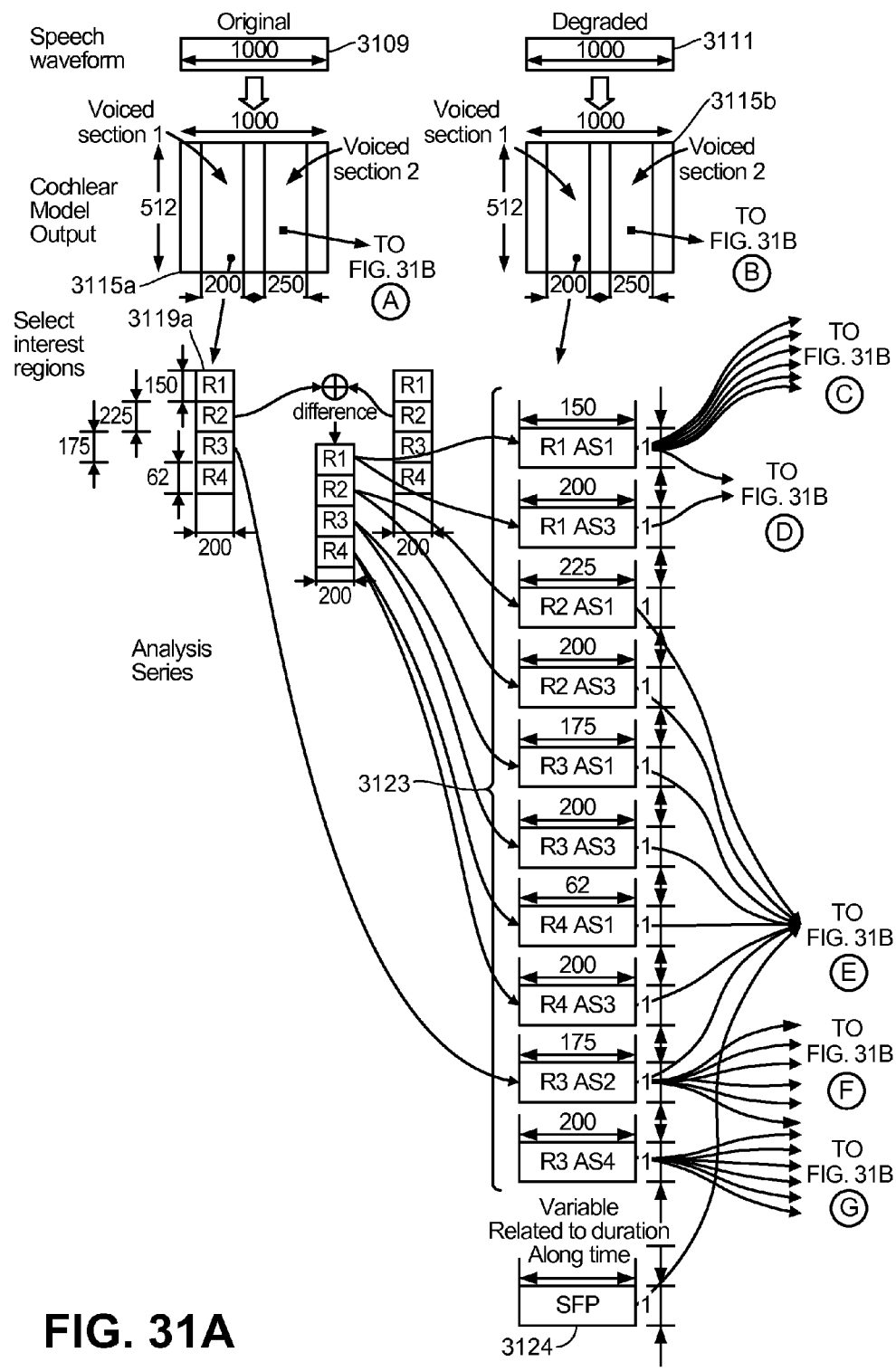
FIG. 31A is a block diagram illustrating a part of one example of estimating or predicting a roughness distortion using intrusive feature extraction.

An original speech signal 3109 as shown in FIG. 31A and a modified (e.g., degraded) speech signal 3111 (each illustrated as 1000 samples long) may be fed to a cochlear model. The cochlear model may output 512 samples for every sample input. In particular, output A 3115a may correspond to the original speech signal 3109 and output B 3115b may correspond to the modified speech signal 3111.

From the outputs A-B 3115a-b, a first voiced portion may be split into four sections 3119a-b (e.g., four sections 3119a for output A 3115a of the cochlear model based on the original speech signal 3109 and four sections 3119b based on output B 3119b of the cochlear model based on the modified speech signal 3111).

One or more analysis vectors or analysis serials (AS) 3123 may be determined from the sections 3119a-b. As illustrated, R1 AS1 may be determined from the first sections, where R1 refers to the fact that it was determined from the first sections of the first voiced portion and AS1 refers to the fact that it is a type 1 analysis vector. In addition to R1 AS1, the following analysis vectors 3123 may be determined: R1 AS3, R2 AS1, R2 AS3, R3 AS1, R3 AS3, R4 AS1, R4 AS3, R3 AS2 and R3 AS4. These vectors may be determined as described in connection with one or more of FIGS. 15-16, 18 and 21-24. Therefore, the types of analysis vectors 3123 extracted for each selected section may be determined according to Table 3, which illustrated types for intrusive measurement of speech quality:

TABLE 3

| Section | Input Signal | Extracted Analysis Vector |
| --- | --- | --- |
| Section A (R1) | Original and Modified | Types 1 and 3 |
| Section B (R2) | Original and Modified | Types 1 and 3 |
| Section C (R3) | Original and Modified | Types 1 and 3 |
| Section D (R4) | Original and Modified | Types 1 and 3 |
| Section C (R3) | Original | Types 2 and 4 |
| SFP | Original and Modified | Type 1 |

Furthermore, a type 1 analysis vector may be extracted for a salient feature point (SFP) vector 3124 that is determined from the original speech and modified (e.g., degraded) speech. SFP vectors are related to temporally localized distortions. The process to obtain an SFP vector may be: (1) obtain a CM output and take a voiced portion; (2) find one or more (e.g., all) tracks in the voiced portion; (3) use one or more sections where the amplitude is high; and (4) calculate SFP vector 3124 from the one or more track in the voiced portion. Therefore, 11 vectors may be used (10 analysis vectors 3123 and the SFP 3124), each producing 6 or 18 features, to determine features 3127 (e.g., a feature vector) for a selected section. An SFP may be considered "perceptual pitch" and may be different than a traditional pitch concept. This is because the SFP may be three dimensional, meaning each point in an SFP has time, place and amplitude. The traditional pitch concept may not have amplitude in the perceptual domain.

Specifically, each type 1 or type 3 analysis vector may produce 18 features 3127 (as described in connection with FIGS. 25-26, for example). As illustrated, AS1 and AS3 vectors may be utilized to obtain positive parts (e.g., RS1 AS1 positive) and negative parts (e.g., RS1 AS1 negative).

Each type 2 or type 4 analysis vector may produce 6 features (as described in connection with FIGS. 25 and 27, for example). The features 3127 may be placed in a feature vector that, in this example, has 174 entries. The same process of feature extraction may be performed on a second portion (e.g., voiced portion) of the cochlear output for the original speech and the modified speech to produce another 174 entry feature vector. The same process may be repeated for any suitable number of portions (e.g., voiced portions), each producing a feature vector similar to that of the first selected section.

Figure 31B:
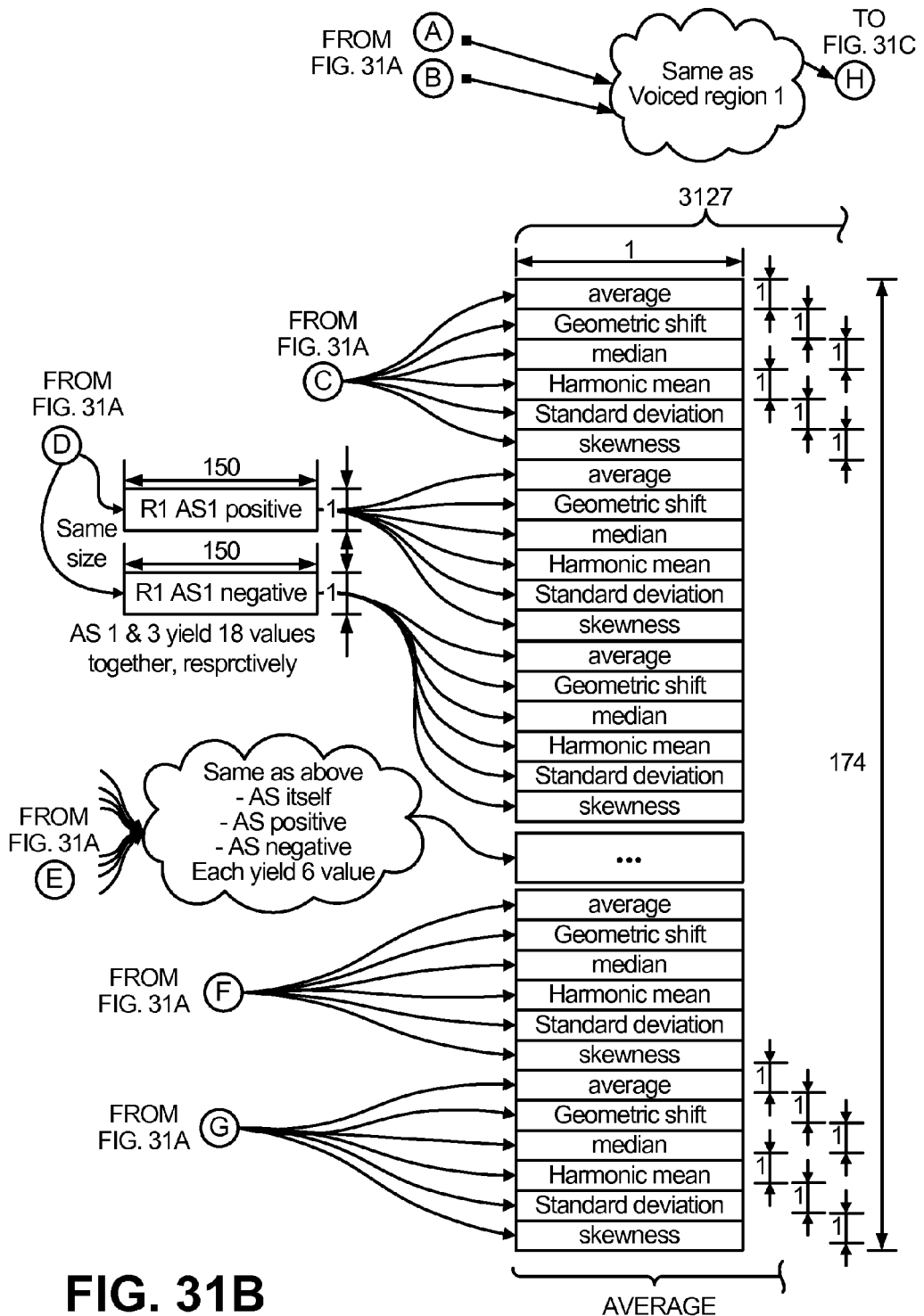
FIG. 31B is a block diagram illustrating another part of one example of estimating or predicting a roughness distortion using intrusive feature extraction.
Figure 31C:
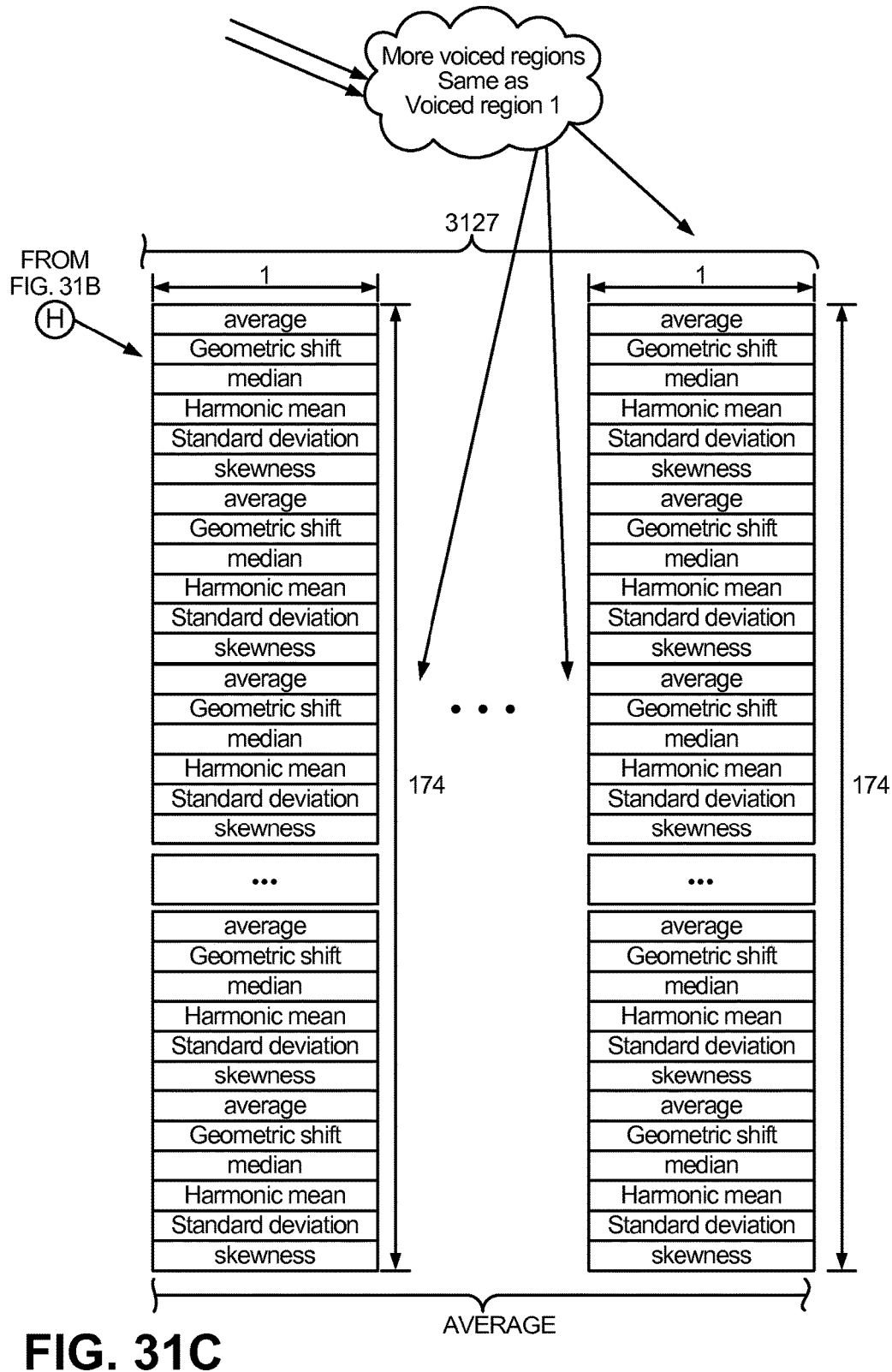
FIG. 31C is a block diagram illustrating another part of one example of estimating or predicting a roughness distortion using intrusive feature extraction.
Figure 31D:
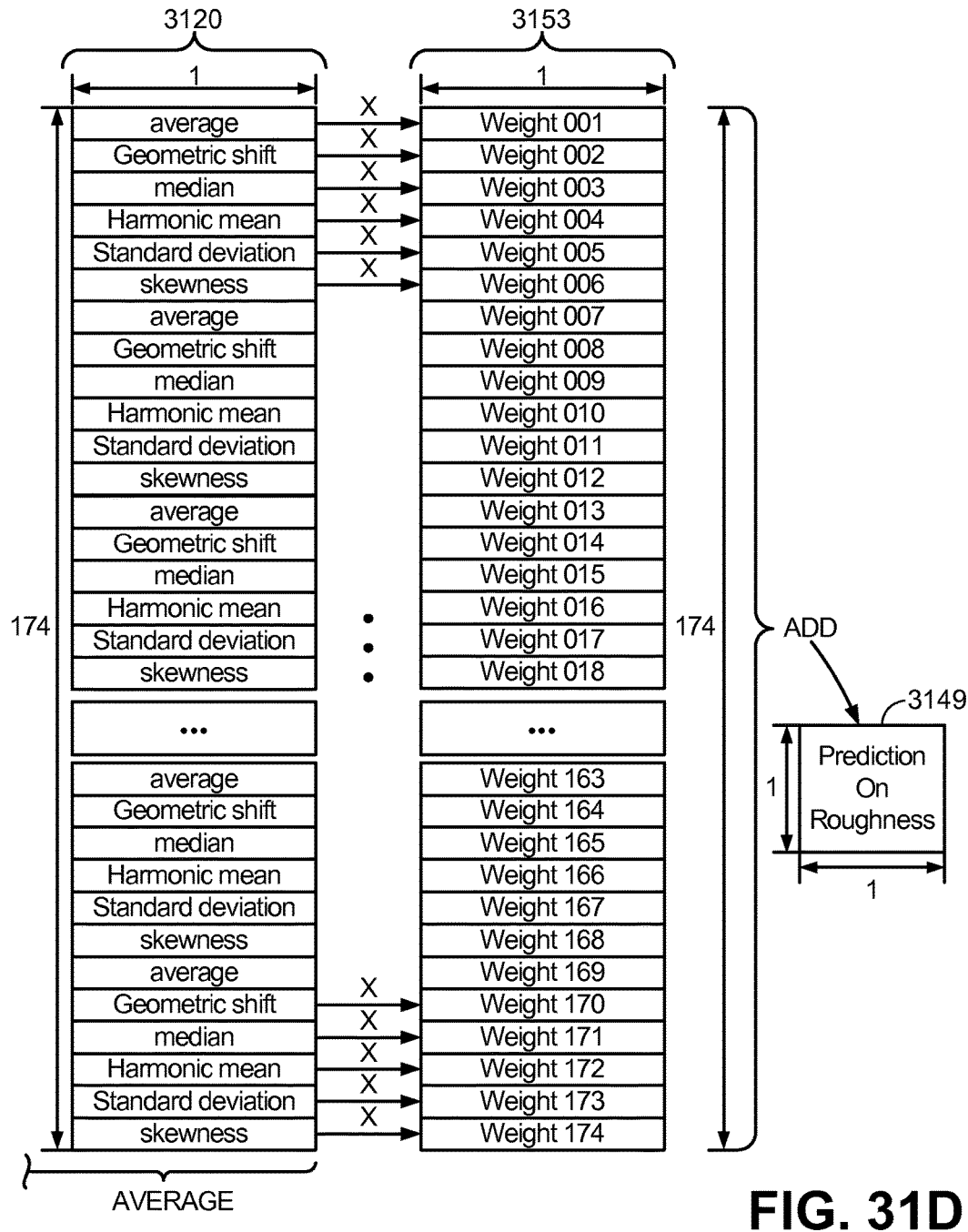
FIG. 31D is a block diagram illustrating yet another part of one example of estimating or predicting a roughness distortion using intrusive feature extraction.

Once the feature vectors for all selected sections are determined, the features 3127 may be averaged, as illustrated in FIG. 31B and FIG. 31C. In other words, the first entries (shown as averages) in each of the feature vectors may be averaged. Similarly, the entries at every index are averaged with each other to produce a single average feature vector 3120, shown as a 174 entry vector in this example. The single average feature vector 3120 multiplied by a weighting 3153 (e.g., may be weighted using weights) learned beforehand during training (as described in connection with one or more of FIGS. 8-9, for example). After weighting, each of the features in the single average feature vector may be summed to produce a roughness distortion 3149 as shown in FIG. 31D (e.g., prediction score). Similar procedures may be followed for other distortions.

A known approach for objective measurement of speech quality is to tackle the overall quality directly, such as ITU standards PESQ/P.OLQA. In known approaches, features were extracted from a psychoacoustic masking model or similar, which are rough approximations of human's perception. Perceptual formant-like features have been extracted from the output of a hydro-mechanical Cochlear Model, and used for Temporally Localized Distortions measurement.

In some configurations, one or more procedures of the systems and methods may be carried out at follows. In one approach, the new feature sets introduced here are intrusive (using both a degraded and an original speech signal). Assume an original and corresponding degraded speech ($S^{ori}$ and $S^{dis}$, aligned and leveled). The $S^{ori}$ and $S^{dis}$ may be passed through a computational model of hearing (such as hydro-mechanical Cochlear Models or psychoacoustic model). Such models may be referred to as CM and the outputs due to the original and distorted signals will be referred to as $CM^{ori}$ and $CM^{dis}$.

The original and distorted speech may be passed through a hydro-mechanical Cochlear Model (CM), and the output has high precision along both the time and frequency domains. The output represents the speech in the perceptual domain.

Analysis Serials (AS) may be extracted from interested sections. The feature V SF144 can be extracted from voiced sections (VS) and silence (SIL) sections of the speech with same algorithms described herein, depending on the purpose of analysis. Suppose there are K interested sections.

Frequency related Analysis Serials may be described as follows. For a kth interested region, the degraded CM output $CM_k^{dis}$(p,t) and corresponding original CM output $CM_k^{ori}$(p, t), each has a size of P*T.

$$CMOT_k^{dis}(p) = \log_{10} \frac{\sum_{t=1}^{T} CM_k^{dis}(p, t)}{T} \quad (56)$$

$$CMOT_k^{ori}(p) = \log_{10} \frac{\sum_{t=1}^{T} CM_k^{ori}(p, t)}{T} \quad (57)$$

$$CMOT_k^{diff}(p) = CMOT_k^{dis}(p) - CMOT_k^{ori}(p) \quad (58)$$

For a different perceptual model, the CM may have a different size. In the following part, we take a Cochlear Model. It should be noted that numbers may be adjusted for a certain output. The P in this example has a range 1-512, and is cut into four regions: (A) 1-150, (B) 151-275, (C) a276-450 and (D) 450-512. So there are four difference functions as a function of place:

$$P1_k(p) = CMOT_k^{diff}(p), p=1 \ldots 150$$

$$P2_k(p) = CMOT_k^{diff}(p), p=151 \ldots 275$$

$$P3_k(p) = CMOT_k^{diff}(p), p=276 \ldots 450$$

$$P4_k(p) = CMOT_k^{diff}(p), p=451 \ldots 512 \quad (59)$$

Another is described for the original speech but only in the salient region (region C):

$$P5_k(p-275) = CMOT_k^{ori}(p), p=276 \ldots 450 \quad (60)$$

The $P1_k(p)$ (with a length of N) may be separated into $$P1_k^{positive}(p) = \begin{cases} P1_k(p), & \text{if } P1_k(p) > 0 \\ 0, & \text{otherwise} \end{cases} \quad (61)$$

$$P1_k^{negative}(p) = \begin{cases} P1_k(p), & \text{if } P1_k(p) < 0 \\ 0, & \text{otherwise} \end{cases}$$

The same procedure may be applied on $P2_k(p)$, $P3_k(p)$, $P4_k(p)$ to yield $$P1_k^{positive}(p), P1_k^{negative}(p), P1_k(p),$$

$$P2_k^{positive}(p), P2_k^{negative}(p), P2_k(p),$$

$$P3_k^{positive}(p), P3_k^{negative}(p), P3_k(p),$$

$$P4_k^{positive}(p), P4_k^{negative}(p), P4_k(p)$$

and $P5_k(p)$ only itself. \quad (62)

These may be called Analysis Serials.

Time related Analysis Serials may be obtained as follows. For each Voiced Section (VS), there is the degraded CM output $CM_k^{dis}$(p, t) and corresponding original $CM_k^{ori}$(p, t), where each has a size of P*T. The following may be calculated:

$$T1_k^{dis}(t) = \log_{10} \frac{\sum_{p=r_{1,1}}^{r_{1,2}} CM_k^{dis}(p, t)}{r_{1,2} - r_{1,1} + 1} \quad (63)$$

$$T1_k^{ori}(t) = \log_{10} \frac{\sum_{p=r_{1,1}}^{r_{1,2}} CM_k^{ori}(p, t)}{r_{1,2} - r_{1,1} + 1}$$

$$T1_k^{diff}(t) = T1_k^{dis}(t) - T1_k^{ori}(t)$$

$$T2_k^{dis}(t) = \log_{10} \frac{\sum_{p=r_{2,1}}^{r_{2,2}} CM_k^{dis}(p, t)}{r_{2,2} - r_{2,1} + 1}$$

$$T2_k^{ori}(t) = \log_{10} \frac{\sum_{p=r_{2,1}}^{r_{2,2}} CM_k^{ori}(p, t)}{r_{2,2} - r_{2,1} + 1}$$

$$T2_k^{diff}(t) = T2_k^{dis}(t) - T2_k^{ori}(t)$$

$$T3_k^{dis}(t) = \log_{10} \frac{\sum_{p=r_{3,1}}^{r_{3,2}} CM_k^{dis}(p, t)}{r_{3,2} - r_{3,1} + 1}$$

-continued $$T3_k^{ori}(t) = \log_{10} \frac{\sum_{p=r3,1}^{r3,2} CM_k^{ori}(p,t)}{r_{3,2} - r_{3,1} + 1}$$

$$T3_k^{diff}(t) = T3_k^{dis}(t) - T3_k^{ori}(t)$$

$$T4_k^{dis}(t) = \log_{10} \frac{\sum_{p=r4,1}^{r4,2} CM_k^{dis}(p,t)}{r_{4,2} - r_{4,1} + 1}$$

$$T4_k^{ori}(t) = \log_{10} \frac{\sum_{p=r4,1}^{r4,2} CM_k^{ori}(p,t)}{r_{4,2} - r_{4,1} + 1}$$

$$T4_k^{diff}(t) = T4_k^{dis}(t) - T4_k^{ori}(t)$$

| r | 1 | 2 |
|---|---|---|
| 1 | 1 | 150 |
| 2 | 151 | 275 |
| 3 | 276 | 450 |
| 4 | 450 | 512 | where $r_{1,2}$ means "first row, second column" (e.g., 150). It should be noted that more regions (than just region C, for example) may be utilized. Accordingly, there are four difference functions as a function of place. Another is described for the original speech, but only in a salient region (region C).

$$T5_k(t) = T3_k^{ori}(t) \quad (64)$$

The $T1_k(t)$ (with a length of T) may be separated into $$T1_k^{positive}(t) = \begin{cases} T1_k(t), & \text{if } T1_k(t) > 0 \\ 0, & \text{otherwise} \end{cases} \quad (65)$$

$$T1_k^{negative}(t) = \begin{cases} T1_k(t), & \text{if } T1_k(p) < 0 \\ 0, & \text{otherwise} \end{cases}$$

The same procedure may be applied on $T2_k(p)$, $T3_k(p)$, $T4_k(p)$ to yield $$T1_k^{positive}, T1_k^{negative}, T1_k,$$

$$T2_k^{positive}, T2_k^{negative}, T2_k,$$

$$T3_k^{positive}, T3_k^{negative}, T3k,$$

$$T4_k^{positive}, T4_k^{negative}, T4_k. \quad (66)$$

These may also be called Analysis Serials.

The SFP may also be obtained. If the interested section is a voiced section, $SFP_k$ are extracted from the kth voiced section's CM output. In some configurations, the SFT may be obtained as described in European Patent Application Publication No. EP2329399 A4. Three AS are formed here:

$$SFP_k^{positive}, SFP_k^{negative}, SFP_k, \quad (67)$$

Feature extraction from the AS may proceed as follows. For each AS (e.g., $P2_k^{negative}(p)$ and $T3_k$, which has a length of N, features are extracted as follows:

$$FT1 = \text{mean}(AS)$$

$$FT2 = \frac{\sum_{p=1}^{N} AS(p) * p}{\sum_{p=1}^{N} AS(p)} - \bar{p}, \quad (68)$$

geometric shift.

$$FT3 = \text{median}(AS),$$

where the median function here means $$p(AS \geq F3) \geq \frac{1}{2}$$

and $$p(AS \leq F3) \geq \frac{1}{2}.$$

$$FT4 = \frac{1}{\sum_{p=1}^{N} \frac{1}{AS(p)}},$$

harmonic mean.

$$FT5 = \text{std}(AS),$$

standard deviation (std).

$$FT6 = \frac{\frac{1}{N}\sum_{p=1}^{N}(AS(p) - \overline{AS})^3}{\left[\frac{1}{N}\sum_{p=1}^{N}(AS(p) - \overline{AS})^2\right]^3}$$

Features extracted from $P1_k^{positive}$, $P1_k^{negative}$, $P1_k$ are F1-F18. Features extracted from $P2_k^{positive}$, $P2_k^{negative}$, $P2_k$ are F19-F36. Features extracted from $P3_k^{positive}$, $P3_k^{negative}$, $P3_k$ are F37-F54. Features extracted from $P4_k^{positive}$, $P4_k^{negative}$, $P4_k$ are F55-F72. For $P5_k$, which is the original values in region C, there are only 6 features: F73-F78.

Features extracted from $T1_k^{positive}$, $T1_k^{negative}$, $T1_k$ are F79-F96. Features extracted from $T2_k^{positive}$, $T2_k^{negative}$ are F97-F114. Features extracted from $T3_k^{positive}$, $T3_k^{negative}$, $T3_k$ are F115-F132. Features extracted from $T4_k^{positive}$, $T4_k^{negative}$, $T4_k$ are F133-F150. For $P5_k$, which is the original values in region C, there are only 6 features: F151-F156. Features extracted from $SFP_k^{positive}$, $SFP_k^{negative}$, $SFP_k$ are F157-F174.

It should be noted that the final feature score may include means of that feature for all voiced sections $$\left(\text{e.g., } FS1 = \frac{1}{V}\sum_{v=1}^{V} F1_k\right).$$

Feature F175 may be a binary indicator of whether the speaker is male or female (e.g., 0 for male, and −1 for female). Feature F176 may be a constant (usually set to 1, for example) for convenient of linear regression.

The systems and methods disclosed herein may provide a speech quality measurement output. Feedback (e.g., real-time feedback) for coding and/or transmission developer may additionally or alternatively be provided. Characteristics and/or insight of speech distortions may additionally or alternatively be provided. The systems and methods disclosed herein may provide many parameters to describe given speech's characteristics (e.g., distortions) in a perceptual domain. These features may be built into a general toolbox and combined for specific aims (e.g., frequency-localized distortions measurement). In other words, the systems and methods described herein may provide high accuracy in speech quality measurement, insight into a description on various types of speech distortions, a human-perceptually oriented approach. It should be noted that other known approaches may not use a hydro-mechanical Cochlear Model output.

Figure 32:
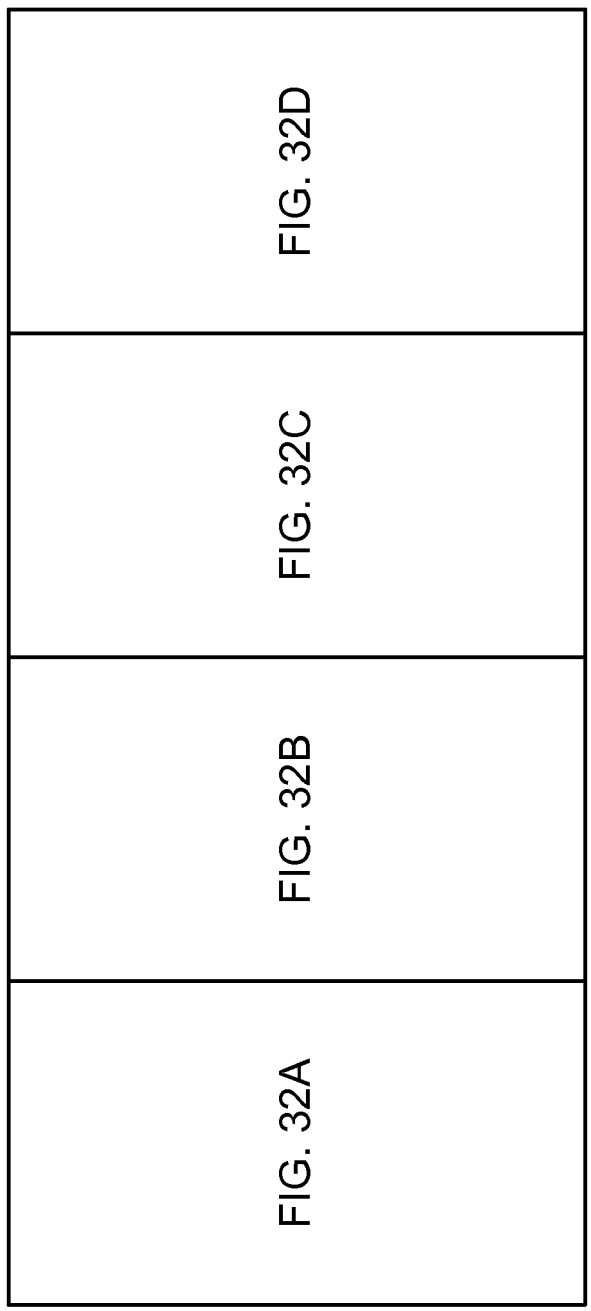
FIG. 32 is a block diagram illustrating multiple parts of an example corresponding to FIGS. 32A-32D.

FIG. 32 FIG. 32 is a block diagram illustrating multiple parts of an example corresponding to FIGS. 32A-32D. FIGS. 32A-D are a block diagram illustrating one example of estimating or predicting a roughness distortion using non-intrusive feature extraction. Although specific numbers may be used for illustration, the actual size of various data at any point of the present systems and methods may vary.

Figure 32A:
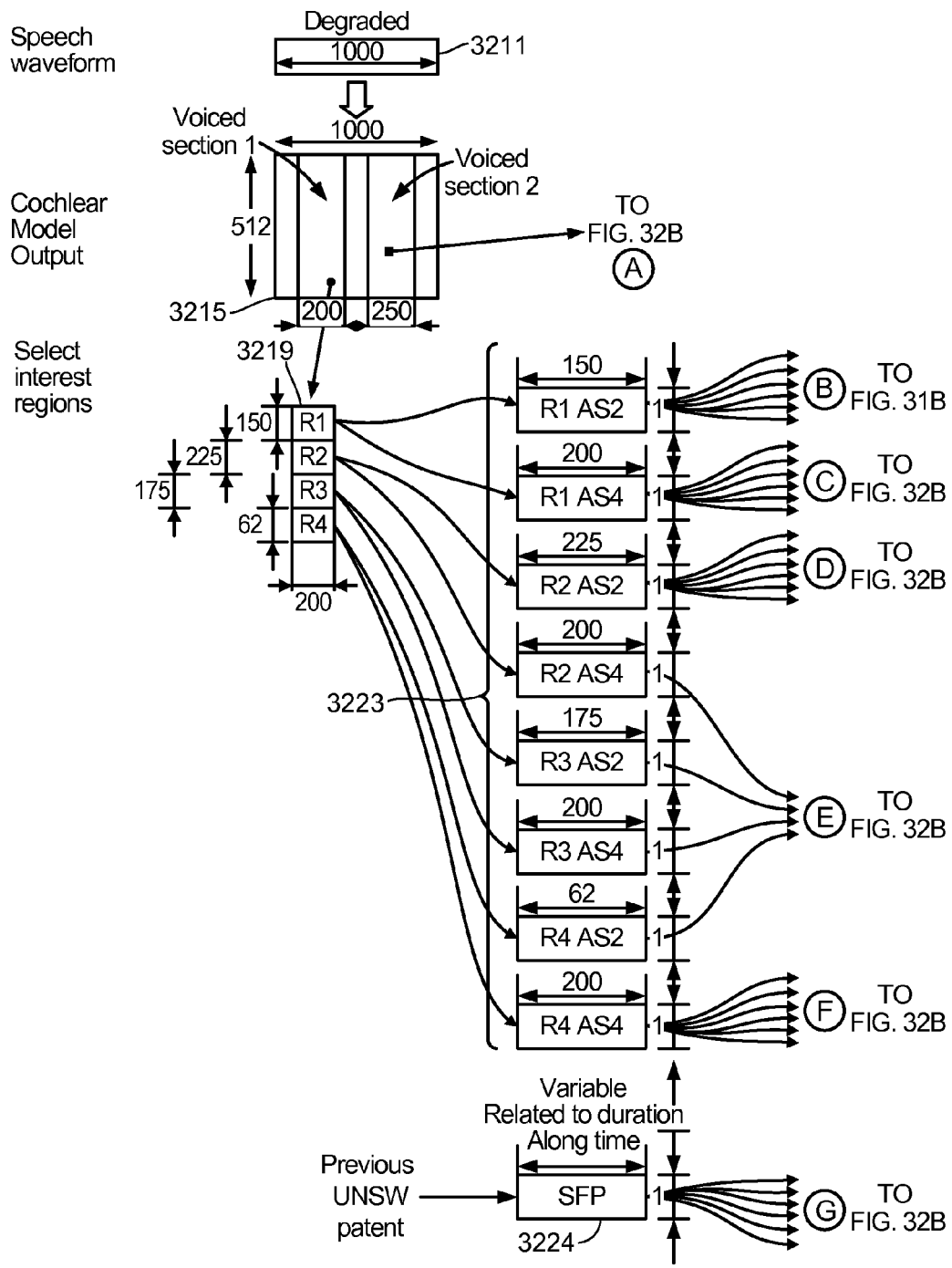
FIG. 32A is a block diagram illustrating a part of one example of estimating or predicting a roughness distortion using non-intrusive feature extraction.

A modified (e.g., degraded) speech signal 3211 as shown in FIG. 32A (illustrated as 1000 samples long) may be fed to a cochlear model. The cochlear model may output 512 samples for every sample input. In particular, the output 3215 may correspond to the modified speech signal 3211. From the output 3215, a first voiced portion may be split into four sections 3219 (e.g., four sections 3219 based on the output 3215 of the cochlear model based on the modified speech signal 3211).

One or more analysis vectors or analysis serials (AS) 3223 may be determined from the sections 3219. As illustrated, R1 AS2 may be determined from the first section, where R1 refers to the fact that it was determined from the first section of the first voiced portion and AS2 refers to the fact that it is a type 2 analysis vector. In addition to R1 AS2, the following analysis vectors 3223 may be determined: R1 AS4, R2 AS2, R2 AS4, R3 AS2, R3 AS4, R4 AS2 and R4 AS4. These vectors may be determined as described in connection with one or more of FIGS. 15-16, 19, 22 and 24. Therefore, the types of analysis vectors extracted for each selected section may be determined according to Table 4, which illustrates types for non-intrusive measurement of speech quality:

TABLE 4

| Section | Input Signal | Extracted Analysis vector |
| --- | --- | --- |
| Section A (R1) | Modified | Types 2 and 4 |
| Section B (R2) | Modified | Types 2 and 4 |
| Section C (R3) | Modified | Types 2 and 4 |
| Section D (R4) | Modified | Types 2 and 4 |
| SFP | Modified | Type 2 |

Furthermore, a type 2 analysis vector may be extracted for a salient feature point (SFP) vector 3224 that is determined from the modified speech. SFP vectors are related to temporally localized distortions. Therefore, 9 vectors may be used (8 analysis vectors 3223 and the SFP 3224), each producing 6 features, to determine a feature vector for a selected section.

Specifically, each type 2 or type 4 analysis vector may produce 6 features 3227 (as described in connection with FIGS. 25 and 27, for example). The features 3227 may be placed in a feature vector that, in this example, has 54 entries. The same process of feature extraction may be performed on a second portion (e.g., voiced portion) of the cochlear output 3215 to produce another 54 entry feature vector. The same process may be repeated for any suitable number of portions (e.g., voiced portions), each producing a feature vector similar to that of the first selected section.

Figure 32B:
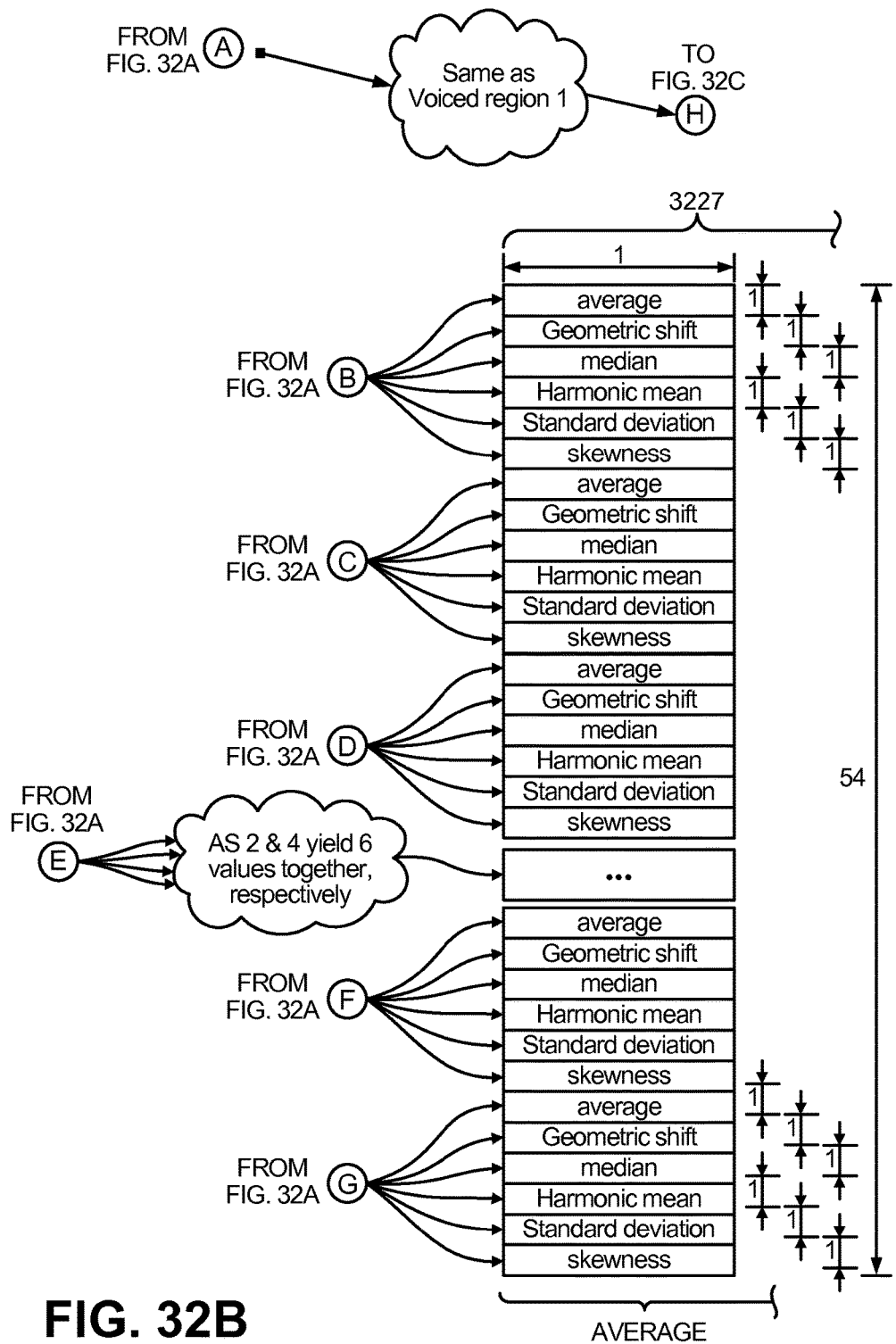
FIG. 32B is a block diagram illustrating another part of one example of estimating or predicting a roughness distortion using non-intrusive feature extraction.
Figure 32C:
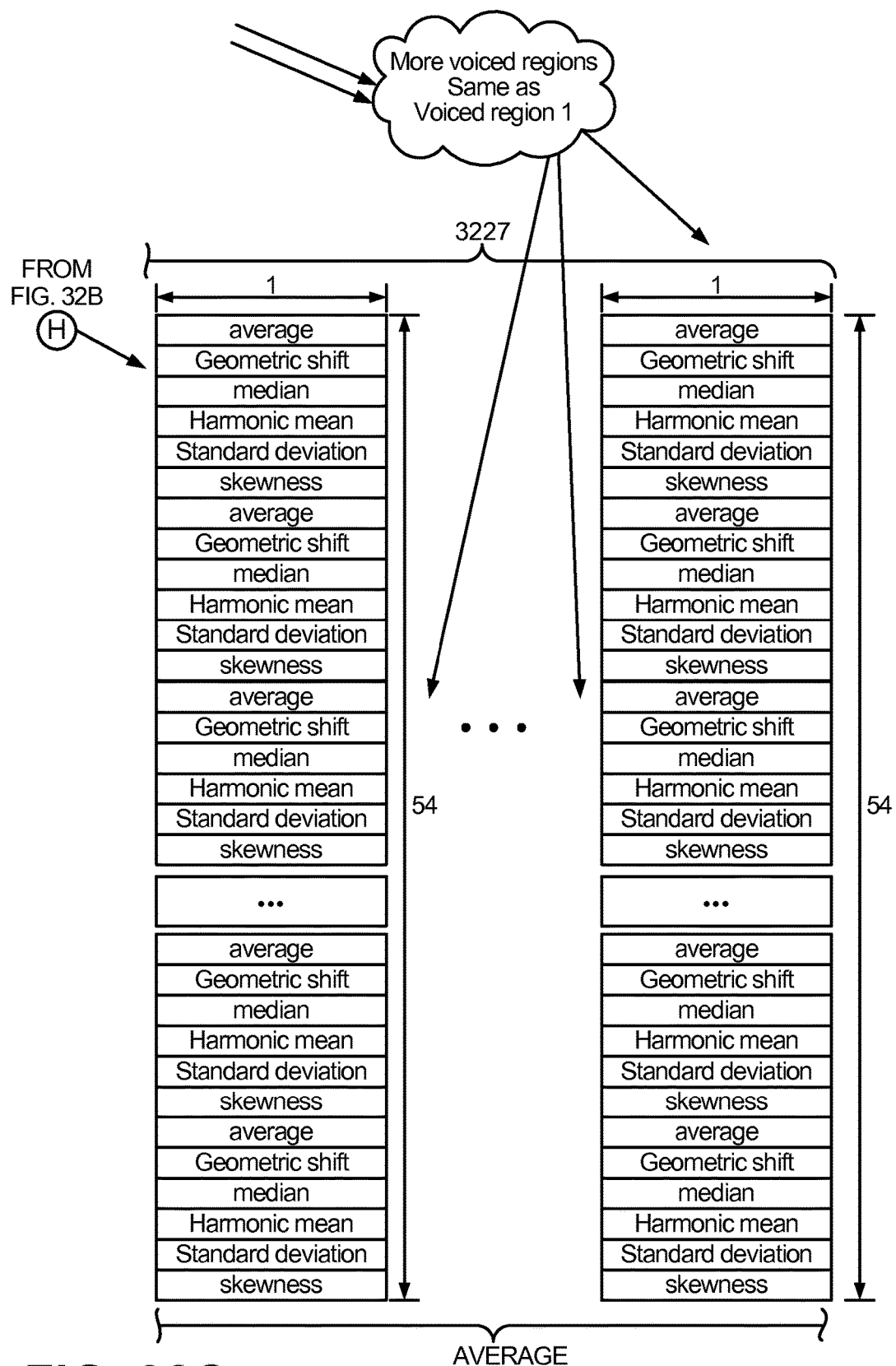
FIG. 32C is a block diagram illustrating another part of one example of estimating or predicting a roughness distortion using non-intrusive feature extraction.
Figure 32D:
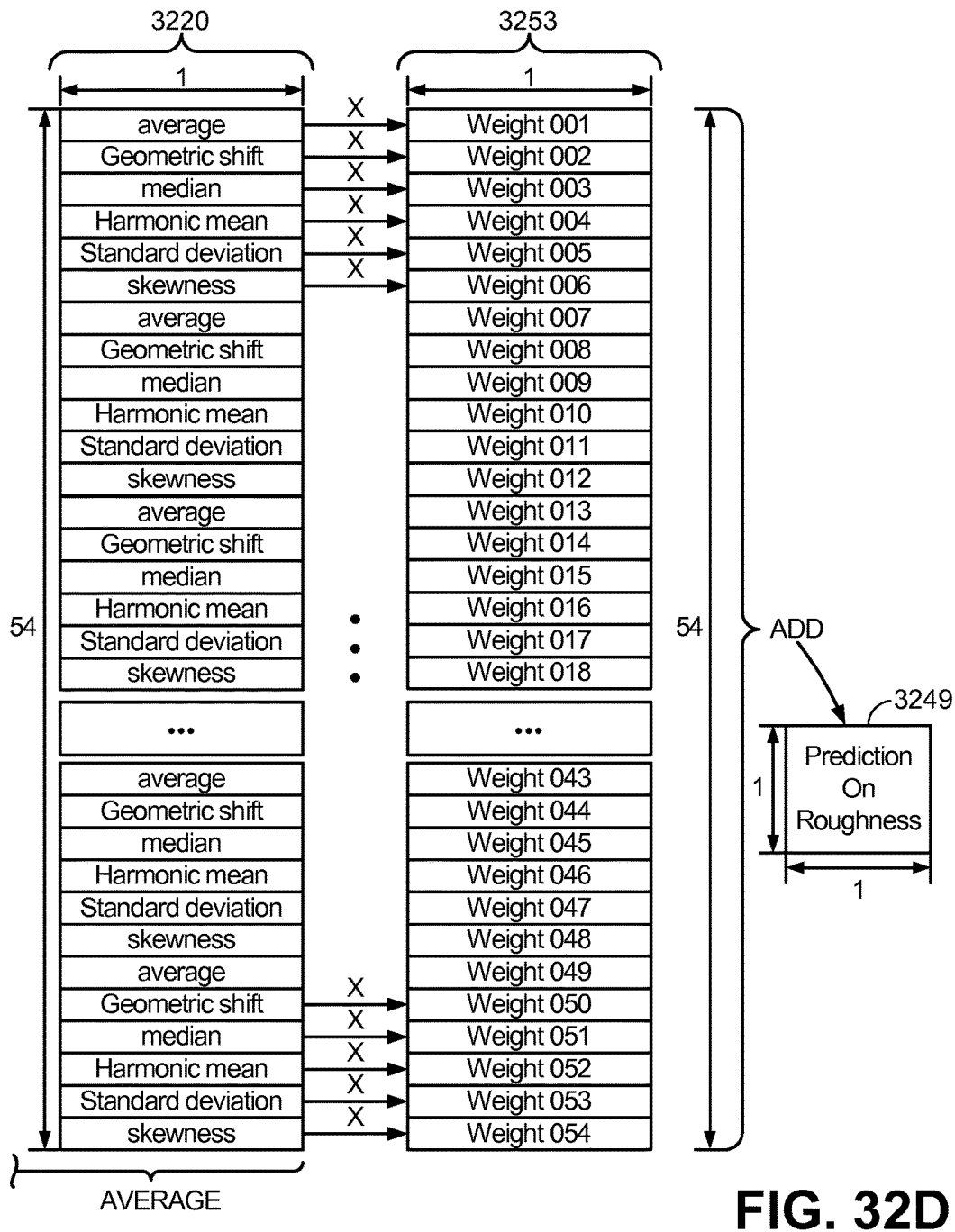
FIG. 32D is a block diagram illustrating yet another part of one example of estimating or predicting a roughness distortion using non-intrusive feature extraction.

Once the feature vectors for all selected sections are determined, the features 3227 may be averaged, as illustrated in FIG. 32B and FIG. 32C. In other words, the first entries (shown as averages) in each of the feature vectors may be averaged. Similarly, the entries at every index are averaged with each other to produce a single average feature vector 3220, shown as a 54 entry vector in this example. The single average feature vector 3220 may be multiplied by a weighting 3253 (e.g., may be weighted using weights) learned beforehand during training (as described in connection with one or more of FIGS. 8-9, for example). After weighting, each of the features in the single average feature vector may be summed to produce a roughness distortion 3249 as shown in FIG. 32D (e.g., prediction score). Similar procedures may be followed for other distortions.

FIGS. 31-32 illustrate a prediction score for the roughness distortion 3149, 3249, however, the prediction score may be for any of the distortion dimensions. For example, when determining a prediction score for the dullness/muffledness distortion dimension, the weights used may correspond to subjective scores for dullness/muffledness distortion dimension instead of the roughness distortion dimension. The prediction scores for each distortion dimension may be used by an objective speech quality module (as described in connection with FIGS. 6-7, for example) to determine a foreground quality and a background quality. An overall quality may then be determined. The overall quality may be used instead of or in addition to a mean opinion score (MOS) that is determined from human listeners subjectively scoring a portion of speech.

In some configurations, one or more procedures of the systems and methods may be carried out at follows. In one approach, the new feature sets introduced here are non-intrusive (using a degraded speech signal). Assume a degraded speech ($S^{dis}$). The $S^{dis}$ may be passed through a computational model of hearing (such as a hydro-mechanical Cochlear Model or psychoacoustic model). Such models may be referred to as CM and the output due to distorted signal will be referred to as $CM^{dis}$. The output has high precision along both the time and frequency domains. The output represents the speech in the perceptual domain.

Analysis Serials (AS) may be extracted from voiced sections (VS) and silence (SIL) sections of the speech with same algorithms described herein, depending on the purpose of analysis. Suppose there are K interested sections.

Frequency related Analysis Serials may be described as follows. For a kth interested region, the degraded CM output $CM_k^{dis}$ (p, t) has a size of P*T.

$$CMOT_k^{dis}(p) = \log_{10} \frac{\sum_{t=1}^{T} CM_k^{dis}(p, t)}{T} \quad (69)$$

For a different perceptual model, the CM may have a different size. In the following part, we take a Cochlear Model. It should be noted that numbers may be adjusted for a certain output. The P in this example has a range 1-512, and is cut into four regions: (A) 1-150, (B) 151-275, (C)

a276-450 and (D) 450-512. So there are four difference functions as a function of place:

$$P1_k(p) = CMOT_k^{dis}(p), p=1\ldots 150$$

$$P2_k(p) = CMOT_k^{dis}(p), p=151\ldots 275$$

$$P3_k(p) = CMOT_k^{dis}(p), p=276\ldots 450$$

$$P4_k(p) = CMOT_k^{dis}(p), p=451\ldots 512 \quad (70)$$

These may be called Analysis Serials.

Time related Analysis Serials may be obtained as follows. For each Voiced Section (VS), there is the degraded CM output $CM_k^{dis}(p, t)$ has a size of P*T. The following may be calculated:

$$T1_k^{dis}(t) = \log_{10} \frac{\sum_{p=r_{1,1}}^{r_{1,2}} CM_k^{dis}(p, t)}{r_{1,2} - r_{1,1} + 1} \quad (71)$$

$$T2_k^{dis}(t) = \log_{10} \frac{\sum_{p=r_{2,1}}^{r_{2,2}} CM_k^{dis}(p, t)}{r_{2,2} - r_{2,1} + 1}$$

$$T3_k^{dis}(t) = \log_{10} \frac{\sum_{p=r_{3,1}}^{r_{3,2}} CM_k^{dis}(p, t)}{r_{3,2} - r_{3,1} + 1}$$

$$T4_k^{dis}(t) = \log_{10} \frac{\sum_{p=r_{4,1}}^{r_{4,2}} CM_k^{dis}(p, t)}{r_{4,2} - r_{4,1} + 1}$$

| r | 1 | 2 |
|---|---|---|
| 1 | 1 | 150 |
| 2 | 151 | 275 |
| 3 | 276 | 450 |
| 4 | 450 | 512 | where $r_{1,2}$ means "first row, second column" (e.g., 150). These may also be called Analysis Serials.

The SFP may also be obtained. If the interested section is a voiced section, $SFP_k$ are extracted from the kth voiced section's CM output. Feature extraction from the AS may proceed as follows. For each AS (e.g., $T3_k$, which has a length of N, features are extracted as follows:

$$FT1 = \text{mean}(AS)$$

$$FT2 = \frac{\sum_{p=1}^{N} AS(p) * p}{\sum_{p=1}^{N} AS(p)} - \bar{p},$$

geometric shift.

$$FT3 = \text{median}(AS),$$

where the median function here means $$p(AS \geq F3) \geq \frac{1}{2}$$

and $$p(AS \leq F3) \geq \frac{1}{2}. \quad (72)$$

$$FT4 = \frac{1}{\sum_{p=1}^{N} \frac{1}{AS(p)}},$$

harmonic mean.

$$FT5 = \text{std}(AS),$$

standard deviation (std).

$$FT6 = \frac{\frac{1}{N}\sum_{p=1}^{N}(AS(p) - \overline{AS})^3}{\left[\frac{1}{N}\sum_{p=1}^{N}(AS(p) - \overline{AS})^2\right]^{\frac{3}{2}}}$$

Features extracted from $P1_k$ are F1-F6. Features extracted from $P2_k$ are F7-F12. Features extracted from $P3_k$ are F13-F18. Features extracted from $P4_k$ are F19-F24.

Features extracted from $T1_k$ are F25-F30. Features extracted from $T2_k$ are F31-F36. Features extracted from $T3_k$ are F37-F42. Features extracted from $T4_k$ are F43-F48. Features extracted from $SFP_k$ are F49-F54.

It should be noted that the final feature score may include means of that feature for all voiced sections $$\left(\text{e.g., } FS1 = \frac{1}{V}\sum_{v=1}^{V} F1_k\right).$$

Feature F55 may be a binary indicator of whether the speaker is male or female (e.g., 0 for male, and −1 for female). Feature F56 may be a constant (usually set to 1, for example) for convenient of linear regression.

The systems and methods disclosed herein may provide a speech quality measurement output. Feedback (e.g., real-time feedback) for coding and/or transmission developer may additionally or alternatively be provided. Characteristics and/or insight of speech distortions may additionally or alternatively be provided. The systems and methods disclosed herein may provide many parameters to describe given speech's characteristics (e.g., distortions) in a perceptual domain. These features may be built into a general toolbox and combined for specific aims (e.g., frequency-localized distortions measurement). In other words, the systems and methods described herein may provide high accuracy in speech quality measurement, insight into a description on various types of speech distortions, a human-perceptually oriented approach. It should be noted that other known approaches may not use a hydro-mechanical Cochlear Model output.

Figure 33:
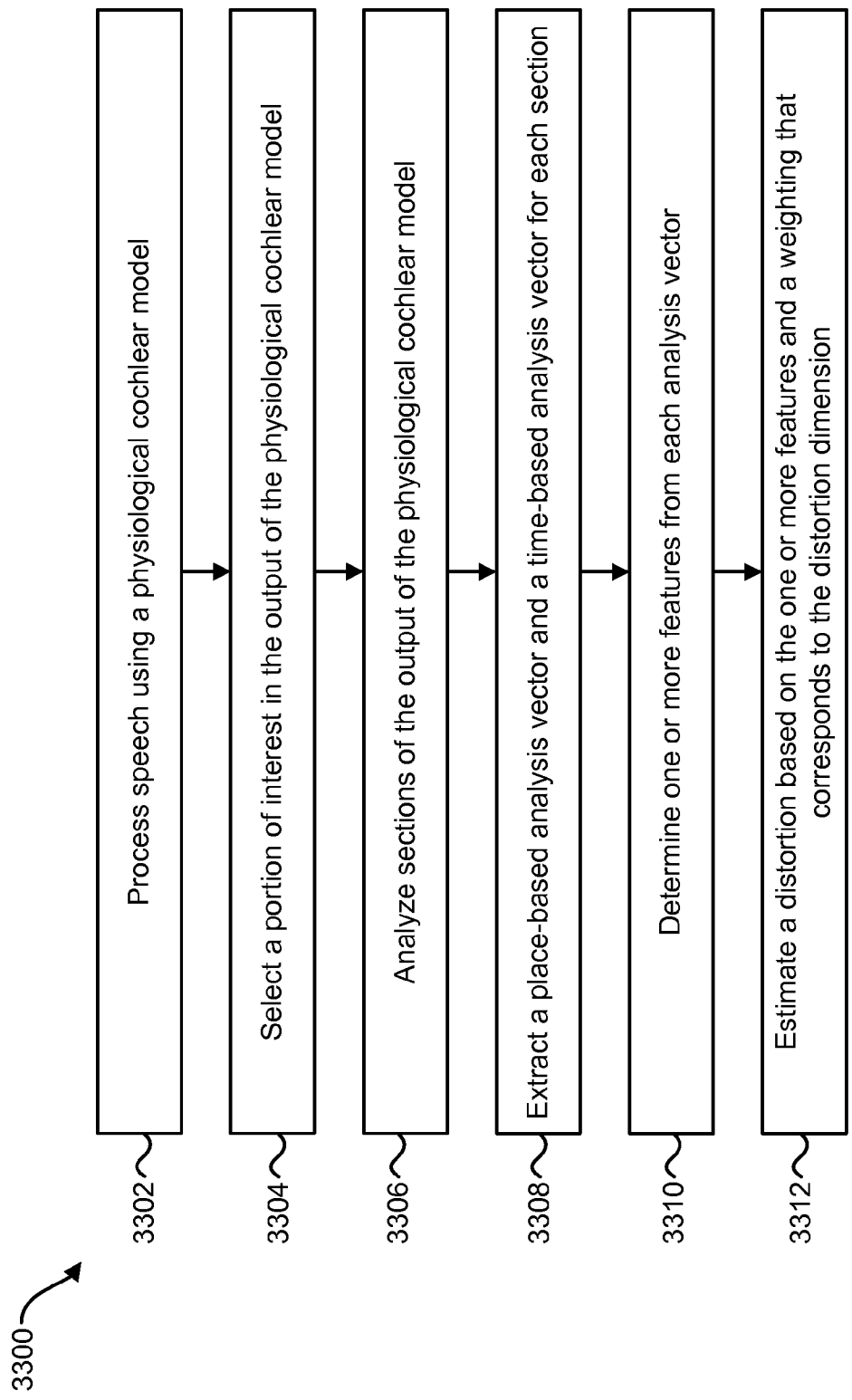
FIG. 33 is a flow diagram illustrating a more specific configuration of a method for feature extraction.

FIG. 33 is a flow diagram illustrating a more specific configuration of a method 3300 for feature extraction. The electronic device 1507 (e.g., a speech evaluator and/or a feature extraction module) may perform one or more steps, functions and/or procedures of the method 3300.

The electronic device may obtain an original speech signal and a modified (e.g., degraded) speech signal. The original speech signal and a modified speech signal may be recorded over the same period for intrusive feature extraction. In other words, the modified speech signal may be a processed version of the original speech signal. Alternatively, only a modified speech signal may be obtained for non-intrusive feature extraction.

The electronic device may process 3302 the speech using a physiological cochlear model. This may be accomplished as described above in connection with one or more of FIGS. 15-19 and 31-32, for example.

The electronic device may select 3304 a portion from the output of the cochlear model. This may be accomplished as described above in connection with one or more of FIGS. 18-19 and 31-32, for example. The portion may be a portion of the physiological cochlear model output for the original speech signal and/or a portion of the cochlear model output for the modified speech signal that significantly affects the perceptual quality of the speech (e.g., voiced portions, vowels, etc.). For instance, selecting 3304 the portion may include computing the energy of one or more signals and selecting a portion where the energy is above a threshold.

The electronic device may analyze 3306 sections of the output of the physiological cochlear model. This may be accomplished as described above in connection with one or more of FIGS. 15-16, 18-24 and 31-32, for example. For instance, the electronic device may group (e.g., split) portions of the output into multiple sections (e.g., four sections or another number of sections). Each of the sections may have a particular size (e.g., a number of place points by a number of N samples).

The electronic device may extract 3308 vectors for each section. In particular, the electronic device may extract a place-based analysis vector and a time-based analysis vector for each section. This may be accomplished as described above in connection with one or more of FIGS. 15-16, 18-19, 21-24 and 31-32, for example. For instance, the electronic device may average a section over time to produce a place-based analysis vector and/or may average a section over place to produce a time-based analysis vector. In some configurations, analysis vectors may be extracted 3308 per section number as shown in Table 3 above. In other words, at least one place-based analysis vector and one time-based analysis vector may be extracted 3308 for each section.

The electronic device may determine 3310 one or more features from each vector (e.g., analysis vector). This may be accomplished as described in connection with one or more of FIGS. 15-16, 18-19, 25-27 and 31-32, for example.

The electronic device may estimate 3312 (e.g., predict) a distortion based on the one or more features and a weighting (e.g., weight set) that corresponds to the distortion dimension. This may be accomplished as described above in connection with one or more of FIGS. 15, 18-19 and 31-32. For example, the electronic device may use a weighting (e.g., a weight set that was previously determined offline) for the roughness distortion to weight the features to produce the roughness distortion (e.g., a prediction score for the roughness dimension). One or more distortions may be estimated 3312. For example, the electronic device may estimate 3312 one or more of roughness, discontinuity, dullness, thinness, hissing and variability as described above. The electronic device may estimate 3312 additional and/or alternative distortions. In some configurations, distortions (e.g., prediction scores) may be determined for all four foreground distortion dimensions and both background distortion dimensions described above in connection with FIGS. 4-7. In some configurations, the electronic device may estimate a foreground quality and/or a background quality based on the distortions (e.g., objective distortions). This may be accomplished as described above in connection with one or more of FIGS. 4-7. Additionally or alternatively, an overall quality may be estimated from the foreground quality and background quality. This may be accomplished as described above in connection with one or more of FIGS. 4-7. The overall quality may serve as an overall objective quality score of the modified speech signal, which may be utilized in place of a subjective mean opinion score (MOS).

Figure 34:
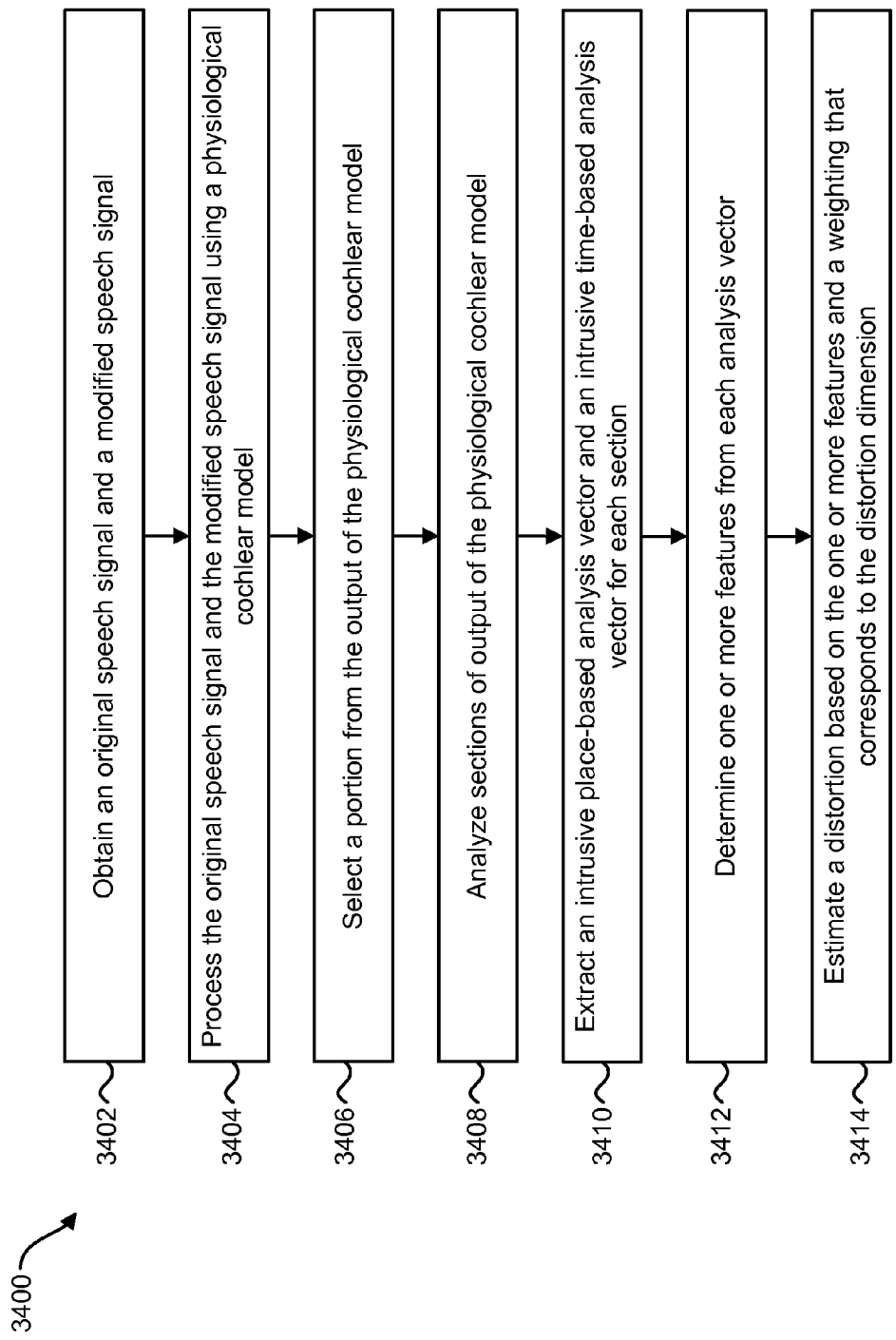
FIG. 34 is a flow diagram illustrating a configuration of a method for intrusive feature extraction.

FIG. 34 is a flow diagram illustrating a configuration of a method 3400 for intrusive feature extraction. The electronic device 1507 (e.g., a speech evaluator and/or a feature extraction module) may perform one or more steps, functions and/or procedures of the method 3400.

The electronic device may obtain 3402 an original speech signal and a modified (e.g., degraded) speech signal. This may be accomplished as described above in connection with FIG. 15. For example, the electronic device may obtain one or more frames or time periods of the original speech signal and the modified speech signal. The original speech signal and a modified speech signal may be recorded over the same time period for intrusive feature extraction. In other words, the modified speech signal may be a processed version of the original speech signal.

The electronic device may process 3404 the speech using a physiological cochlear model. This may be accomplished as described above in connection with one or more of FIGS. 15-19 and 31-32, for example. In particular, the electronic device may process 3404 the original speech signal and the modified speech signal using one or more cochlear models.

The electronic device may select 3406 a portion from the output of the physiological cochlear model. This may be accomplished as described above in connection with one or more of FIGS. 18-19 and 31-32, for example. The portion may be a portion of the physiological cochlear model output for the original speech signal and/or a portion of the cochlear model output for the modified speech signal that significantly affects the perceptual quality of the speech (e.g., voiced portions, vowels, etc.). For instance, selecting 3406 the portion may include computing the energy of one or more signals and selecting a portion where the energy is above a threshold.

The electronic device may analyze 3408 sections of the output of the physiological cochlear model. This may be accomplished as described above in connection with one or more of FIGS. 15-16, 18-24 and 31-32, for example. For instance, the electronic device may group (e.g., split) portions of the output into multiple sections (e.g., four sections or another number of sections). Each of the sections may have a particular size (e.g., a number of place points by a number of N samples).

The electronic device may extract 3410 vectors for each section. In particular, the electronic device may extract 3410 a place-based analysis vector and a time-based analysis vector for each section. This may be accomplished as described above in connection with one or more of FIGS. 15-16, 18-19, 21-24 and 31-32, for example. For instance, the electronic device may average a section over time to produce a place-based analysis vector and/or may average a section over place to produce a time-based analysis vector. In some configurations, analysis vectors may be extracted 3410 per section number as shown in Table 3 above. In other words, at least one intrusive place-based analysis vector (e.g., type 1) and one time-based analysis vector (e.g., type 3) may be extracted 3410 for each section. As illustrated in Table 3, the electronic device may optionally and additionally extract a non-intrusive place-based vector (e.g., type 2) and/or a non-intrusive time-based vector (e.g., type 4) for one or more sections (e.g., section C).

The electronic device may determine 3412 one or more features from each vector (e.g., analysis vector). This may be accomplished as described in connection with one or more of FIGS. 15-16, 18-19, 25-27 and 31-32, for example. In some configurations, 6 and/or 18 features may be determined 3412 based on each vector.

The electronic device may estimate 3414 (e.g., predict) a distortion based on the one or more features and a weighting (e.g., weight set) that corresponds to the distortion dimension. This may be accomplished as described above in connection with one or more of FIGS. 15, 18-19 and 31-32. For example, the electronic device may use a weighting (e.g., a weight set that was previously determined offline) for the roughness distortion to weight the features to produce the roughness distortion (e.g., a prediction score for the roughness dimension). One or more distortions may be estimated 3414. For example, the electronic device may estimate 3414 one or more of roughness, discontinuity, dullness, thinness, hissing and variability as described above. The electronic device may estimate 3414 additional and/or alternative distortions. In some configurations, distortions (e.g., prediction scores) may be determined for all four foreground distortion dimensions and both background distortion dimensions described above in connection with FIGS. 4-7. In some configurations, the electronic device may estimate a foreground quality and/or a background quality based on the distortions (e.g., objective distortions). This may be accomplished as described above in connection with one or more of FIGS. 4-7. Additionally or alternatively, an overall quality may be estimated from the foreground quality and background quality. This may be accomplished as described above in connection with one or more of FIGS. 4-7. The overall quality may serve as an overall objective quality score of the modified speech signal, which may be utilized in place of a subjective mean opinion score (MOS).

Figure 35:
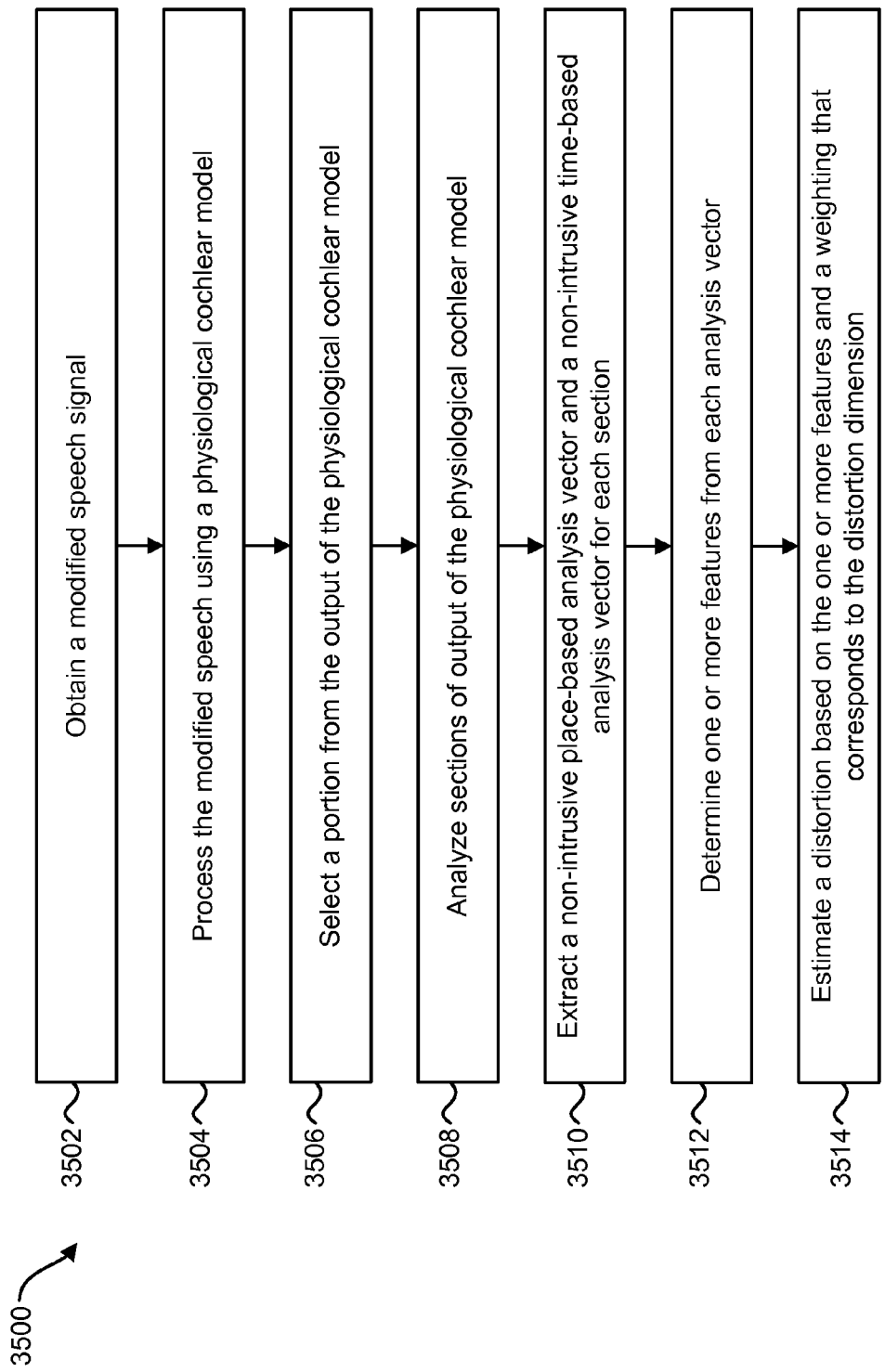
FIG. 35 is a flow diagram illustrating a configuration of a method for non-intrusive feature extraction.

FIG. 35 is a flow diagram illustrating a configuration of a method 3500 for non-intrusive feature extraction. The electronic device 1507 (e.g., a speech evaluator and/or a feature extraction module) may perform one or more steps, functions and/or procedures of the method 3500.

The electronic device may obtain 3502 a modified (e.g., degraded) speech signal. This may be accomplished as described above in connection with FIG. 15. For example, the electronic device may obtain one or more frames or time periods of the modified speech signal. The modified speech signal may be a processed (e.g., degraded) version of the original speech signal. In the non-intrusive approach, the electronic device may not obtain an original speech signal. This may allow for speech quality evaluation in a variety of devices without having to obtain, transmit or receive the original speech signal.

The electronic device may process 3504 the modified speech using a physiological cochlear model. This may be accomplished as described above in connection with one or more of FIGS. 15-17, 19 and 32, for example. In particular, the electronic device may process 3504 the only the modified speech signal (and not the original speech signal) using a cochlear model.

The electronic device may select 3506 a portion from the output of the physiological cochlear model. This may be accomplished as described above in connection with one or more of FIGS. 19 and 32, for example. The portion may be a portion of the physiological cochlear model output for the modified speech signal that significantly affects the perceptual quality of the speech (e.g., voiced portions, vowels, etc.). For instance, selecting 3506 the portion may include computing the energy of the modified speech signal and selecting a portion where the energy is above a threshold.

The electronic device may analyze 3508 sections of the output of the physiological cochlear model. This may be accomplished as described above in connection with one or more of FIGS. 15-16, 19-20, 22, 24 and 32, for example. For instance, the electronic device may group (e.g., split) portions of the output into multiple sections (e.g., four sections or another number of sections). Each of the sections may have a particular size (e.g., a number of place points by a number of N samples).

The electronic device may extract 3510 vectors for each section. In particular, the electronic device may extract 3510 a non-intrusive place-based analysis vector and a non-intrusive time-based analysis vector for each section. This may be accomplished as described above in connection with one or more of FIGS. 15-16, 19, 22, 24 and 32, for example. For instance, the electronic device may average a section over time to produce a place-based analysis vector and/or may average a section over place to produce a time-based analysis vector. In some configurations, analysis vectors may be extracted 3510 per section number as shown in Table 4 above. In other words, at least one non-intrusive place-based analysis vector (e.g., type 2) and one non-intrusive time-based analysis vector (e.g., type 4) may be extracted 3510 for each section.

The electronic device may determine 3512 one or more features from each vector (e.g., analysis vector). This may be accomplished as described in connection with one or more of FIGS. 15-16, 19, 25, 27 and 32, for example. In some configurations, 6 features may be determined 3512 based on each vector.

The electronic device may estimate 3514 (e.g., predict) a distortion based on the one or more features and a weighting (e.g., weight set) that corresponds to the distortion dimension. This may be accomplished as described above in connection with one or more of FIGS. 15, 19 and 32. For example, the electronic device may use a weighting (e.g., a weight set that was previously determined offline) for the roughness distortion to weight the features to produce the roughness distortion (e.g., a prediction score for the roughness dimension). One or more distortions may be estimated 3514. For example, the electronic device may estimate 3514 one or more of roughness, discontinuity, dullness, thinness, hissing and variability as described above. The electronic device may estimate 3514 additional and/or alternative distortions. In some configurations, distortions (e.g., prediction scores) may be determined for all four foreground distortion dimensions and both background distortion dimensions described above in connection with FIGS. 4-7. In some configurations, the electronic device may estimate a foreground quality and/or a background quality based on the distortions (e.g., objective distortions). This may be accomplished as described above in connection with one or more of FIGS. 4-7. Additionally or alternatively, an overall quality may be estimated from the foreground quality and background quality. This may be accomplished as described above in connection with one or more of FIGS. 4-7. The overall quality may serve as an overall objective quality score of the modified speech signal, which may be utilized in place of a subjective mean opinion score (MOS).

Figure 36:
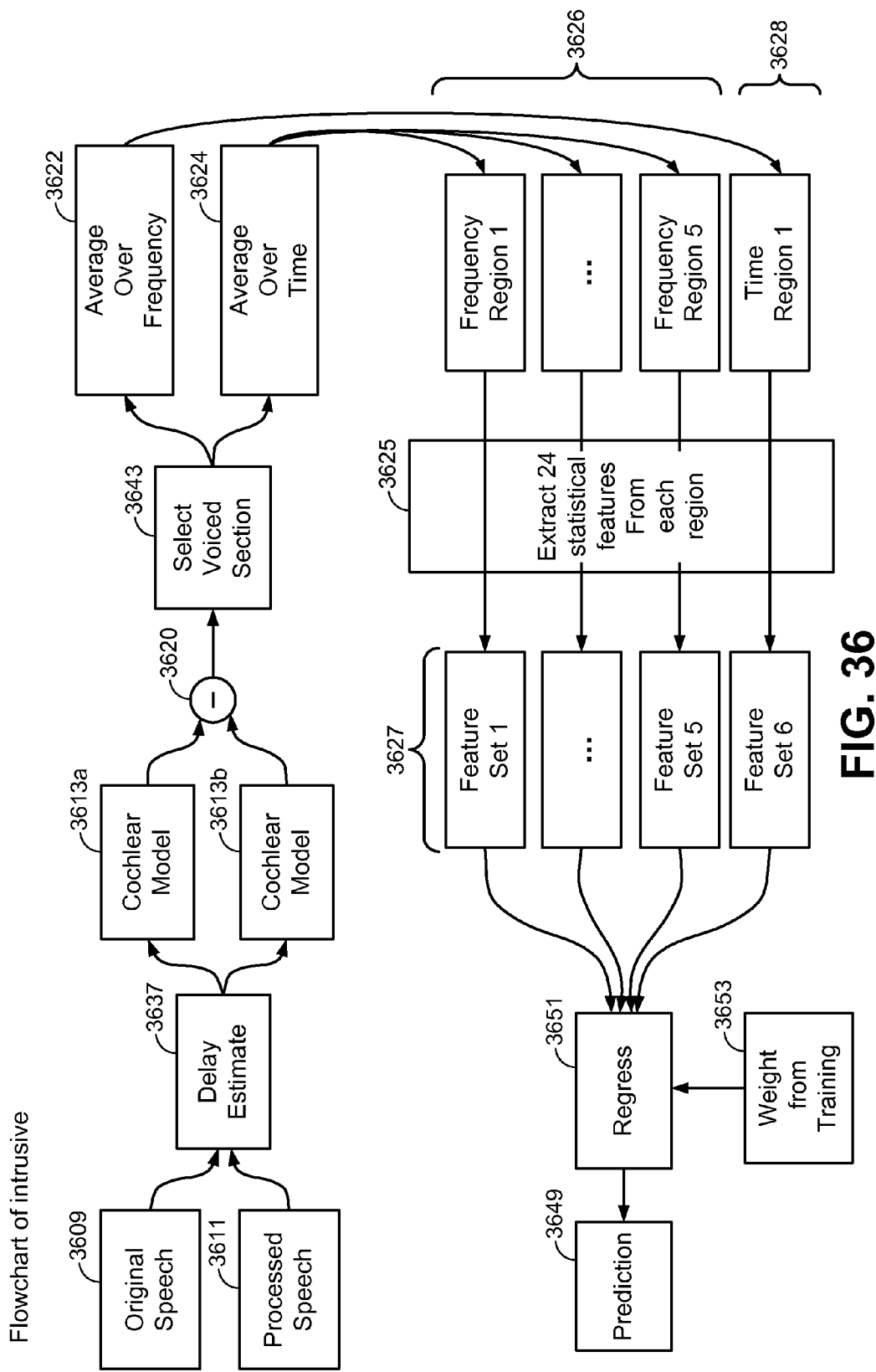
FIG. 36 is a block diagram illustrating a more specific configuration of intrusive feature extraction.

FIG. 36 is a block diagram illustrating a more specific configuration of intrusive feature extraction. For example, FIG. 36 provides an example of extracting the salient features from the IHC voltage. It should be noted that more sophisticated statistical models at the backend, such as neural networks, may improve performance and may be additionally alternatively utilized. One or more of the components described in connection with FIG. 26 may be examples of one or more of the components and/or may perform one or more of the procedures described in connection with one or more of FIGS. 15-27 and 31-35. In particular, FIG. 36 illustrates examples of a delay estimation module 3637, cochlear models A-B 3613a-b, a subtractor 3620, a portion selection module 3643, an average over frequency module 3622, an average over time module 3624, a feature determination module 3625 and/or a regression module 3651.

An original speech signal 3609 and a modified speech signal 3611 (e.g., a degraded version of the original speech signal 3609) may be provided to the delay estimation module 3637. The delay estimation module 3637 may align the original speech signal 3609 and the modified speech signal 3611, which may be provided to cochlear model A 3613a and cochlear model B 3613b. The output of cochlear model A 3613a may be subtracted from the output of cochlear model B 3613b by the subtractor 3620. This difference may be provided to the portion selection module 3643. The portion selection module 3643 may select portions from the difference. For example, voiced portions of the difference may be selected.

The voiced portions may be provided to the average over frequency module 3622 and to the average over time module 3624. The average over frequency module 3622 and the average over time module 3624 may average the voiced portions over frequency and time, respectively. The average over frequency module 3622 may produce one or more time regions. The average over time module 3624 may produce one or more frequency regions 3626. The one or more frequency regions 3626 may be another expression of the place-based vectors described above. The average over frequency module 3622 may produce one or more time regions 3628. The one or more time regions 3628 may correspond to the time-based vectors described above.

The frequency region(s) 3626 and/or the time region(s) 3628 may be provided to the feature determination module 3625. The feature determination module 3625 may determine (e.g., extract) features 3627 (e.g., statistical features) from each region. The features 3627 may be grouped into feature sets.

In some configurations, the features 3627 may be provided to the regression module 3651. The regression module 3651 may perform a linear regression based on one or more of the features 3627 and a weighting 3653 (e.g., one or more weights) to estimate one or more distortions 3649. In some configurations, the regression module 3651 may alternatively perform a polynomial regression, second order regression, non-linear regression, etc., in order to estimate the distortion(s) 3649. In some configurations, one or more qualities (e.g., foreground quality, background quality, overall quality, etc.) may be estimated based on the one or more distortions 3649 as described herein.

Figure 37:
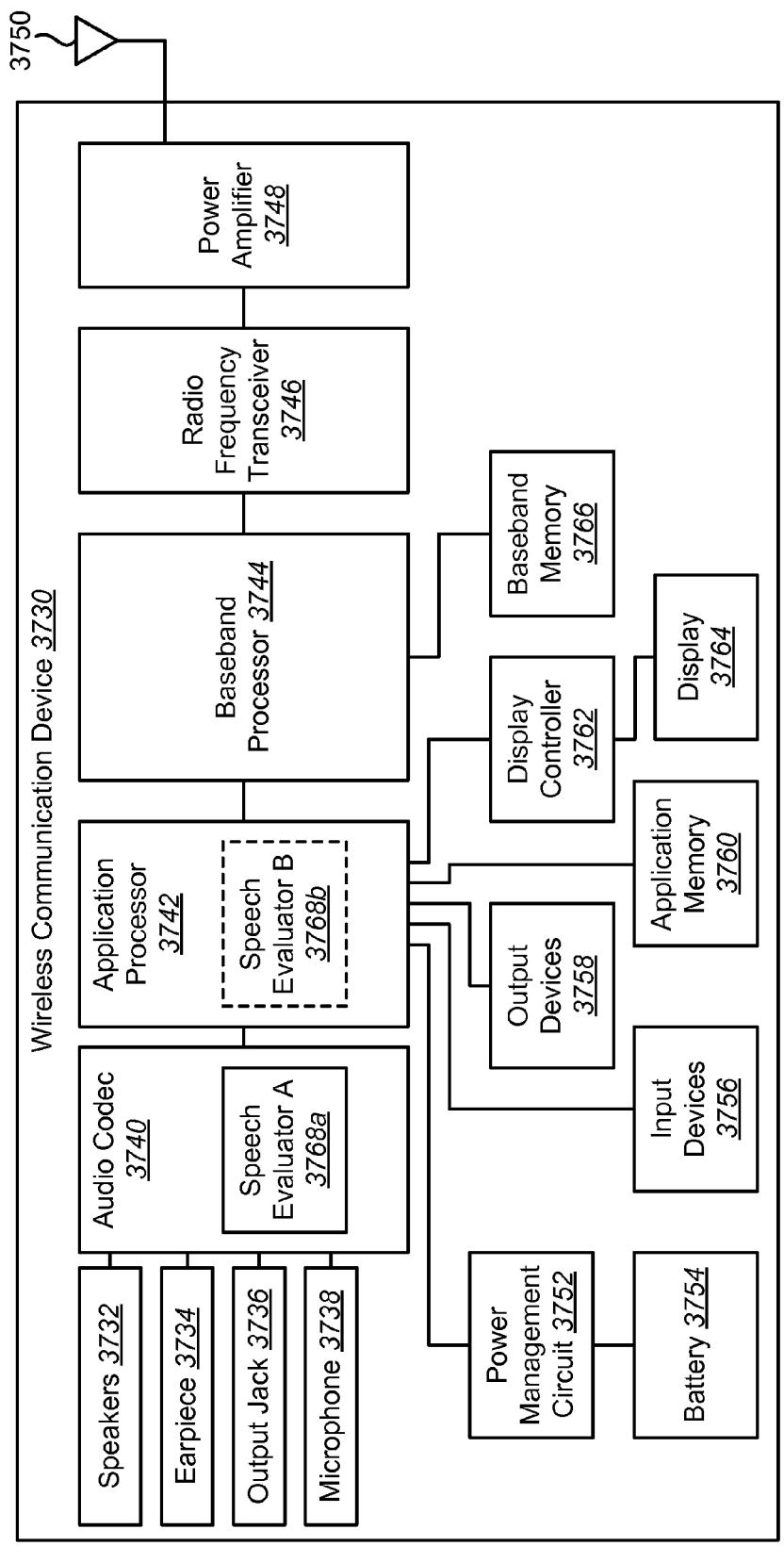
FIG. 37 is a block diagram illustrating one configuration of a wireless communication device in which systems and methods for measuring speech signal quality and/or feature extraction may be implemented.

FIG. 37 is a block diagram illustrating one configuration of a wireless communication device 3730 in which systems and methods for measuring speech signal quality and/or feature extraction may be implemented. The wireless communication device 3730 illustrated in FIG. 37 may be an example of one or more of the electronic devices 556, 1507 described herein. The wireless communication device 3730 may include an application processor 3742. The application processor 3742 generally processes instructions (e.g., runs programs) to perform functions on the wireless communication device 3730. The application processor 3742 may be coupled to an audio coder/decoder (codec) 3740.

The audio codec 3740 may be used for coding and/or decoding audio signals. The audio codec 3740 may be coupled to at least one speaker 3732, an earpiece 3734, an output jack 3736 and/or at least one microphone 3738. The speakers 3732 may include one or more electro-acoustic transducers that convert electrical or electronic signals into acoustic signals. For example, the speakers 3732 may be used to play music or output a speakerphone conversation, etc. The earpiece 3734 may be another speaker or electro-acoustic transducer that can be used to output acoustic signals (e.g., speech signals) to a user. For example, the earpiece 3734 may be used such that only a user may reliably hear the acoustic signal. The output jack 3736 may be used for coupling other devices to the wireless communication device 3730 for outputting audio, such as headphones. The speakers 3732, earpiece 3734 and/or output jack 3736 may generally be used for outputting an audio signal from the audio codec 3740. The at least one microphone 3738 may be an acousto-electric transducer that converts an acoustic signal (such as a user's voice) into electrical or electronic signals that are provided to the audio codec 3740.

In some configurations, the audio codec 3740 may include speech evaluator A 3768a. Speech evaluator A 3768a may perform one or more of the procedures and/or functions and/or may include one or more of the modules and/or components described in connection with one or more of FIGS. 4-27 and 31-36. In particular, speech evaluator A 3768a may extract one or more features and/or may measure speech signal quality. Additionally or alternatively, the application processor 3742 may include speech evaluator B 3768b. Speech evaluator B 3768b may perform one or more of the procedures and/or functions and/or may include one or more of the modules and/or components described in connection with speech evaluator A 3768a.

The application processor 3742 may also be coupled to a power management circuit 3752. One example of a power management circuit 3752 is a power management integrated circuit (PMIC), which may be used to manage the electrical power consumption of the wireless communication device 3730. The power management circuit 3752 may be coupled to a battery 3754. The battery 3754 may generally provide electrical power to the wireless communication device 3730. For example, the battery 3754 and/or the power management circuit 3752 may be coupled to at least one of the elements included in the wireless communication device 3730.

The application processor 3742 may be coupled to at least one input device 3756 for receiving input. Examples of input devices 3756 include infrared sensors, image sensors, accelerometers, touch sensors, keypads, etc. The input devices 3756 may allow user interaction with the wireless communication device 3730. The application processor 3742 may also be coupled to one or more output devices 3758. Examples of output devices 3758 include printers, projectors, screens, haptic devices, etc. The output devices 3758 may allow the wireless communication device 3730 to produce output that may be experienced by a user.

The application processor 3742 may be coupled to application memory 3760. The application memory 3760 may be any electronic device that is capable of storing electronic information. Examples of application memory 3760 include double data rate synchronous dynamic random access memory (DDR SDRAM), synchronous dynamic random access memory (SDRAM), flash memory, etc. The application memory 3760 may provide storage for the application processor 3742. For instance, the application memory 3760 may store data and/or instructions for the functioning of programs that are run on the application processor 3742.

The application processor 3742 may be coupled to a display controller 3762, which in turn may be coupled to a display 3764. The display controller 3762 may be a hardware block that is used to generate images on the display 3764. For example, the display controller 3762 may translate instructions and/or data from the application processor 3742 into images that can be presented on the display 3764. Examples of the display 3764 include liquid crystal display (LCD) panels, light emitting diode (LED) panels, cathode ray tube (CRT) displays, plasma displays, etc.

The application processor 3742 may be coupled to a baseband processor 3744. The baseband processor 3744 generally processes communication signals. For example, the baseband processor 3744 may demodulate and/or decode received signals. Additionally or alternatively, the baseband processor 3744 may encode and/or modulate signals in preparation for transmission.

The baseband processor 3744 may be coupled to baseband memory 3766. The baseband memory 3766 may be any electronic device capable of storing electronic information, such as SDRAM, DDRAM, flash memory, etc. The baseband processor 3744 may read information (e.g., instructions and/or data) from and/or write information to the baseband memory 3766. Additionally or alternatively, the baseband processor 3744 may use instructions and/or data stored in the baseband memory 3766 to perform communication operations.

The baseband processor 3744 may be coupled to a radio frequency (RF) transceiver 3746. The RF transceiver 3746 may be coupled to a power amplifier 3748 and one or more antennas 3750. The RF transceiver 3746 may transmit and/or receive radio frequency signals. For example, the RF transceiver 3746 may transmit an RF signal using a power amplifier 3748 and at least one antenna 3750. The RF transceiver 3746 may also receive RF signals using the one or more antennas 3750.

Figure 38:
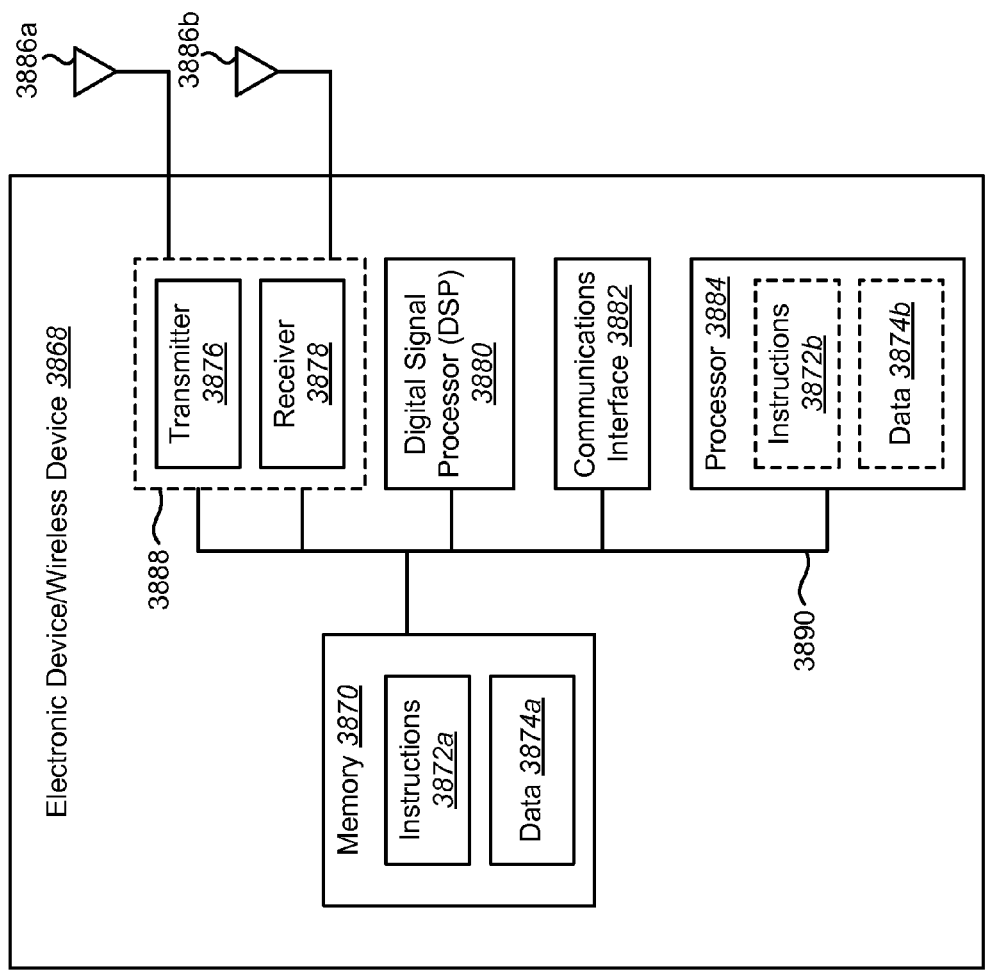
FIG. 38 illustrates certain components that may be included within an electronic device/wireless device.

FIG. 38 illustrates certain components that may be included within an electronic device/wireless device 3868. The electronic device/wireless device 3868 may be an access terminal, a mobile station, a user equipment (UE), a base station, an access point, a broadcast transmitter, a node B, an evolved node B, a server, computer, router, switch, etc. The electronic device/wireless device 3868 may be implemented in accordance with one or more of the electronic devices 556, 1507 described herein. The electronic device/wireless device 3868 includes a processor 3884. The processor 3884 may be a general purpose single- or multi-chip microprocessor (e.g., an ARM), a special purpose microprocessor (e.g., a digital signal processor (DSP)), a microcontroller, a field programmable gate array (FPGA), etc. The processor 3884 may be referred to as a central processing unit (CPU). Although just a single processor 3884 is shown in the electronic device/wireless device 3868, in an alternative configuration, a combination of processors (e.g., an ARM, DSP and FPGA) could be used.

The electronic device/wireless device 3868 also includes memory 3870. The memory 3870 may be any electronic component capable of storing electronic information. The memory 3870 may be embodied as random access memory (RAM), read-only memory (ROM), magnetic disk storage media, optical storage media, flash memory devices in RAM, on-board memory included with the processor 3884, EPROM memory, EEPROM memory, registers, and so forth, including combinations thereof.

Data 3874*a* and instructions 3872*a* may be stored in the memory 3870. The instructions 3872*a* may be executable by the processor 3884 to implement one or more of the methods disclosed herein. Executing the instructions 3872*a* may involve the use of the data 3874*a* that is stored in the memory 3870. When the processor 3884 executes the instructions 3872*a*, various portions of the instructions 3872*b* may be loaded onto the processor 3884, and various pieces of data 3874*b* may be loaded onto the processor 3884.

The electronic device/wireless device 3868 may also include a transmitter 3876 and a receiver 3878 to allow transmission and reception of signals to and from the electronic device/wireless device 3868. The transmitter 3876 and receiver 3878 may be collectively referred to as a transceiver 3888. One or more antennas 3886*a*-*n* may be electrically coupled to the transceiver 3888. The electronic device/wireless device 3868 may also include (not shown) multiple transmitters, multiple receivers, multiple transceivers and/or additional antennas.

The electronic device/wireless device 3868 may include a digital signal processor (DSP) 3880. The electronic device/wireless device 3868 may also include a communications interface 3882. The communications interface 3882 may allow a user to interact with the electronic device/wireless device 3868.

The various components of the electronic device/wireless device 3868 may be coupled together by one or more buses, which may include a power bus, a control signal bus, a status signal bus, a data 3874 bus, etc. For the sake of clarity, the various buses are illustrated in FIG. 38 as a bus system 3890.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

It should be noted that one or more of the features, functions, procedures, components, elements, structures, etc., described in connection with any one of the configurations described herein may be combined with one or more of the functions, procedures, components, elements, structures, etc., described in connection with any of the other configurations described herein, where compatible. In other words, any compatible combination of the functions, procedures, components, elements, etc., described herein may be implemented in accordance with the systems and methods disclosed herein.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for measuring speech signal quality by an electronic device, comprising:
    obtaining a modified single-channel speech signal;
    estimating multiple objective distortions based on the modified single-channel speech signal, wherein estimating the multiple objective distortions comprises estimating a plurality of foreground distortion scores and estimating a plurality of background distortion scores;
    estimating a foreground quality and a background quality based on the multiple objective distortions, wherein estimating the foreground quality comprises synthesizing the plurality of foreground distortion scores to determine a foreground quality score, and wherein estimating the background quality comprises synthesizing the plurality of background distortion scores to determine a background quality score; and
    estimating an overall quality based on the foreground quality and the background quality.

2. The method of claim 1, wherein measuring speech signal quality is performed in accordance with a hierarchical structure that includes a plurality of hierarchical levels, wherein each hierarchical level depends on any and each relatively lower hierarchical level.

3. The method of claim 2, wherein the plurality of hierarchical levels comprises three levels, wherein a first hierarchical level comprises estimating the multiple objective distortions, a second hierarchical level comprises estimating the foreground quality and the background quality and a third hierarchical level comprises estimating the overall quality.

4. The method of claim 1, wherein estimating the overall quality is further based directly on the multiple objective distortions.

5. The method of claim 1, wherein each of the multiple objective distortions represents an independent dimension of speech quality.

6. The method of claim 1, wherein the plurality of foreground distortion scores include a roughness score, a discontinuity score, a dullness score, and a thinness score.

7. The method of claim 1, wherein estimating the plurality of background distortion scores comprises estimating a hissing score and estimating a variability score that indicates a variability of noise in the modified single-channel speech signal.

8. The method of claim 1, wherein the modified single-channel speech signal is based on an original speech signal.

9. The method of claim 1, wherein the multiple objective distortions are estimated without an original speech signal.

10. The method of claim 1, further comprising obtaining an original speech signal, and wherein estimating the multiple objective distortions is further based on the original speech signal.

11. An electronic device for measuring speech signal quality, comprising:
    a computational distortion estimator that estimates multiple objective distortions based on a modified single-channel speech signal, wherein estimating the multiple objective distortions comprises estimating a plurality of foreground distortion scores and estimating a plurality of background distortion scores;
    a computational foreground quality estimator coupled to the computational distortion estimator, wherein the computational foreground quality estimator estimates a foreground quality based on the multiple objective distortions, and wherein estimating the foreground quality comprises synthesizing the plurality of foreground distortion scores to determine a foreground quality score;
    a computational background quality estimator coupled to the computational distortion estimator, wherein the computational background quality estimator estimates background quality based on the multiple objective distortions, and wherein estimating the background quality comprises synthesizing the plurality of background distortion scores to determine a background quality score; and
    a computational overall quality estimator coupled to the computational distortion estimator, wherein the computational overall quality estimator estimates an overall quality based on the foreground quality and the background quality.

12. The electronic device of claim 11, wherein measuring speech signal quality is performed in accordance with a hierarchical structure that includes a plurality of hierarchical levels, wherein each hierarchical level depends on any and each relatively lower hierarchical level.

13. The electronic device of claim 12, wherein the plurality of hierarchical levels comprises three levels, wherein a first hierarchical level comprises estimating the multiple objective distortions, a second hierarchical level comprises estimating the foreground quality and the background quality, and a third hierarchical level comprises estimating the overall quality.

14. The electronic device of claim 11, wherein the multiple objective distortions are estimated without an original speech signal.

15. The electronic device of claim 11, wherein the computational distortion estimator estimates the multiple objective distortions further based on an original speech signal.

16. A computer-program product for measuring speech signal quality, comprising a non-transitory tangible computer-readable medium having instructions thereon, the instructions comprising:
  code for causing an electronic device to obtain a modified single-channel speech signal;
  code for causing the electronic device to estimate multiple objective distortions based on the modified single-channel speech signal, wherein estimating the multiple objective distortions comprises estimating a plurality of foreground distortion scores and estimating a plurality of background distortion scores;
  code for causing the electronic device to estimate a foreground quality and a background quality based on the multiple objective distortions, wherein estimating the foreground quality comprises synthesizing the plurality of foreground distortion scores to determine a foreground quality score, and wherein estimating the background quality comprises synthesizing the plurality of background distortion scores to determine a background quality score; and
  code for causing the electronic device to estimate an overall quality based on the foreground quality and the background quality.

17. The computer-program product of claim 16, wherein measuring speech signal quality is performed in accordance with a hierarchical structure that includes a plurality of hierarchical levels, wherein each hierarchical level depends on any and each relatively lower hierarchical level.

18. The computer-program product of claim 17, wherein the plurality of hierarchical levels comprises three levels, wherein a first hierarchical level comprises estimating the multiple objective distortions, a second hierarchical level comprises estimating the foreground quality and the background quality, and a third hierarchical level comprises estimating the overall quality.

19. The computer-program product of claim 16, wherein the multiple objective distortions are estimated without an original speech signal.

20. The computer-program product of claim 16, further comprising code for causing the electronic device to obtain an original speech signal, and wherein estimating the multiple objective distortions is further based on the original speech signal.

21. An apparatus for measuring speech signal quality, comprising:
  means for obtaining a modified single-channel speech signal;
  means for estimating multiple objective distortions based on the modified single-channel speech signal, wherein estimating the multiple objective distortions comprises estimating a plurality of foreground distortion scores and estimating a plurality of background distortion scores;
  means for estimating a foreground quality and a background quality based on the multiple objective distortions, wherein estimating the foreground quality comprises synthesizing the plurality of foreground distortion scores to determine a foreground quality score, and wherein estimating the background quality comprises synthesizing the plurality of background distortion scores to determine a background quality score; and
  means for estimating an overall quality based on the foreground quality and the background quality.

22. The apparatus of claim 21, wherein measuring speech signal quality is performed in accordance with a hierarchical structure that includes a plurality of hierarchical levels, wherein each hierarchical level depends on any and each relatively lower hierarchical level.

23. The apparatus of claim 22, wherein the plurality of hierarchical levels comprises three levels, wherein a first hierarchical level comprises estimating the multiple objective distortions, a second hierarchical level comprises estimating the foreground quality and the background quality, and a third hierarchical level comprises estimating the overall quality.

24. The apparatus of claim 21, wherein estimating the overall quality is further based directly on the multiple objective distortions.

25. The apparatus of claim 21, wherein each of the multiple objective distortions represents an independent dimension of speech quality.

26. The apparatus of claim 21, wherein the plurality of foreground distortion scores include a roughness score, a discontinuity score, a dullness score, and a thinness score.

27. The apparatus of claim 21, wherein estimating the plurality of background distortion scores comprises estimating a hissing score and estimating a variability score that indicates a variability of noise in the modified single-channel speech signal.

28. The apparatus of claim 21, wherein the modified single-channel speech signal is based on an original speech signal.

29. The apparatus of claim 21, wherein the multiple objective distortions are estimated without an original speech signal.

30. The apparatus of claim 21, further comprising means for obtaining an original speech signal, and wherein estimating the multiple objective distortions is further based on the original speech signal.

* * * * *